(12) United States Patent
Osaka

(10) Patent No.: US 8,370,738 B2
(45) Date of Patent: Feb. 5, 2013

(54) INFORMATION PROCESSING APPARATUS, CONTROL METHOD, AND COMPUTER-READABLE MEDIUM

(75) Inventor: Hitoshi Osaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1242 days.

(21) Appl. No.: 11/874,354

(22) Filed: Oct. 18, 2007

(65) Prior Publication Data

US 2008/0120536 A1    May 22, 2008

(30) Foreign Application Priority Data

Nov. 17, 2006   (JP) ................................. 2006-311618

(51) Int. Cl.
   *G06F 17/00*   (2006.01)
(52) U.S. Cl. .................. 715/243; 715/252; 715/227
(58) Field of Classification Search .............. 715/209, 715/212, 227, 243–253, 700, 788, 800–801, 715/240; 382/112; 358/1.13, 1.18; 345/660
   See application file for complete search history.

(56) References Cited

U.S. PATENT DOCUMENTS

| | | | | |
|---|---|---|---|---|
| 4,539,653 A * | 9/1985 | Bartlett et al. | ................ | 715/235 |
| 5,701,500 A * | 12/1997 | Ikeo et al. | ................ | 715/209 |
| 5,893,127 A * | 4/1999 | Tyan et al. | ................ | 715/209 |
| 5,943,679 A * | 8/1999 | Niles et al. | ................ | 715/247 |
| 6,055,550 A * | 4/2000 | Wallack | ................ | 715/229 |
| 6,169,544 B1 * | 1/2001 | Onoda | ................ | 715/723 |
| 6,389,437 B2 * | 5/2002 | Stoub | ................ | 715/201 |
| 6,639,611 B1 * | 10/2003 | Leduc | ................ | 715/764 |
| 6,675,351 B1 * | 1/2004 | Leduc | ................ | 715/264 |
| 6,738,079 B1 * | 5/2004 | Kellerman et al. | ................ | 715/763 |
| 6,826,727 B1 * | 11/2004 | Mohr et al. | ................ | 715/235 |
| 6,981,209 B1 * | 12/2005 | Parikh et al. | ................ | 715/212 |
| 7,028,255 B1 * | 4/2006 | Ayers | ................ | 715/202 |
| 7,051,276 B1 * | 5/2006 | Mogilevsky et al. | ......... | 715/209 |
| 7,065,704 B1 * | 6/2006 | Xu | ................ | 715/205 |
| 7,133,050 B2 * | 11/2006 | Schowtka | ................ | 345/620 |
| 7,188,310 B2 * | 3/2007 | Schwartzkopf | ................ | 715/253 |
| 7,281,210 B2 * | 10/2007 | Ohashi et al. | ................ | 715/247 |
| 7,313,765 B2 * | 12/2007 | Taylor et al. | ................ | 715/788 |
| 7,391,885 B2 * | 6/2008 | Harrington et al. | ........... | 382/112 |
| 7,412,647 B2 * | 8/2008 | Sellers et al. | ................ | 715/253 |
| 7,421,649 B1 * | 9/2008 | Williams | ................ | 715/234 |
| 7,454,695 B1 * | 11/2008 | Grigoriev | ................ | 715/227 |
| 7,496,839 B2 * | 2/2009 | Duxbury | ................ | 715/243 |
| 7,500,179 B2 * | 3/2009 | Lehenbauer et al. | ......... | 715/227 |
| 7,512,876 B2 * | 3/2009 | Endo et al. | ................ | 715/227 |
| 7,627,809 B2 * | 12/2009 | Balinsky | ................ | 715/200 |
| 7,627,812 B2 * | 12/2009 | Chamberlain et al. | ........ | 715/217 |
| 7,634,725 B2 * | 12/2009 | Nishikawa | ................ | 715/243 |
| 7,647,553 B2 * | 1/2010 | Mogilevsky et al. | ......... | 715/247 |
| 7,656,543 B2 * | 2/2010 | Atkins | ................ | 358/1.13 |
| 7,657,830 B2 * | 2/2010 | Ovetchkine et al. | .......... | 715/217 |
| 7,934,154 B2 * | 4/2011 | Kobashi et al. | ................ | 715/243 |

(Continued)

FOREIGN PATENT DOCUMENTS

| JP | 2005-216174 A | 8/2005 |
|---|---|---|
| JP | 2005-216182 A | 8/2005 |

*Primary Examiner* — Cesar Paula
*Assistant Examiner* — James H Blackwell
(74) *Attorney, Agent, or Firm* — Canon USA, Inc., IP Division

(57) ABSTRACT

Automatic layout processing includes determining an area size based on a vertical size of sub-templates aligned in a row direction and a horizontal size of sub-templates aligned in a column direction, and locating each sub-template in a corresponding area.

25 Claims, 42 Drawing Sheets

U.S. PATENT DOCUMENTS

| | | | |
|---|---|---|---|
| 8,001,465 B2* | 8/2011 | Kudrolli et al. | 715/243 |
| 2002/0040375 A1* | 4/2002 | Simon et al. | 707/517 |
| 2002/0051208 A1* | 5/2002 | Venable | 358/1.18 |
| 2003/0131318 A1* | 7/2003 | Mandal et al. | 715/517 |
| 2003/0137539 A1* | 7/2003 | Dees | 345/762 |
| 2004/0205472 A1* | 10/2004 | Purvis | 715/500 |
| 2005/0172224 A1* | 8/2005 | Kobashi et al. | 715/517 |
| 2007/0162844 A1* | 7/2007 | Woodall et al. | 715/517 |

\* cited by examiner (1ST COLUMN OF 1ST ROW) — 1801
(2ND COLUMN OF 1ST ROW) — 1802
(1ST COLUMN OF 2ND ROW) — 1803
(2ND COLUMN OF 2ND ROW) — 1804
(1ST COLUMN OF 3RD ROW) — 1805
(2ND COLUMN OF 3RD ROW) — 1806

FIG.29

```
. . . . .
<record>
  <cell_usage>
     <horizontal>2</horizontal> ~2901
     <vertical>2</vertical> ~2902
  </cell_usage>
  <data>
     <data1>abc</data1>
     <data2>def</data2>
           . . . . . . . . .
  </data>
</record>
. . . . .
```

FIG.37

```
[Data]
Data1,                      Data2,          Data3,
SCANNER,                    scan.jpg,       ¥10,000
MULTIFUNCTION PERIPHERAL,   mfp.jpg,        ¥300,000
PRINTER,                    printer.jpg,    ¥10,000
PERSONAL COMPUTER,          computer.jpg,   ¥50,000
```

INFORMATION PROCESSING APPARATUS, CONTROL METHOD, AND COMPUTER-READABLE MEDIUM

BACKGROUND OF THE INVENTION

1. Field of the Invention

The present invention relates to an automatic layout system including an information processing apparatus, a method for controlling the information processing apparatus, and a program controlling the information processing apparatus.

2. Description of the Related Art

The today's merchandise environment allows a user to purchase a favorite product selected from a wide variety of commercial products and tends to reduce the life cycle of each product. Meanwhile, Internet-based customization services are a recent trend among consumers. In such circumstances, the customer relationship management (CRM) and the one-to-one marketing are prospective techniques that can meet or surpass customer satisfaction and increase the number of clients.

The one-to-one marketing is a kind of the database-based marketing that establishes a database storing personal attribute information (e.g., age, sex, interest, taste, purchase history, etc) of clients, and can propose a product satisfying a need of each client by analyzing database information. The variable print is a business style representing the one-to-one marketing.

The development of desktop publishing (DTP) techniques and digital printing apparatuses enables a variable printing system to customize an output document according to a preference of each client. In this respect, it is desirable to optimize the layout of contents according to a request from each client.

To generate a document, a conventional variable print includes steps of creating a template including containers on a document, relating the template with a database, and pouring content data from the database into containers of the template. In this case, each container is an area into which content data is poured.

However, each container has a fixed size. If content data (text and/or image data) to be inserted into a container has a large volume, the content data may not be fully accommodated or disposed in the container. Furthermore, if content data has a small size compared to the capacity of a container, an empty space may remain in the container.

To solve these problems, there is an automatic layout system that can set a container whose size is variable according to text data and image data. Namely, the automatic layout system can change a container size with reference to a size of content data poured into each container and can solve the above-described problems.

However, according to the system that changes a container size according to the size of content data, if a large size of content data is inserted into all containers of a template, each container has an expanded size and may overlap other container.

To solve this problem, the technique discussed in Japanese Patent Application Laid-Open No. 2005-216174 adjusts the layout of plural containers by relating these containers so as to avoid an overlap between neighboring containers and determine the size of each container similar to a required size of content data.

Furthermore, a variable printing system can determine a layout of a document including multiple records according to a multi-record technique. The multi-record technique can analyze client information and create a document that involves plural records including content data requested by each client.

An exemplary multi-record technique discussed in Japanese Patent Application Laid-Open No. 2005-216182 includes processes of generating an area referred to as "flow area", extracting a record including content data satisfying the conditions set for the flow area, pouring the extracted record into a template area referred to as "sub-template", adjusting the layout of the record in the sub-template, and finalizing the position (location) of the adjustment result in the flow area.

However, the size of a sub-template discussed in the above-described Japanese Patent Application Laid-Open No. 2005-216182 is fixed regardless of content data to be poured into the sub-template. Accordingly, if a layout object is a large-size content data exceeding the capacity of a sub-template initially set, the multi-record technique discussed in Japanese Patent Application Laid-Open No. 2005-216182 may reduce the size of the content data to a great extent compared to a size intended by a creator of the content data.

In this respect, a sub-template variable according to a size of content data may solve the above-described problem. The size of a variable sub-template is dependent on content data to be poured therein. Therefore, if content data has a large size, a variable sub-template becomes larger correspondingly. If content data has a small size, a variable sub-template becomes smaller correspondingly. As a result, the finalized layout of each sub-template may not be uniform in height when the variable sub-templates are aligned in the horizontal direction.

Therefore, the above-described conventional technique cannot satisfy a client who requests a catalog for advertisement that includes commercial products well-balanced in a table or matrix pattern.

SUMMARY OF THE INVENTION

Exemplary embodiments of the present invention are directed to a technique capable of generating a layout result in which well-balanced content data is located in the vertical and horizontal directions while maintaining a required size of content data.

According to an aspect of the present invention, an information processing apparatus is configured to store a template having a flow area where extraction conditions to extract content data from a database is set and determine a layout by using the flow area including sub-templates in which extracted content data can be located. The information processing apparatus includes an acquiring unit configured to acquire content data satisfying the extraction conditions from the database; a first determination unit configured to determine an area size of each cell area constituting the flow area based on a vertical sub-template size in each row and a horizontal sub-template size in each column, wherein content data acquired by the acquiring unit are located in a plurality of sub-templates, the vertical sub-template size in each row is selected from a plurality of sub-templates aligned in a row direction representing a horizontal direction, and the horizontal sub-template size in each column is selected from a plurality of sub-templates aligned in a column direction representing a vertical direction; and a locating unit configured to determine a size of each sub-template so that the sub-templates are included in the cell areas having the area size determined by the first determination unit, and locate the content data in the sub-templates.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 29 illustrates an exemplary sub-database that instructs usage of jointed cells for a record.

FIG. 37 illustrates a database according to a third exemplary embodiment of the present invention.

DETAILED DESCRIPTION OF THE EMBODIMENTS

Figure 1:
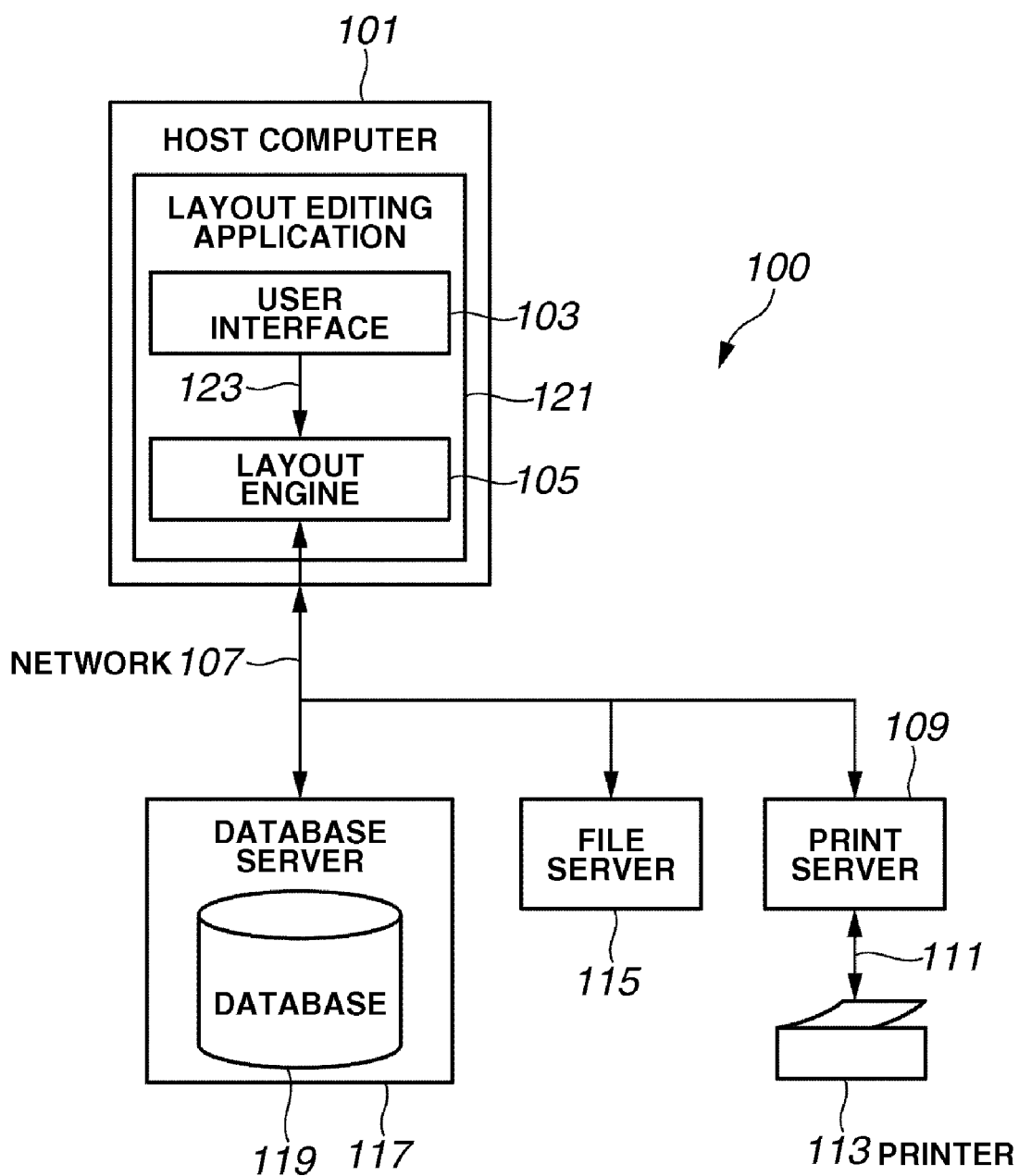
FIG. 1 illustrates a computer system according to an exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates a system 100 configured to print variable document data according to an exemplary embodiment of the present invention. A host computer 101 includes a layout editing application 121. The layout editing application 121 includes a user interface 103 and a layout engine 105. The host computer 101 can communicate with a database server 117 via a network 107. The database server 117 includes a database 119 that stores content data.

Figure 2:
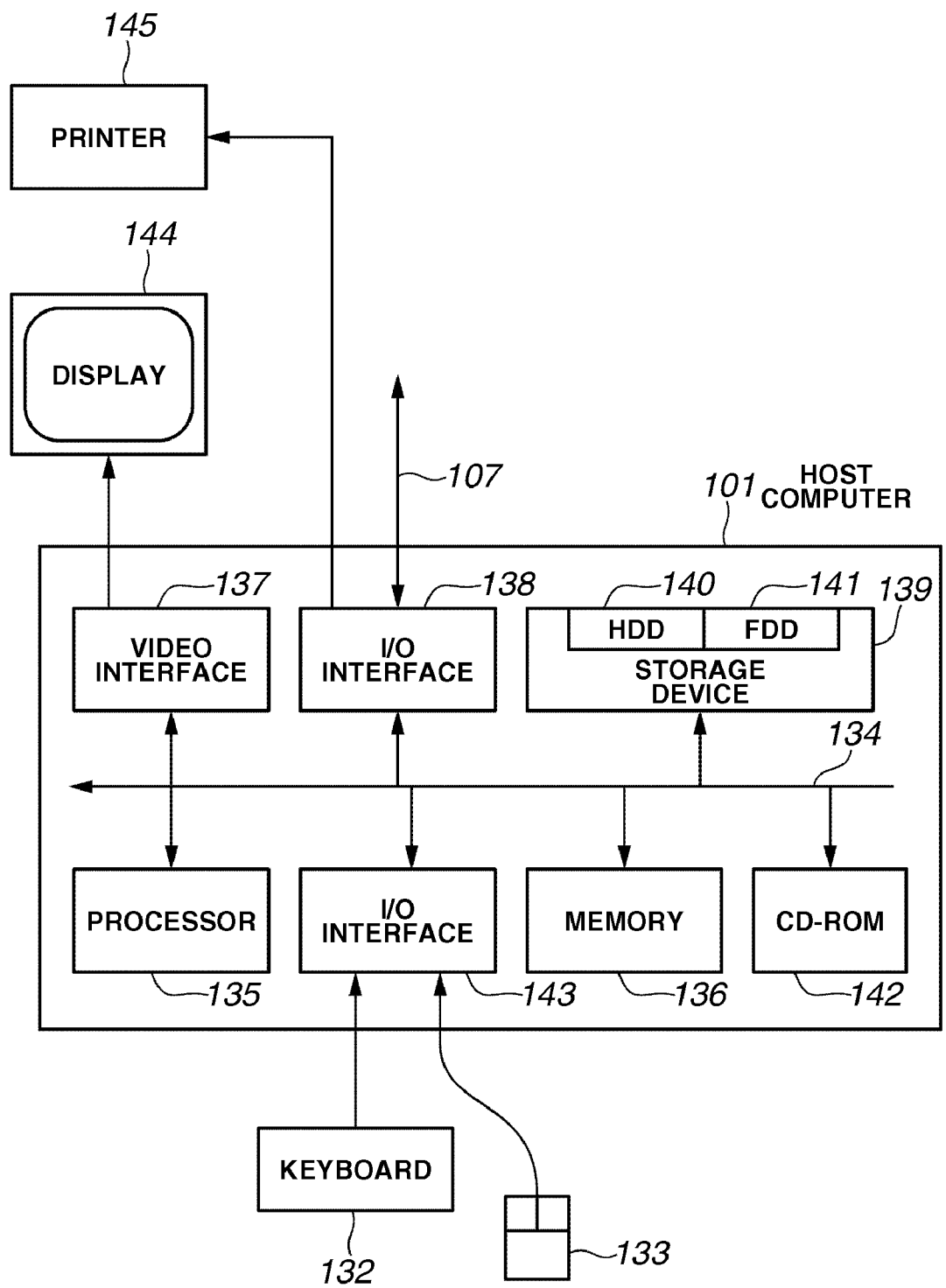
FIG. 2 illustrates a computer module according to an exemplary embodiment of the present invention.

FIG. 2 illustrates a block diagram of the host computer 101 in the system 100. The host computer 101 can execute layout edit processing and print processing according to an instruction of software installed thereon.

The software is, for example, stored in a computer-readable medium for a computer that includes the following storage apparatus. The host computer 101 can execute the software when loaded from a computer-readable medium. The host computer 101 can realize document layout edit processing and variable data print processing according to a computer-readable application which a user can purchase as a computer software product.

The host computer 101 is associated with an input apparatus such as a keyboard 132 or a mouse 133 (i.e., a pointing device). The host computer 101 can communicate with output apparatuses such as a display unit 144 and a printer 145.

An input/output (I/O) interface 138 controls a network connection 107 between the host computer 101 and other computer. An exemplary network connection 107 is, for example, a local area network (LAN) or a wide area network (WAN).

The host computer 101 includes at least one processor unit 135 and a memory unit 136. The memory unit 136 is, for example, a random access memory (RAM) or a read only memory (ROM) Furthermore, the host computer 101 includes a video interface 137 as well as an I/O interface 143 of the keyboard 132 and the mouse 133.

The storage device 139 includes a hard disk drive (HDD) 140 and a floppy disk drive (FDD) 141. A CD-ROM drive 142 is a nonvolatile data source. The processor 135 of the host computer 101 operates according to an operation system such as LINUX or Microsoft Windows® and can use the I/O interface 143 via an interconnection bus 134 to communicate.

The layout editing application program 121 is resident in the hard disk drive 140. The processor 135 reads and executes the layout editing application program 121. The memory unit 136 operates in synchronism with the hard disk drive 140 to store data fetched from the network 107 and a medium storage device of the layout editing application program 121.

According to other example, a user can use the layout editing application 121 encoded and read from a CD-ROM or a floppy disk via the corresponding drives 142 and 141.

Alternatively, a user can get the layout editing application program 121 from other device via the network 107. The software may be loaded into a storage device of the host computer 101 via other readable media including a magnetic tape, a ROM, an integrated circuit, a magneto-optical disk, a wireless or infrared data communication, a computer-readable card, an e-mail communication, an intranet, and the Internet.

The layout editing application 121 includes two software components. The first software component is the layout engine 105 that calculates the position of a rectangular shape and lines according to restrictions on a rectangular region and a setting size.

The second software component is the user interface 103 that enables a user to create a document template and relates the document template with a data source.

The user interface 103 and the layout engine 105 can communicate with each other via a communication channel 123. The database 119 of the database server 117, constituted by other computer, serves as a data source that provides data usable for document creation.

The host computer 101 communicates with the database server 117 via the network 107. The layout editing application 121 generates a document template stored in the host computer 101 or a file server 115.

The layout editing application 121 merges data into a document template and generates a document. The document generated by the layout editing application 121 is stored in the memory unit 136 of the host computer 101 or in the file server 115.

Furthermore, the document generated by the layout editing application 121 can be transmitted to a printer 113 that prints the document. A print server 109 is a computer that provides a network function with which the printer 113 can communicate with other device via the network. The print server 109 can communicate with the printer 113 via a communication channel 111.

Figure 32:
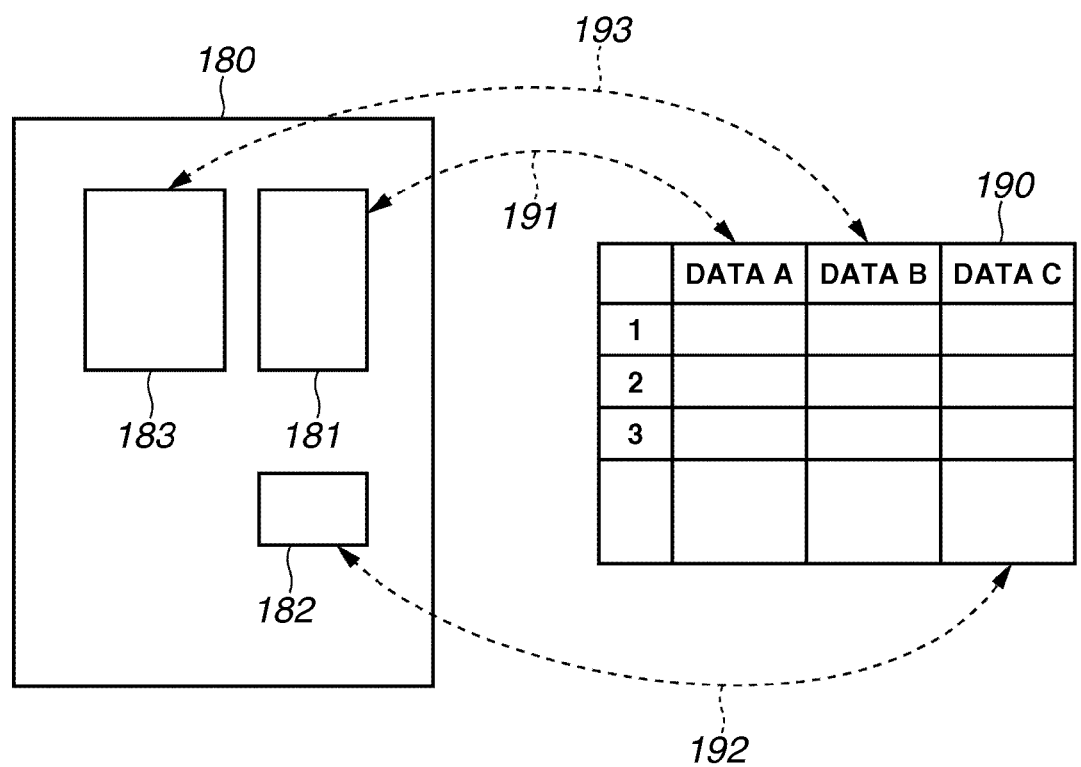
FIG. 32 illustrates an exemplary variable data print.

FIG. 32 illustrates an exemplary variable data print according to the present exemplary embodiment.

The user interface (i.e., user interface module) 103 locates a plurality of containers 181 to 183 on a page according to an operation instruction from a user. The user interface 103 generates a document template 180 that includes position/size constraints allocated to each container.

Furthermore, the user interface 103 relates the document template 180 with the data source 190. The user interface 103 relates each container with each data field in the data source 190 (191-193 in FIG. 32).

Information indicating a relationship between each container and each data field in the data source 190 is described in the document template 180. The document template 180 is stored in the HDD 140. The data source 190 is a file that describes item data of each record and stored in the HDD 140. The layout engine 105 reads content data (i.e., related data) from data source 190 according to a print instruction or a preview instruction from a user, and pours the read content data of each record into a corresponding one of the containers 181 to 183 of the document template 180. For example, the layout engine 105 pours data fields A to C of record 1 into the containers 181 to 183 and adjusts the size of each container according to the poured data. Namely, the layout engine 105 has a layout adjusting function.

If a preview instruction is input from a user, the display unit 144 displays a document image resulting from the layout adjustment as a preview image. If a print instruction is input from a user, a printer driver converts a document image generated by the layout engine 105 into a page description language and outputs print data based on the page description language.

Thus, a variable data print can be realized by successively processing records.

The database 119 of the database server 117 can serve as data source 190 for document creation. In this case, the host computer 101 communicates with the database server 117 via the network 107 and accesses the data source.

The document template 180 generated by the layout editing application 121 is stored in the host computer 101 or in the file server 115 constituted by other computer.

Figure 3:
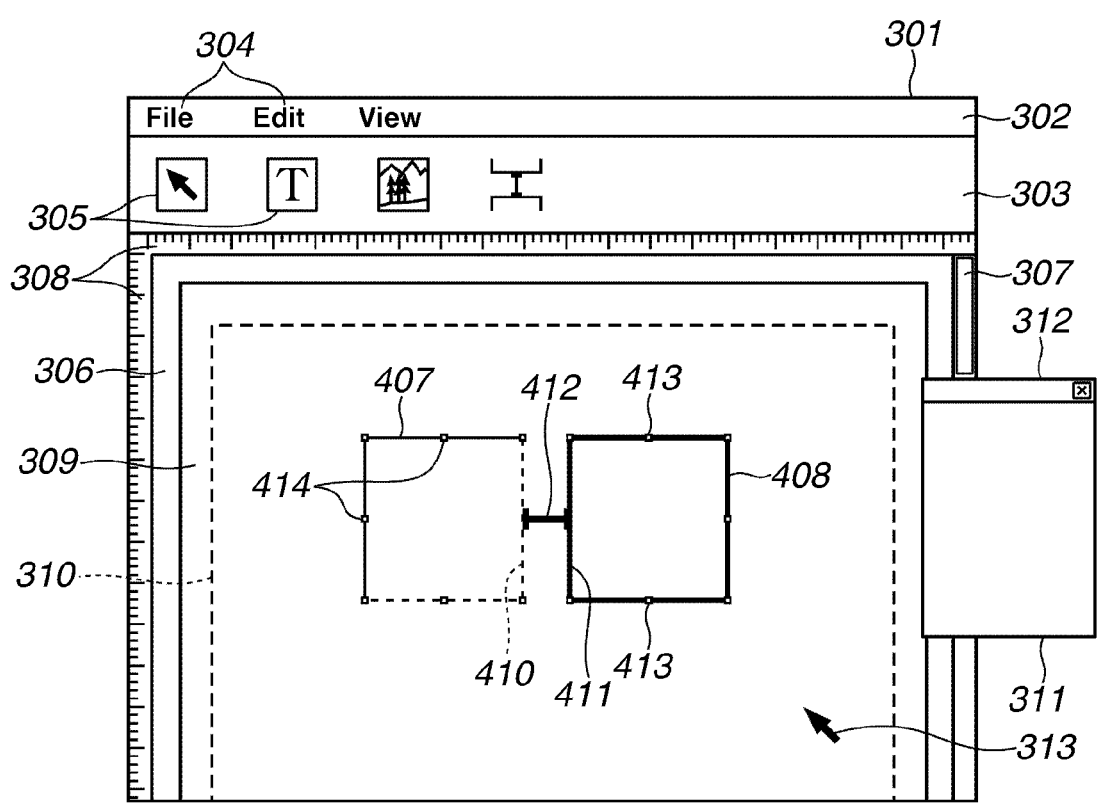
FIG. 3 illustrates an example of a main window according to an exemplary embodiment of the present invention.

The user interface 103 causes the display unit 144 to display a window 301 illustrated in FIG. 3 according to a user's instruction.

The window 301 includes a menu bar 302, a tool bar 303, a work area 306, a palette 311, and a cursor/pointer device 313. The work area 306 is movable according to the position and movement of the mouse 133. The palette 311 is optional. The menu bar 302 includes a plurality of menu items 304 constituting a hierarchy of menu options.

The tool bar 303 includes widgets 305 such as tool buttons that may be displayed according to a special mode of an application. A ruler 308 is optionally usable to indicate the position of a pointer, a page, a line, a margin guide, a container or an object displayed in the work area. The palette 311 enables a user to access an additional function such as a library that displays variable data. The palette 311 includes a window control 312 that enables a user to move, resize, and close the window.

The tool bar area 303 includes at least the following "buttons" that a user can operate.

A selection tool button enables a user to select, move, and resize a side-part of a container and lock/unlock the settings. A user can drag on a screen to draw a selection box enclosing plural containers or successively select plural containers while pressing a CTRL key continuously.

An image container tool button enables a user to create a container including a static or variable image. A text container tool button enables a user to create a container including a static or variable text. A link tool button enables a user to adjust a distance between containers.

The work area 306 enables a user to display and edit a designed document template. A user, designing an outline of a document template with the work area 306, can confirm any change on a document occurring if content data is poured based on the amount and size of variable data.

If an external data source is linked to a template, a preview of a document displays content data (text and image) together with a container on the template.

The preview of a document may include a visualized structure of a document and a drawing of each container.

The work area 306 includes a scroll bar 307, the optional ruler 308, and a document template 309. The document template 309 may include a plurality of pages.

A user can designate a page size of the document template 309. The number of pages of each document changes according to the volume of variable data. If the volume of variable data exceeds one page, an additional page is automatically created.

A borderline on each page is a page margin 310 that indicates a maximum width of an object printable on the page.

The example of FIG. 3 is a one-page size of document template 309. Objects displayed on the document template 309 are containers 407 and 408, a non-fixed side-part 410, and a link 412 that relates plural containers.

The container is an area constituting part of the document template into which a user can input content data (text data or image data). The position of each container is variable depending on a relationship with other container or object. The user interface 103 displays containers and enables a user to move or adjust each container.

More specifically, the container includes an assembly of settings, visual expressions, interactions, and editing operations.

A user can pour fixed or variable content data into a container. A user can obtain variable contents from a data source. In the present exemplary embodiment, variable contents do not include animation or other moving contents because these data are not suitable for printing.

A container allocated to fixed contents can generate the same output result in every document. However, the layout of a variable container may change the position of a container allocated to fixed contents.

The document creation processing includes pouring (merging) content data of a data source into a container, and displaying the container with the content data poured from the data source. The container with the poured content data can be, for example, printed or displayed on the display unit 144.

Each container has an interactive user interface, such as a graphic user interface (GUI), which enables a user to edit the container or change display settings. Elements of the interface are not printable although the display unit 144 can display them. The user interface 103 displays some of decorative functions (including a background color or a font) of a container, and also displays interface elements enabling a user to set, edit, and view the container.

Setting of constraints is necessary to control an output of content data poured into a container. A user can change the constraints to output various documents using the same document template. An exemplary constraint is a size setting of a container, such as "the height of content in this container does not exceed 4 inches." Another exemplary constraint is a position setting of a container, such as "the horizontal position of a left side-part of contents in a container is always the same in any display of document." The following is an exemplary method for setting constraints using the GUI.

Similar to position information identifying the position of an image defined on a page, a content place folder designating the location of a fixed content is publicly known in the digital printing techniques.

A user can set the position and the size of a container, and also can edit or view a container. The following method for displaying and editing a container according to the present embodiment is exclusively applied to a variable data print.

The container is used to determine the size and the position of content data. When a user uses the same document template to generate a layout of plural documents, a container can be used as a user interface that enables a user to designate and view a possible layout of plural documents and constraints.

Two representative types of the container are a text container and an image container. The content data poured into the text container is text data. The content data poured into image container in image data. The content data can be fixed data or variable data.

To create a new text container or a new image container, a user can create a rectangular area by dragging on the document template 309 in a state where the text container tool button or the image container tool button is selected or pressed.

Furthermore, when an appropriate tool is active, a user can click on the document template 309 to create a new container. In this case, a newly created container has a default size, or a dialog box may appear to enable a user to determine the dimensions of a container.

A side-part of a container defines a virtual borderline in a display of related contents with a document image. In the use of a container as a user interface, the left side-part of a container determines the leftmost side (i.e., a displayable left edge) of the contents relating to the container in any document. Similarly, the height of a container determines the limit in height (i.e., a displayable height) of the contents relating to the container in any document.

In the present exemplary embodiment, the layout editing application 121 can change the side-part or the size of a container according to a user's instruction input through the user interface 103.

The following is layout rules that restrict the layout of contents.

If the setting selected by a user specifies the width of a container to be fixed, right and left side-parts of a container are displayed using solid lines. The width of contents relating to this container is the same in all documents. However, the height of a container may change according to the volume of related content data.

If the setting selected by a user specifies the height of a container to be fixed, upper and lower side-parts of a container are displayed using a solid line. The height of contents relating to this container is the same in all documents. However, the width of a container may change according to the volume of related content data.

If a user relates other container with side-parts of a fixed container, the position of the fixed container may be forcibly changed to adjust a positional relationship between two containers. If a user relates other container with upper and lower side-parts of a container, the container may move in the vertical direction to adjust a positional relationship between two containers. If a user relates other container with right and left side-parts of a container, the container may move in the horizontal direction to adjust a positional relationship between two containers. An exemplary method for relating plural containers will be described with reference to FIGS. 6A to 6C.

The following is a case where a container is set to be "variable."

If the width of a container is set to be variable, right and left side-parts of a container are displayed using dotted lines. The width of contents relating to this container is changeable in each document.

If the height of a container is set to be variable, upper and lower side-parts of a container are displayed using dotted lines. The height of contents relating to this container is changeable in each document.

The length of a side-part of a container, if set to be variable, may change in relation to content data related to this container. The layout editing application 121 adjusts the length of a side-part of a container within a frame defined according to the settings for limiting a maximum length and a minimum length of the side-part.

If a user relates other container with side-parts of a variable container, the position of the container may change to adjust a positional relationship between two containers.

Figure 4:
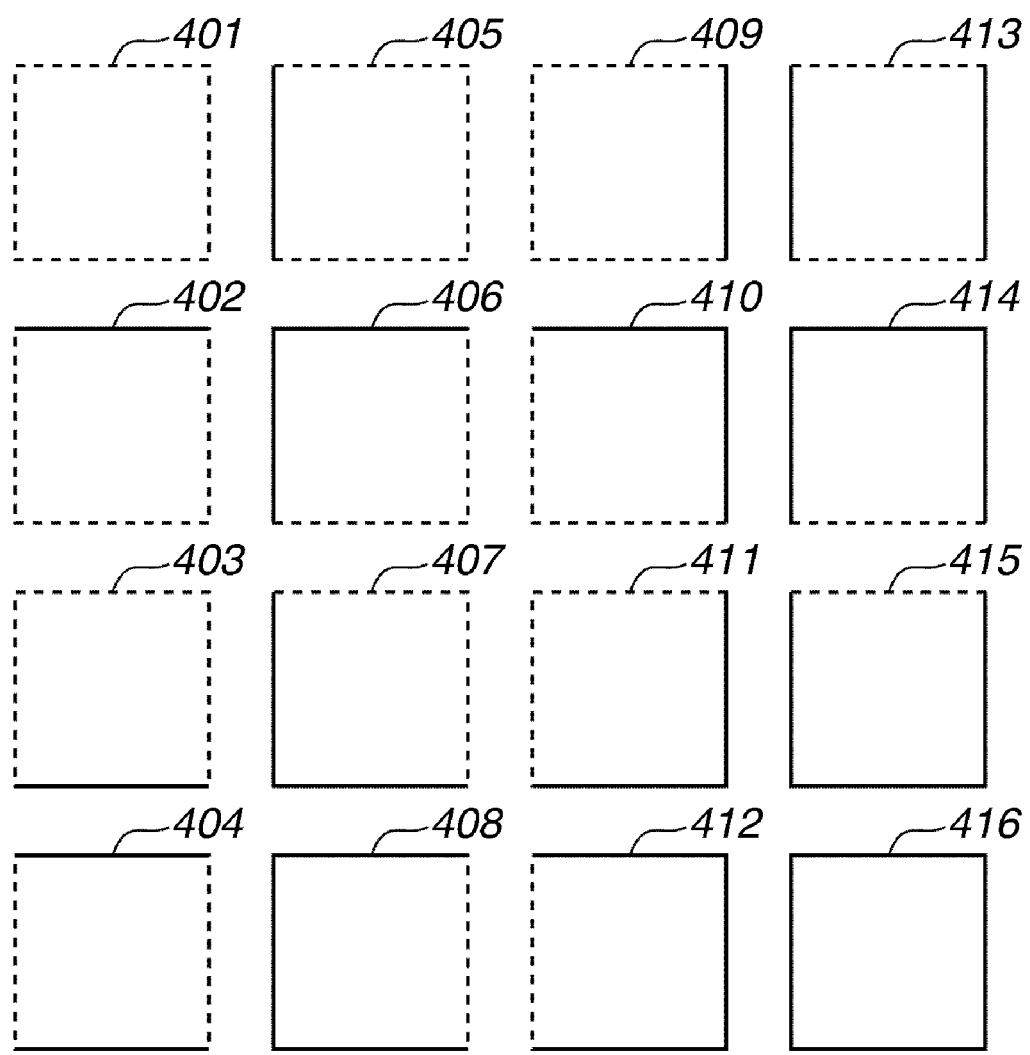
FIG. 4 illustrates an exemplary display pattern of containers according to an exemplary embodiment of the present invention.

FIG. 4 illustrates an exemplary state of containers having side-parts drawn according to the above-described rules. In general, the visible state of each side-part of a container is an auxiliary element displayed as an aid for designing a document template and therefore is not printable on a recording sheet.

A container 401 has four side-parts being set to be variable. A container 402 has an upper side-part being set to be stationary. A container 403 has a lower side-part being set to be stationary. A container 404 has upper and lower side-parts being set to be stationary. A container 405 has a left side-part being set to be stationary. A container 406 has left and upper side-parts being set to be stationary. In this manner, the layout editing application 121 displays stationary side-parts of respective containers 401 to 416 using solid lines and displays variable side-parts using dotted lines.

Figure 5A:
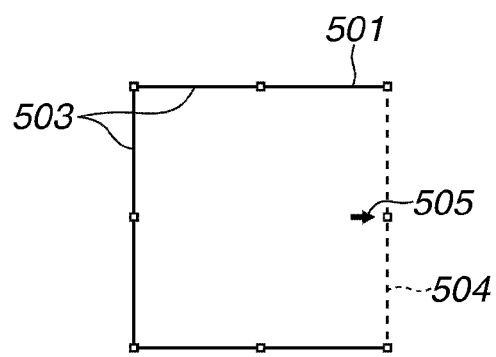
FIGS. 5A to 5C illustrate rules applied to a container according to an exemplary embodiment of the present invention.

FIG. 5A illustrates a container 501 having a variable width. In this case, a stationary side-part 503 is expressed using a solid line and a variable side-part 504 is expressed using a dotted line. A scaling icon 505 is an optional indicator indicating that a neighboring side-part 504 is variable.

Figure 5B:
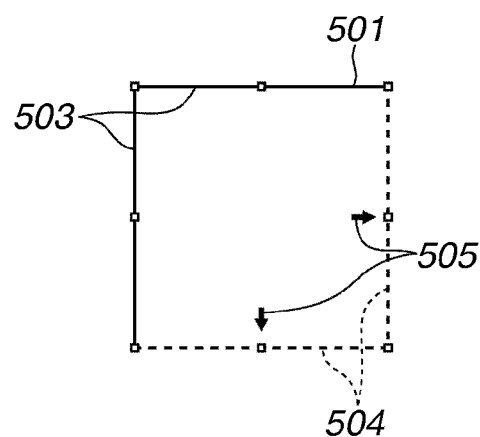
Figure 5C:
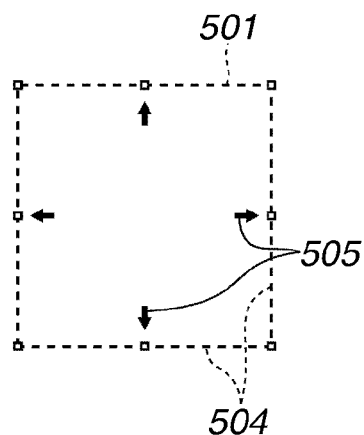

FIG. 5B illustrates another container 501 having variable width and height. FIG. 5C illustrates yet another container 501 having side-parts whose positions in the vertical and horizontal directions are variable.

<Link Setting Method>

Figure 6A:
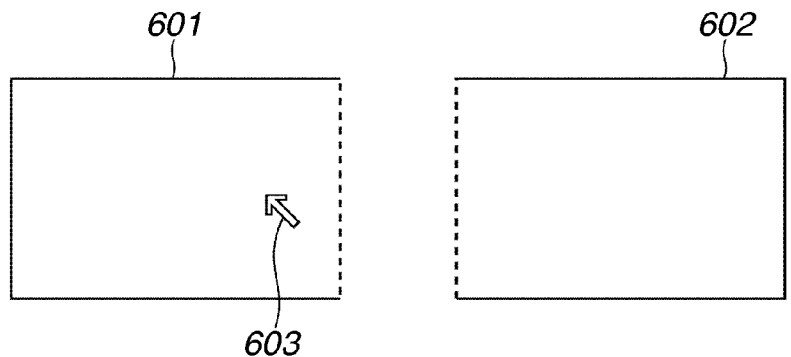
FIGS. 6A to 6C illustrate a link setting user interface (UI) according to an exemplary embodiment of the present invention.
Figure 6B:
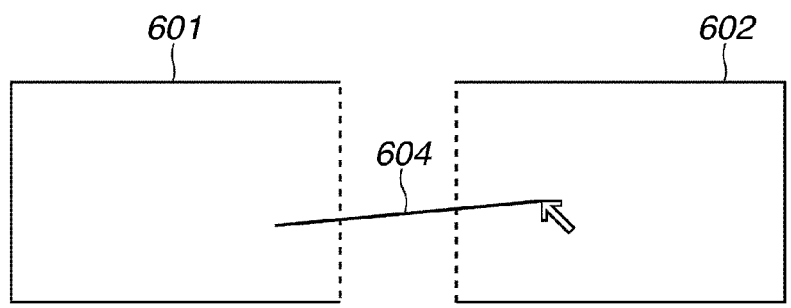
Figure 6C:
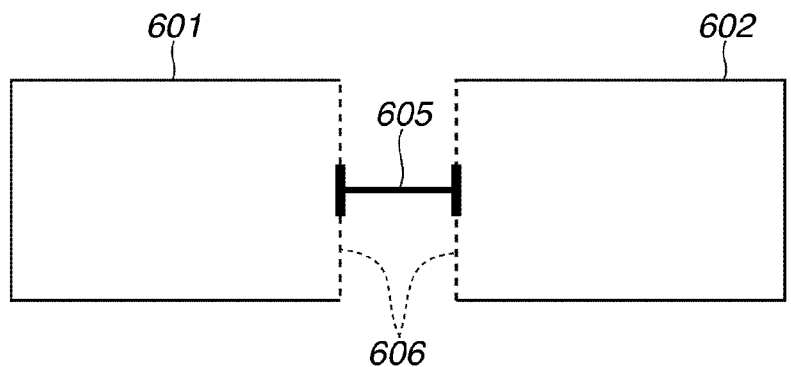

FIGS. 6A to 6C illustrate an exemplary link setting UI.

As illustrated in FIG. 6A, if a user wants to set a link, the user clicks on a container 601 (i.e., one of target containers) using a mouse cursor 603 in a state where the link setting is instructed. Then, as illustrated in FIG. 6B, if a user wants to relate the selected container 601 with a container 602, the user moves a mouse pointer to a container 602 and clicks on the container 602. A line 604 illustrated in FIG. 6B is a line connecting the position of user's click on the container 601 (i.e., the first click operation) to a current position of the mouse pointer on the container 602. The line 604 enables a user to view a result of the link setting. As illustrated in FIG. 6C, if a user clicks on the container 602 (i.e., the second click operation), the layout editing application 121 sets a link 605 between two related containers 601 and 602.

A right side-part of the container 601 and a left side-part of the container 602 are variable side-parts indicated by dotted lines (606). In the state illustrated in FIG. 6C, the layout editing application 121 can move the right side-part of the container 601 to the right according to the volume of content data poured into the container 601. Similarly, the layout editing application 121 can move the left side-part of the container 602 to the left. The layout editing application 121 can adjust a mutual size relationship between the left container 601 and the right container 602 while maintaining the link size, when the left and right containers are once connected by the link.

Figure 7A:
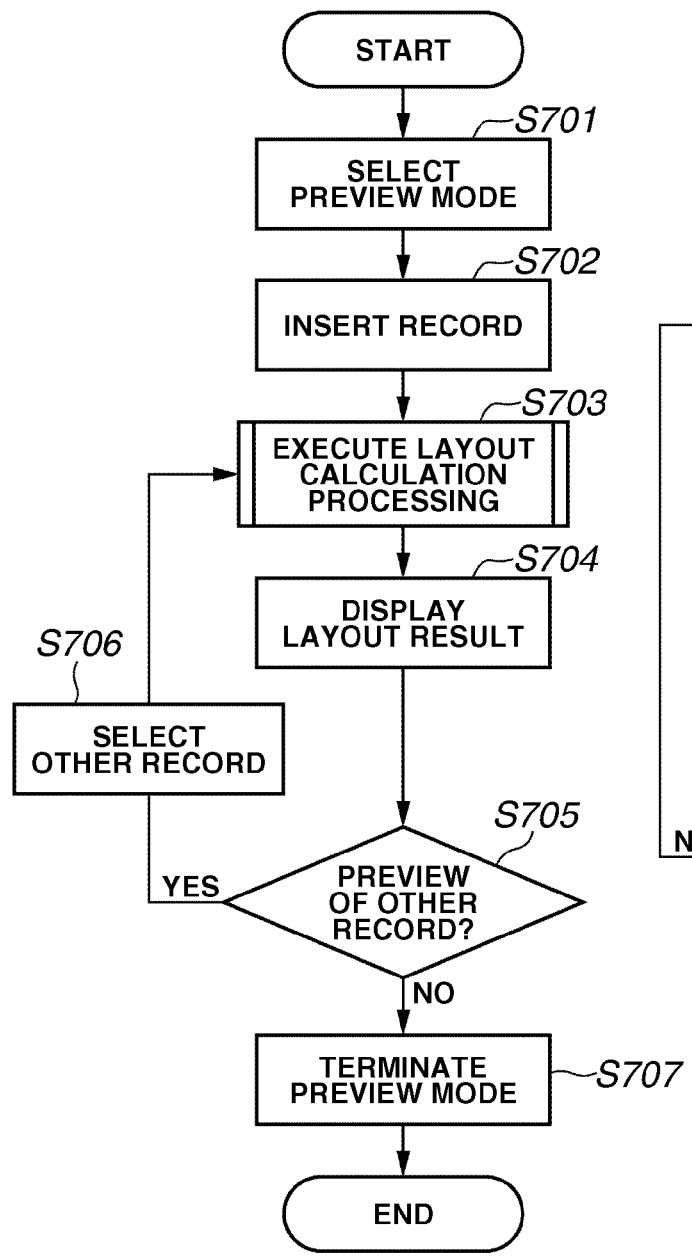
FIGS. 7A and 7B are flowcharts illustrating layout calculation processing according to an exemplary embodiment of the present invention.

FIG. 7A is a flowchart illustrating exemplary layout calculation processing. The processor 135 of the host computer 101 executes the processing of each step of the flowchart according to present exemplary embodiment In step S701, the layout editing application 121 selects a preview mode according to a user's instruction. If a user selects a layout mode, the layout editing application 121 creates containers, relates containers with each other, and creates a layout of a template.

In the preview mode, the layout editing application 121 inserts content data of each record into the created layout of a template from a database, and previews a layout result of each container with content data inserted therein.

In the preview mode, the layout editing application 121 executes a layout calculation to insert plural content data of a record into a container. A user can select the preview mode not only for displaying a calculated layout of a template but also for displaying a print image.

In step S702, the layout editing application 121 obtains a record as a preview object when a user selects the preview mode, and pours content data of the record into a container.

In step S703, the layout editing application 121 executes layout calculation processing. The layout calculation includes determination of a container size which is required when content data of a record is poured into each container.

In step S704, the layout editing application 121 displays a layout result calculated in step S703.

In step S705, the layout editing application 121 determines whether a user instructs a preview of other record. If the layout editing application 121 determines that a user does not instruct a preview of other record (NO in step S705), the processing flow proceeds to step S707. In step S707, the layout editing application 121 terminates the preview mode. If the layout editing application 121 determines that a user instructs a preview of other record (YES in step S705), the processing flow proceeds to step S706. In step S706, the layout editing application 121 selects other record and then performs the above-described processing of steps S703 to S705. If a user instructs print processing, the layout editing application 121 successively calculates a layout of each record to be printed. In other words, the layout editing application 121 skips the processing of steps S705 and S707 and terminates the processing of this routine when a printing operation for all records is completed.

Figure 7B:
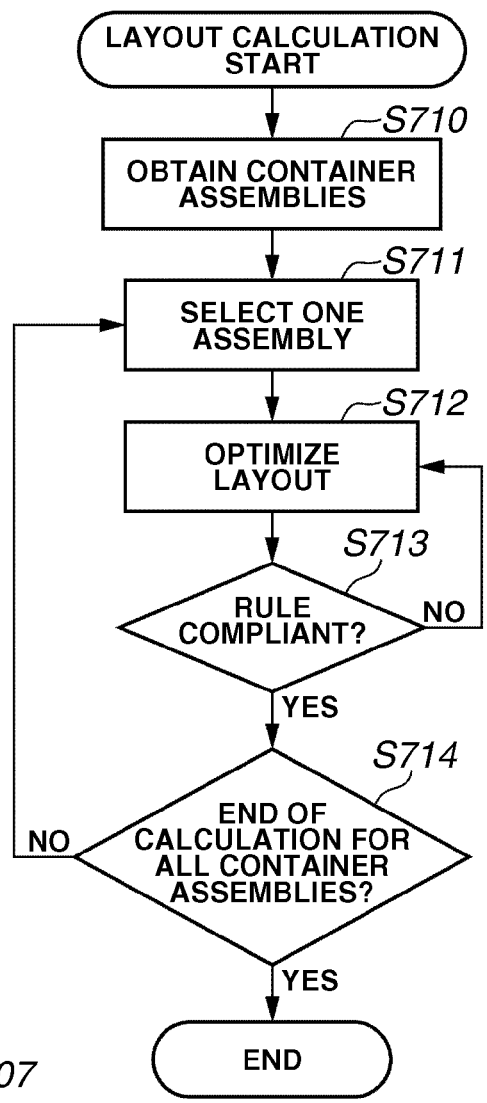
Figure 8A:
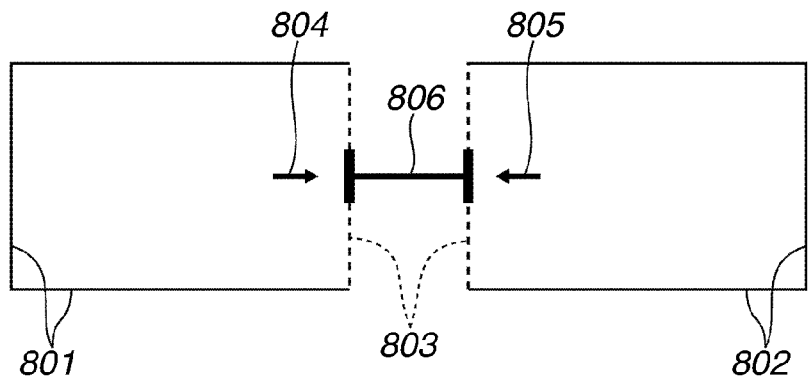
FIGS. 8A to 8C illustrate a UI relating to the flowcharts illustrated in FIGS. 7A and 7B according to an exemplary embodiment of the present invention.
Figure 8B:
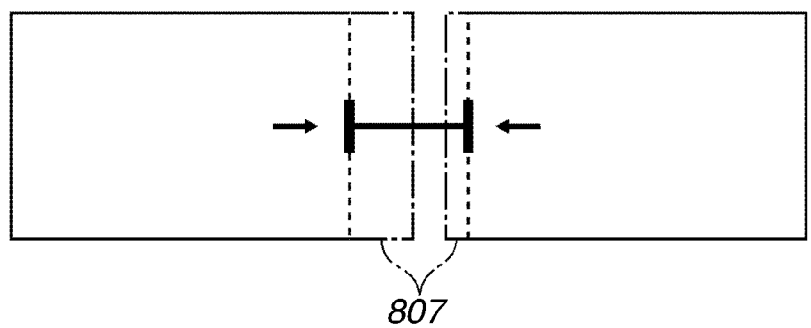
Figure 8C:
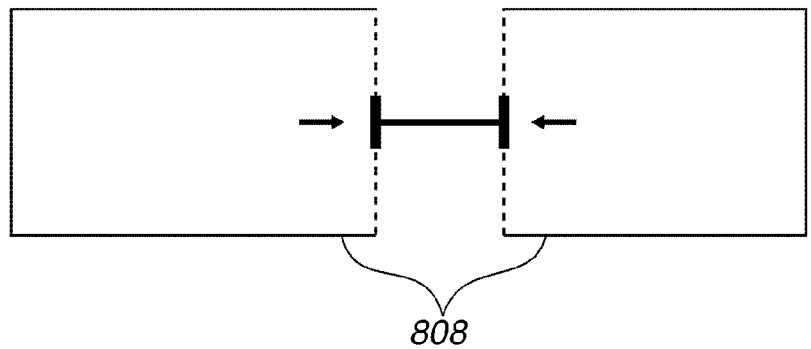

FIG. 7B is a flowchart illustrating details of the layout calculation processing performed in step S703 of FIG. 7A. FIGS. 8A to 8C illustrate exemplary display of calculated layout.

In step S710, the layout editing application 121 obtains assemblies of containers mutually related with the above-described link. The layout editing application 121 performs the layout calculation processing on each assembly of containers related with a link. In step S711, the layout editing application 121 selects one container assembly (i.e., a target of the layout calculation) from the container assemblies obtained in step S710.

In step S712, the layout editing application 121 calculates and optimizes a layout of the container assembly selected in step S711. As an exemplary processing in step S712, the layout editing application 121 determines an optimum container size that can minimize a difference between the size required for content data positioned in a container and the result of a container size obtained from the layout calculation.

In step S713, the layout editing application 121 determines whether the layout result optimized in S712 is compliant with the layout rules. If the layout editing application 121 determines that the layout result is incompliant with the layout rules (NO in step S713), the processing flow returns to step S712. The layout rules described in step S713 include constraints set by a user to create a document template. For example, a user may set constraints relating to the size of container, position of container, state of each side-part of container, and the length of link. The layout of each assembly can be regarded as complete if a calculated layout is compliant with the rules. In step S714, the layout editing application 121 determines whether the processing of steps S711 to S713 has been completed for all container assemblies obtained in step S710. Through the layout calculation processing illustrated in FIG. 7B, the layout editing application 121 obtains a layout of an entire page.

FIG. 8A illustrates an exemplary layout determined by inserting content data of a record into a container, including stationary side-parts 801 and 802, variable side-parts 803, arrows 804 and 805 indicating movable directions of the variable side-parts 803, and a link 806.

In this state, a user can change the records in respective containers. For example, a user pours content data of other record having a different size into each container. FIG. 8B illustrates a size of new contents overlapping with the state of FIG. 8A, with dotted lines 807 indicating areas of contents inserted in respective containers.

FIG. 8C illustrates a result of the layout calculation. The layout editing application 121 calculates a size of each container so that the calculated result has a difference similar to the size of contents inserted in each container and also is compliant with the above-described rules. As shown in FIG. 8C, the size (807) of the contents to be inserted in FIG. 8B and the size (808) of contents after calculation have similar differences.

According to the layout calculation processing performed based on similar differences, no problem occurs as long as the layout calculation is performed only in the horizontal direction as illustrated in FIGS. 8A to 8C. However, a problem may arise if the layout calculation is performed in both vertical and horizontal directions as illustrated in FIG. 33.

Figure 33:
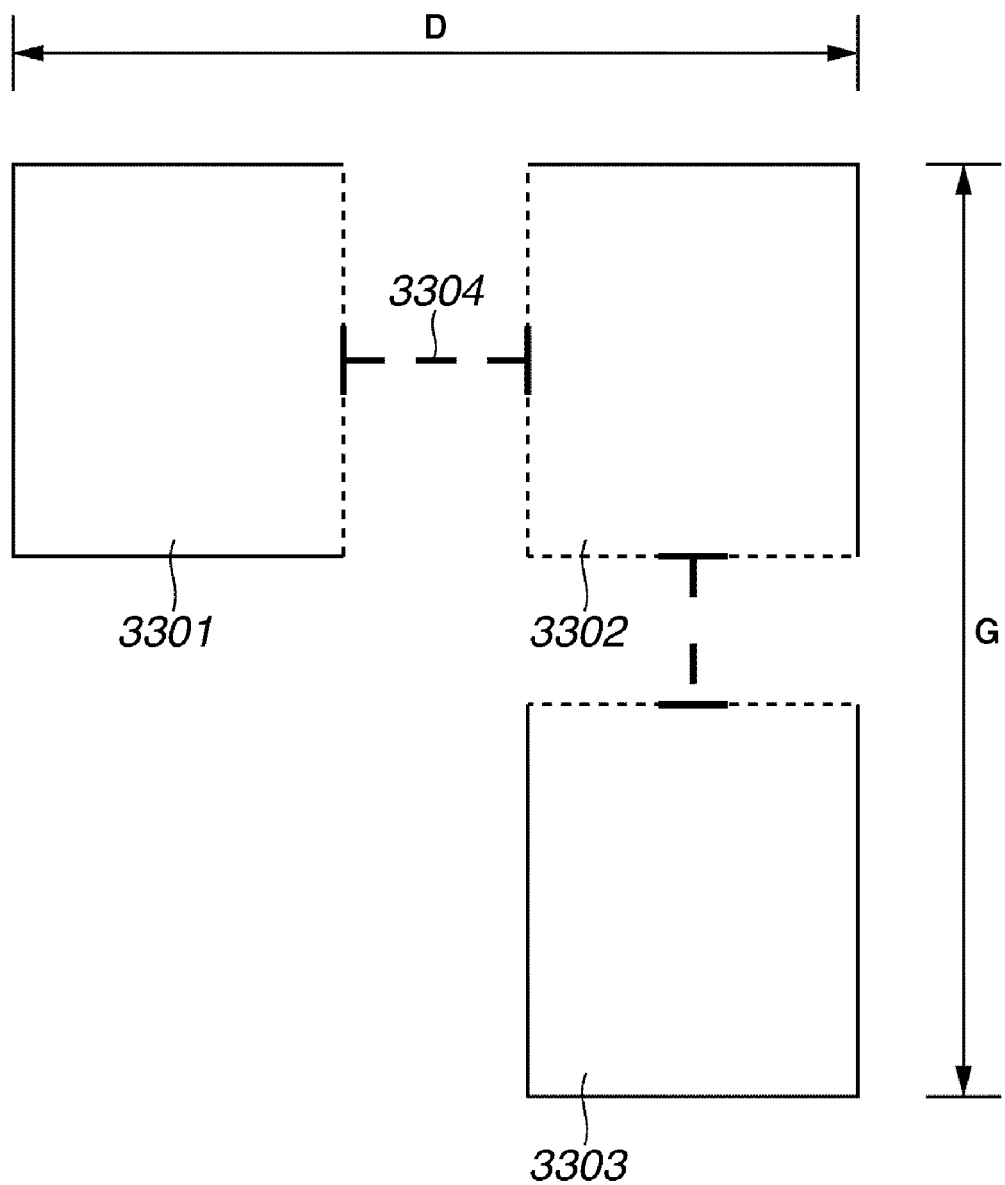
FIG. 33 illustrates an example of the layout calculation processing.

According to an example illustrated in FIG. 33, a two-dimensional layout is adjustable in both horizontal and vertical directions. Using the layout calculation method illustrated in FIG. 7B, the layout editing application 121 first performs an adjustment in the horizontal direction and next performs an adjustment in the vertical direction. Namely, the layout editing application 121 adjusts a horizontal size so that two containers 3301 and 3302 are positioned within a setting range "D" according to the above-described procedure. Then, the layout editing application 121 adjusts a vertical size so that the containers 3302 and 3303 are positioned within a setting range "G."

However, if a horizontal adjustment is first performed and a vertical adjustment is next performed, a layout result may differ from a fundamental layout that a user desires.

Therefore, to obtain a layout of each container resembling a fundamental pattern, the layout editing application 121 can obtain differences in width and height between the fundamental pattern and an adjusted layout and then add a square of the obtained width difference and a square of the obtained height difference. The layout editing application 121 can repeat the above calculations for each container. The fundamental pattern of a container may be defined with layout design values, such as a container size and an aspect ratio of the container.

Then, the layout editing application 121 calculates a width and a height of each container that can minimize the summed-up squares of the differences (horizontal direction+vertical direction) of each container. By performing the layout adjustment using the above-described least squares method, the layout editing application 121 can determine an optimum layout result similar to the fundamental layout being set by a user.

A flexible link 3304 interposing between two containers 3301 and 3302 has a variable link size according to the volume of content data poured into respective containers. The layout editing application 121, when associated with such a layout adjustment unit, can adjust the location (position) of a plurality of partial display areas (containers) according to the allocated size of data.

The above-described least squares method is a mere example of the layout adjustment algorithm. The layout adjustment algorithm may include cubic or biquadratic data.

The flexible link 3304 has a link length changeable in the layout calculation processing executed based on content data allocated to each container. According to a conventional fixed link, if the content data to be positioned in the containers 3301 and 3302 are larger in size compared to the present size of respective containers, the size of the content data is forcibly reduced because the conventional fixed link cannot change its length. However, the flexible link 3304 can expand or contract within a setting range. If the inserted content data has a large size as described above, the length of the flexible link 3304 contracts so that the content data can be positioned in the expanded container while the size of the content data remains unchanged.

Figure 9:
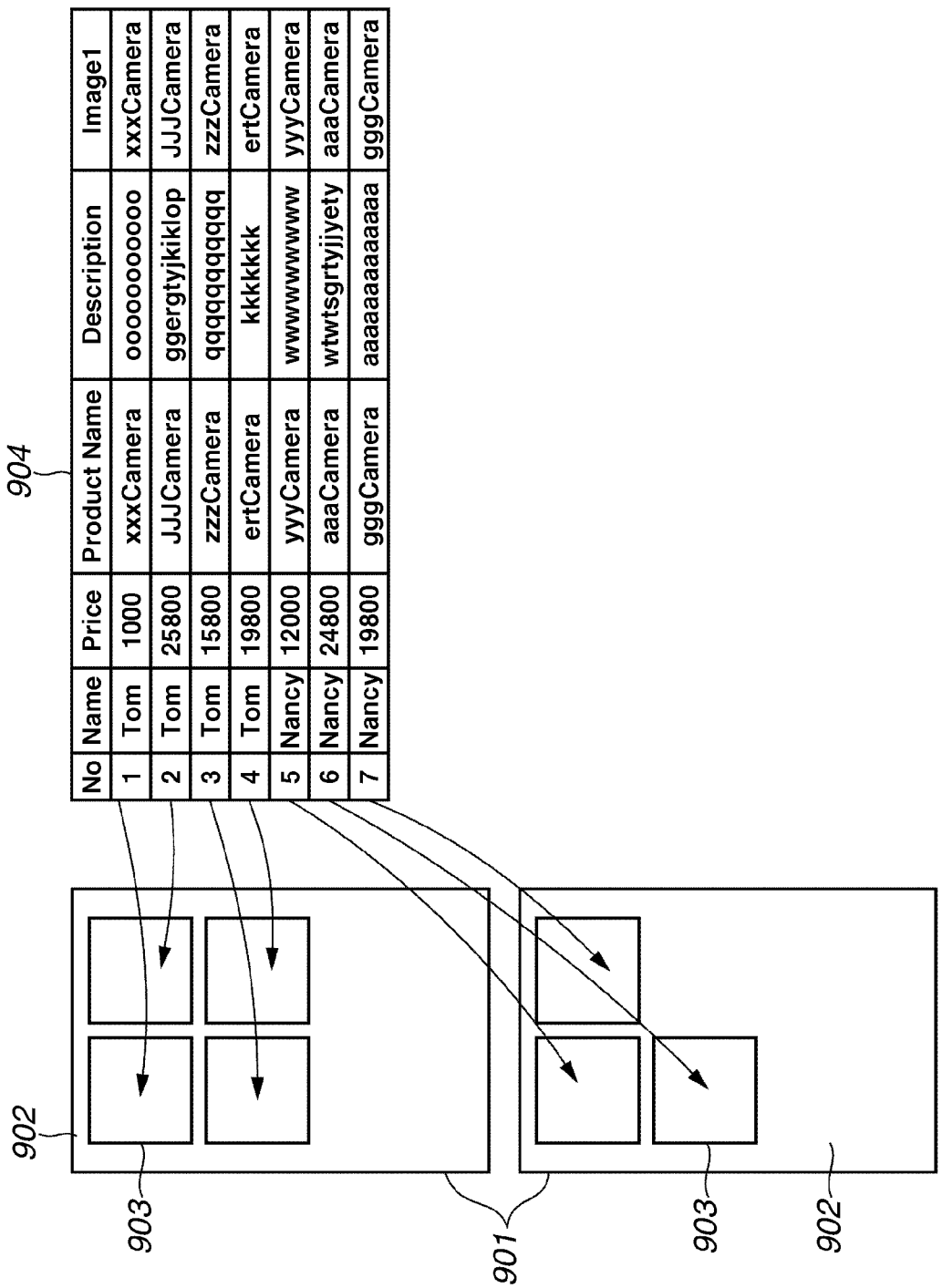
FIG. 9 illustrates a multi-record according to an exemplary embodiment of the present invention.

FIG. 9 illustrates an exemplary multi-record and its layout method. The multi-record indicates a state where one document includes a plurality of records inserted. According to an ordinary document template, one record corresponds to one document.

Figure 13:
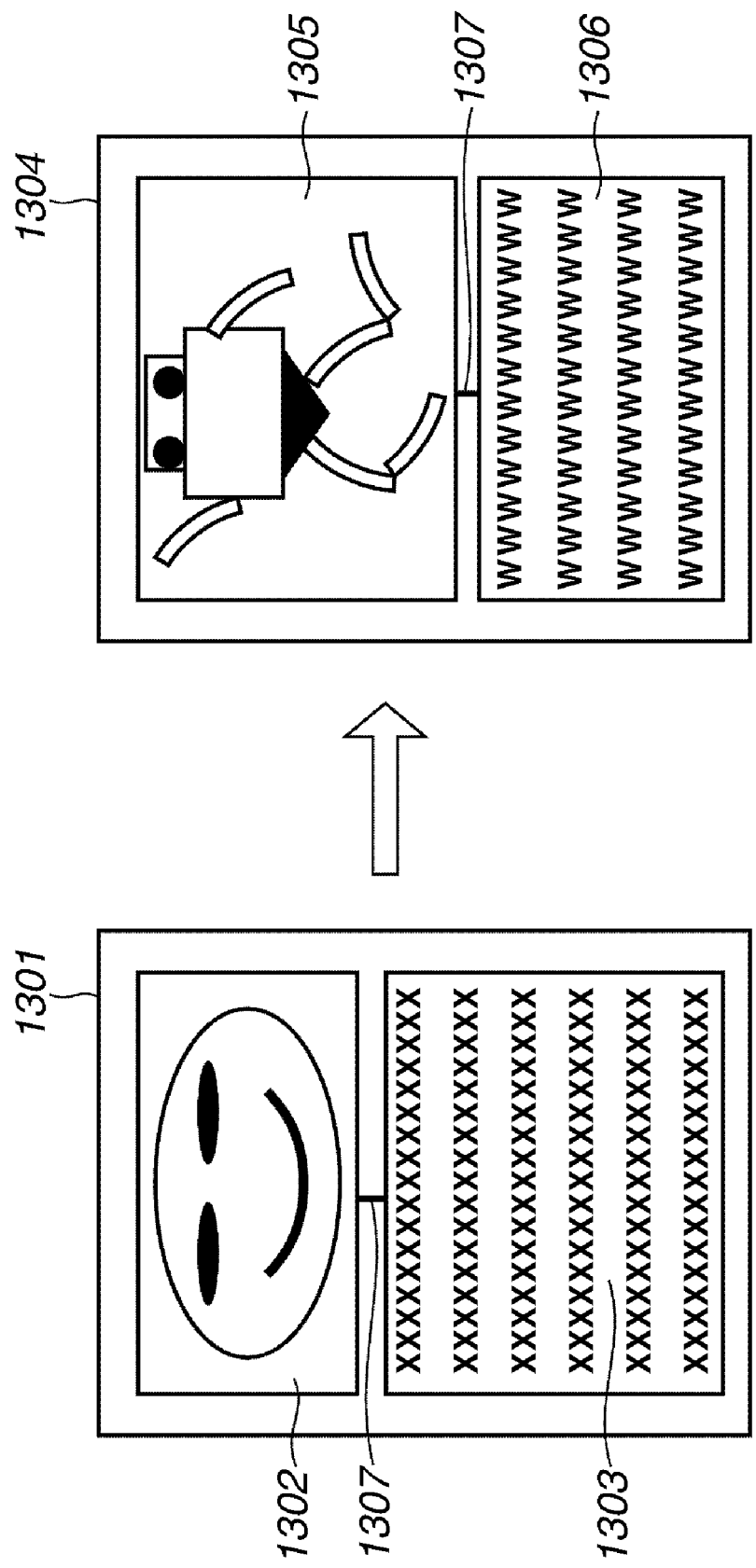
FIG. 13 illustrates a sub-template according to the first exemplary embodiment.

However, multi-records corresponding to a sub-template described later with reference to FIG. 13 are continuously poured into containers of the same document unless a brake (i.e., a change point of a reference item) appears. Therefore, one document can include plural records inserted in this manner. It is thus desirable that a multi-record database of variable data corresponding to the sub-template is different from a database of variable data corresponding to an ordinary document template.

An example illustrated in FIG. 9 includes a document template 901, pages 902, sub-templates 903, and a database 904. The database 904 stores records of Nos. 1-7. If a variable print of one record/one document is performed, seven documents can be created from seven records.

On the other hand, the variable print supporting multi-records performs the following processing.

First, a user selects a specific item that determines a braking point. In the example illustrated in FIG. 9, it is now assumed that a user designates the field name (Name).

Two or more records, if identical in the designated item, are positioned on the same document. According to the example illustrated in FIG. 9, records of Nos. 1-4 have the same field name "Tom." Therefore, the variable print processing includes locating the content data of records of Nos. 1-4 on the same document template and executing a layout calculation on them.

The records of Nos. 5-7 have the same field name "Nancy." The variable print processing locates the content data of records of Nos. 5-7 on a different document while using the same document template. Namely, the layout editing application 121 first completes a document relating to "Tom" and next creates a document relating to "Nancy." In this manner, according to the multi-record layout system, the layout editing application 121 can flexibly create new documents in response to a change in the specific item.

Figure 10:
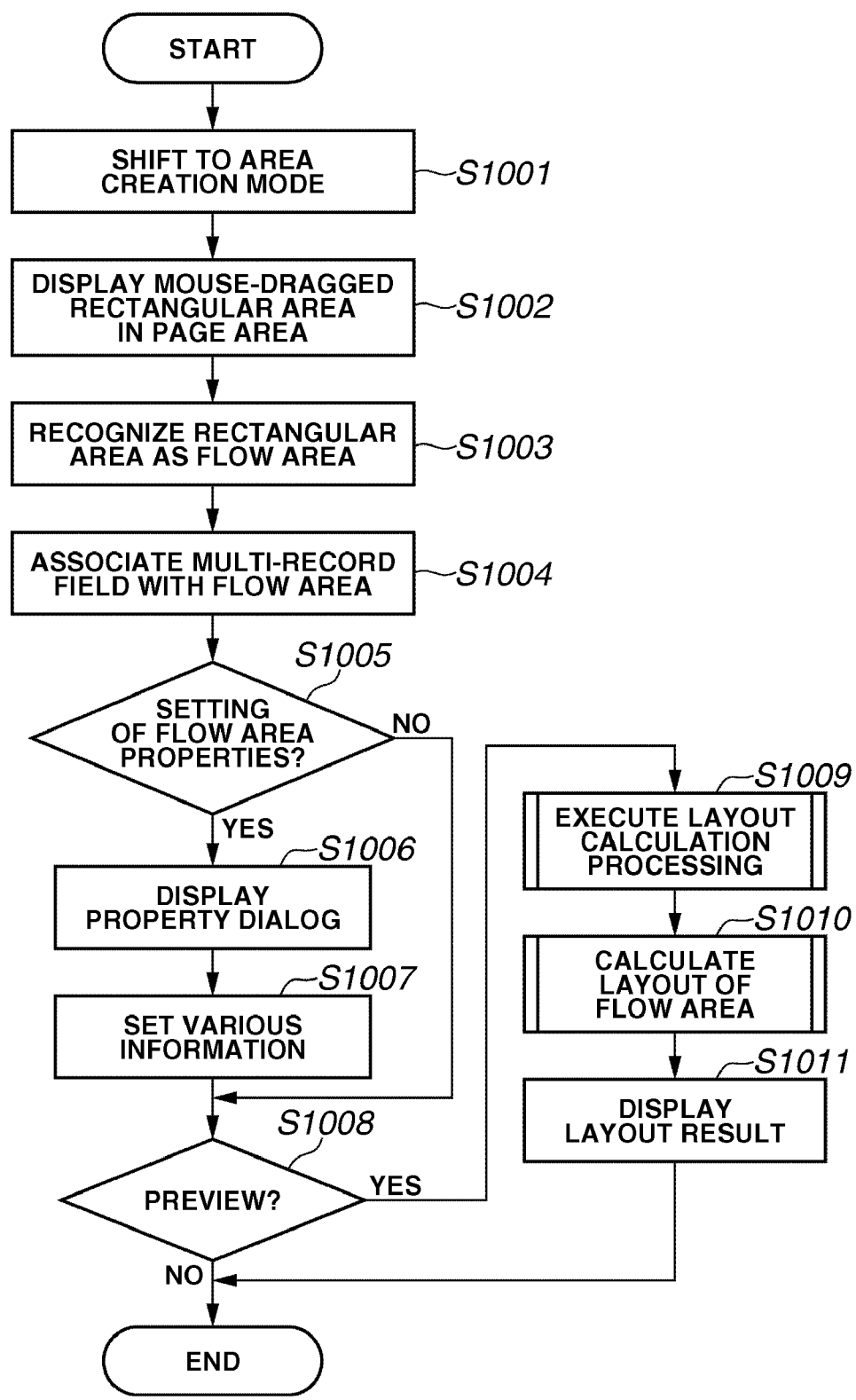
FIG. 10 is a flowchart illustrating overall processing according to a first exemplary embodiment of the present invention.
Figure 11:
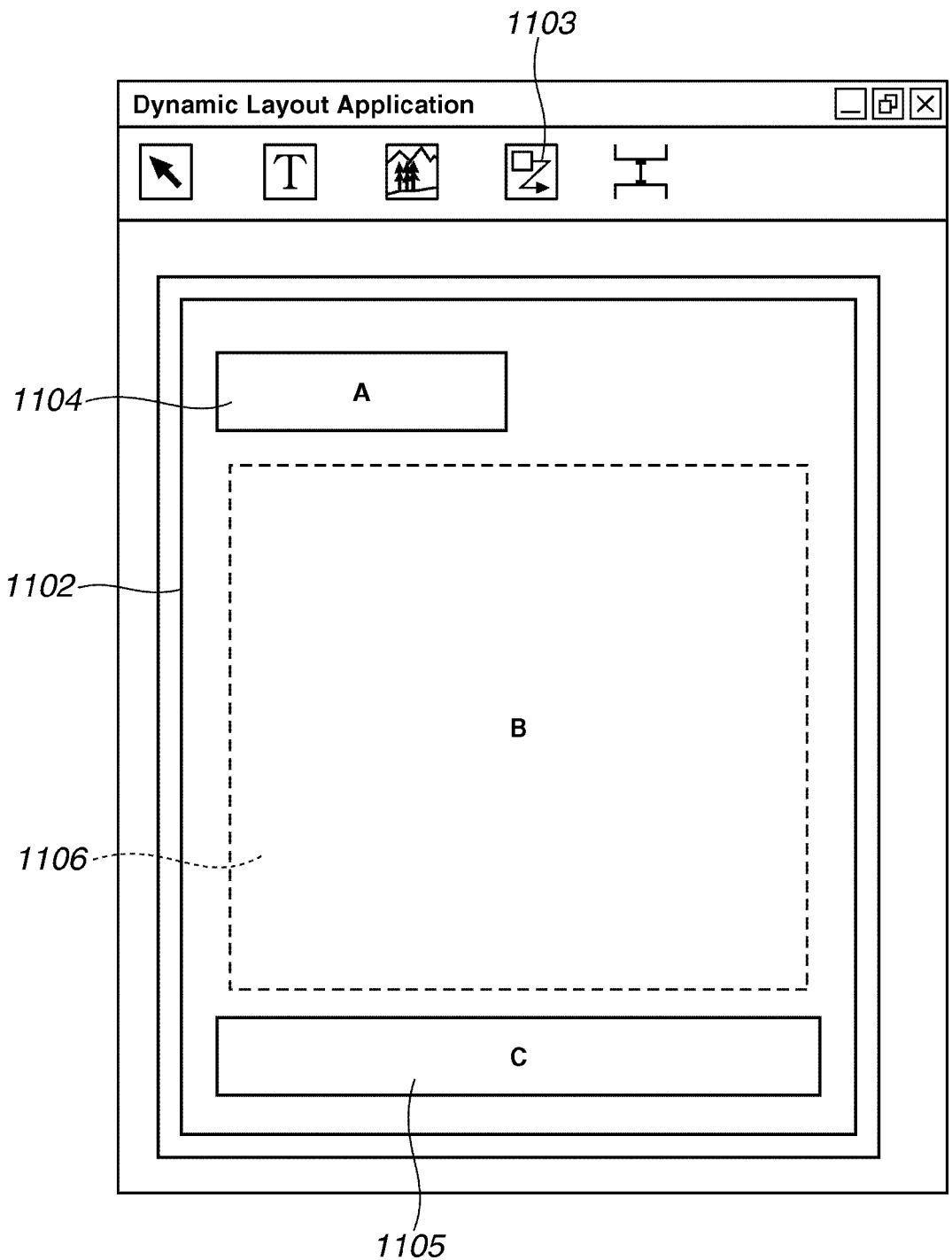
FIG. 11 illustrates a flow area according to the first exemplary embodiment.

FIG. 10 is a flowchart illustrating exemplary processing performed by the layout editing application 121 in template creation mode. FIG. 11 illustrates an exemplary UI used in the processing of FIG. 10. The layout editing application 121 displays the screen of FIG. 11 (except rectangles 1104, 1105, and 1106) if a user inputs a new template creation instruction. The layout editing application 121 initiates the procedure of FIG. 10 in response to the user's instruction.

In step S1001, the layout editing application 121 shifts to a flow area creation mode when a user presses an icon 1103 illustrated in FIG. 11.

In step S1002, the layout editing application 121 displays a rectangular flow area 1106 that a user has instructed by dragging on a page marginal area 1102 with a mouse.

In step S1003, the layout editing application 121 stores position/size information of a mouse-dragged rectangular area into the memory unit 136. The stored information is referred to as position/size information of the flow area 1106 (i.e., as part of template data). Similarly, the layout editing application 121 stores position/size information of containers 1104 and 1105 as part of the template data into the memory unit 136. The expression of flow area 1106 can be differentiated, in color or line type of a rectangular UI, from those of the containers 1104 and 1105.

In step S1004, the layout editing application 121 relates a multi-record field with the created flow area. For example, if a specific database stores target content data to be inserted into the flow area, the layout editing application 121 can relate a database name with the created flow area. In this case, the layout editing application 121 specifies an object flow area and inputs necessary information according to a predetermined operation flow. The memory unit 136 stores the input information as multi-record information of template data.

Figure 12:
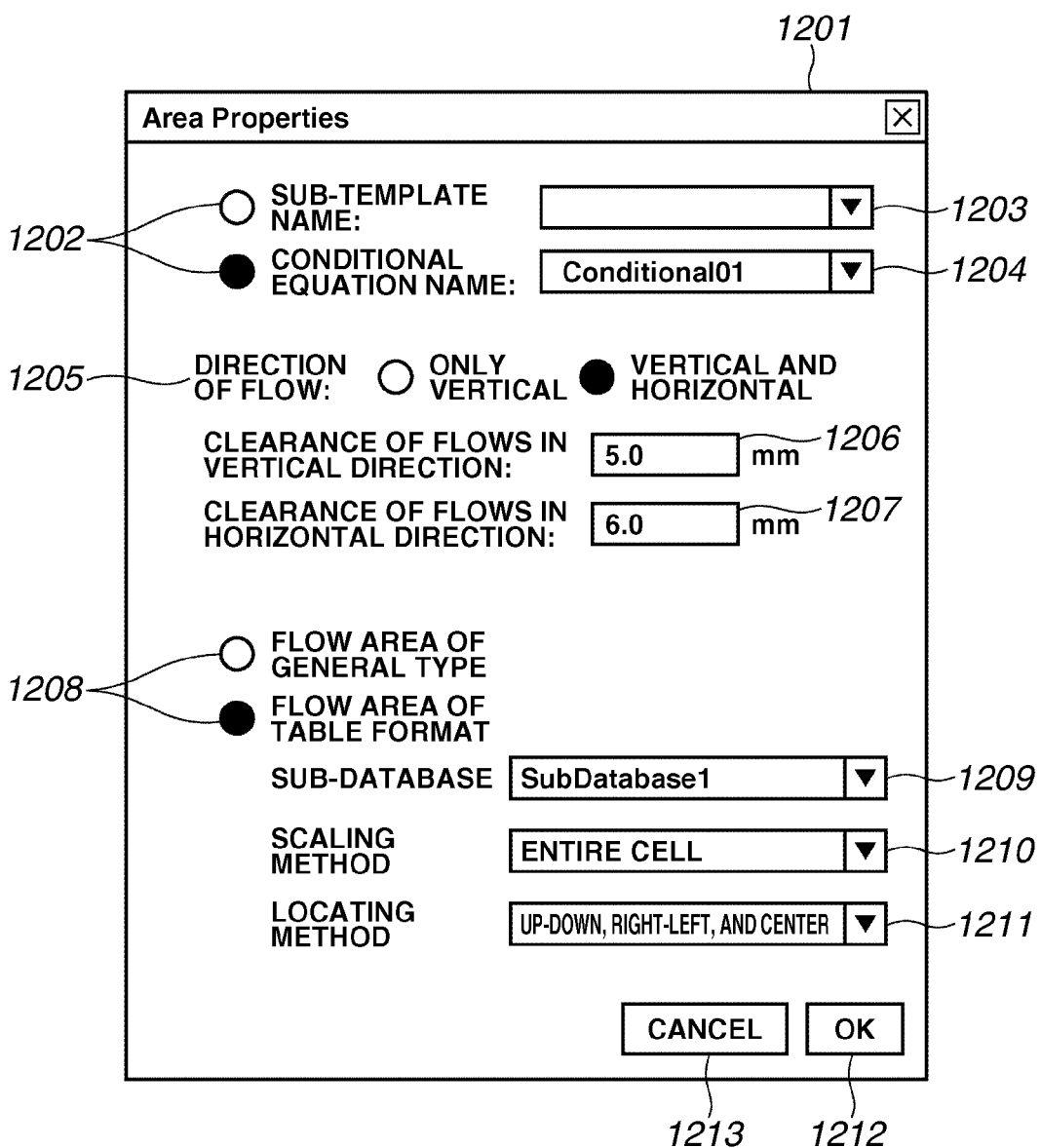
FIG. 12 illustrates a flow area setting dialog according to the first exemplary embodiment.

In step S1005, the layout editing application 121 determines whether a user requests setting of the created flow area. If a user requests setting (YES in step S1005), the processing flow proceeds to step S1006. In step S1006, the layout editing application 121 displays a property dialog (FIG. 12). For example, when a user moves a mouse pointer to the flow area and clicks on the flow area, the layout editing application 121 can determine that a user wants to input setting information.

Then, in step S1007, the layout editing application 121 recognizes the contents entered by a user using the property dialog displayed and sets setting information. The memory unit 136 stores the setting information.

If the layout editing application 121 completes the flow area creation and setting processing, the processing flow proceeds to step S1008. In step S1008, the layout editing application 121 confirms whether a user requests a preview of the layout. If a user requests a preview of the layout (YES in step S1008), the processing flow proceeds to step S1009. In step S1009, the layout editing application 121 shifts to the preview mode and executes layout calculation processing according to a procedure similar to the flowchart of FIG. 7B.

In step S1010, the layout editing application 121 calculates a layout of the flow area set in step S1003 as described later with reference to FIG. 34. In step S1011, the layout editing application 121 displays a layout result.

Namely, the host computer has a flow area to which a user can set extraction condition(s). The layout editing application 121 refers to the extraction condition(s) when layout editing application 121 extracts content data (i.e., a target of the layout calculation) from a database. The host computer locates the sub-templates together with extracted content data in the flow area and determines the layout calculation.

FIG. 12 illustrates an exemplary setting dialog that enables a user to perform various settings (property settings) for a flow area. The layout editing application 121 displays the setting screen of FIG. 12 when the layout editing application 121 executes the processing of step S1006 illustrated in FIG. 10.

First, a user selects a radio button 1202 of either a sub-template or a conditional equation as a target to be related with the flow area. If the user selects a radio button 1202 of the sub-template, then the user designates a name of the sub-template to be used for the flow area from a list box 1203.

Figure 15:
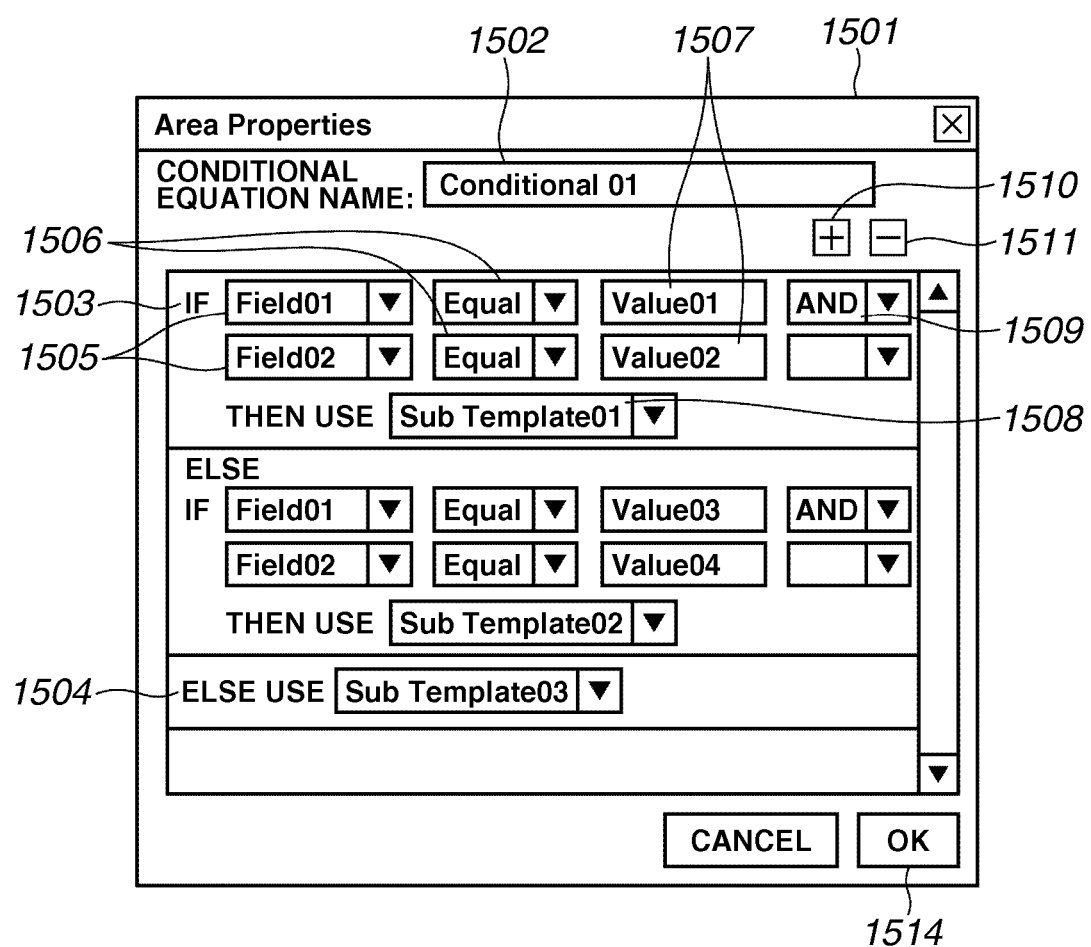
FIG. 15 illustrates a conditional equation setting screen according to the first exemplary embodiment.

If the user selects a radio button 1202 of the conditional equation, then the user designates a name of the conditional equation to be used for flow area from a list box 1204. A user can use a unique UI to create the sub-template or the conditional equation independently at a predetermined place in a document template that is currently edited or outside the template. FIG. 15 illustrates an exemplary UI enables a user to set a conditional equation. However, as another method, a user may access another file that stores an intended sub-template or conditional equation and can select (designate) the file using the setting dialog.

The present exemplary embodiment allows a user to create plural sub-templates and conditional equations in each flow area of a document template. It is useful that each of the sub-templates and the conditional equations can be selected from a corresponding list box with reference to a unique name.

Furthermore, the setting dialog of FIG. 12 includes a selection field 1205 that enables a user to designate a direction of flow when sub-templates are poured into the flow area (i.e., the direction along which contents are arrayed). A numerical value in a setting field 1206 defines the clearance of flow contents in the vertical direction. A numerical value in a setting field 1207 defines the clearance of flow contents in the horizontal direction.

A user can select a radio button 1208 of either a "general flow area" or a "table format flow area" on the setting dialog of FIG. 12. If a user selects the "table format flow area", the layout editing application 121 executes layout processing on the flow area according to a table format.

Furthermore, the setting dialog of FIG. 12 includes a field 1209 that enables a user to designate a sub-database name when the user selects the table format layout because the table format layout processing obtains information by referring to a sub-database different from the main database. In this embodiment, it is assumed that a sub-template constitutes a field in the main database and can be identified by a file name of the database. However, other method may not use a file name to designate a sub-database.

A field 1210 enables a user to set a scaling (enlarging/reducing) method in each cell of the flow area. A field 1211 enables a user to set a location (position) of a sub-template in the cell.

A user can press an OK button 1212 to finalize the determined contents of the above-described settings or press a cancel button 1213 to clear all setting data.

Figure 34:
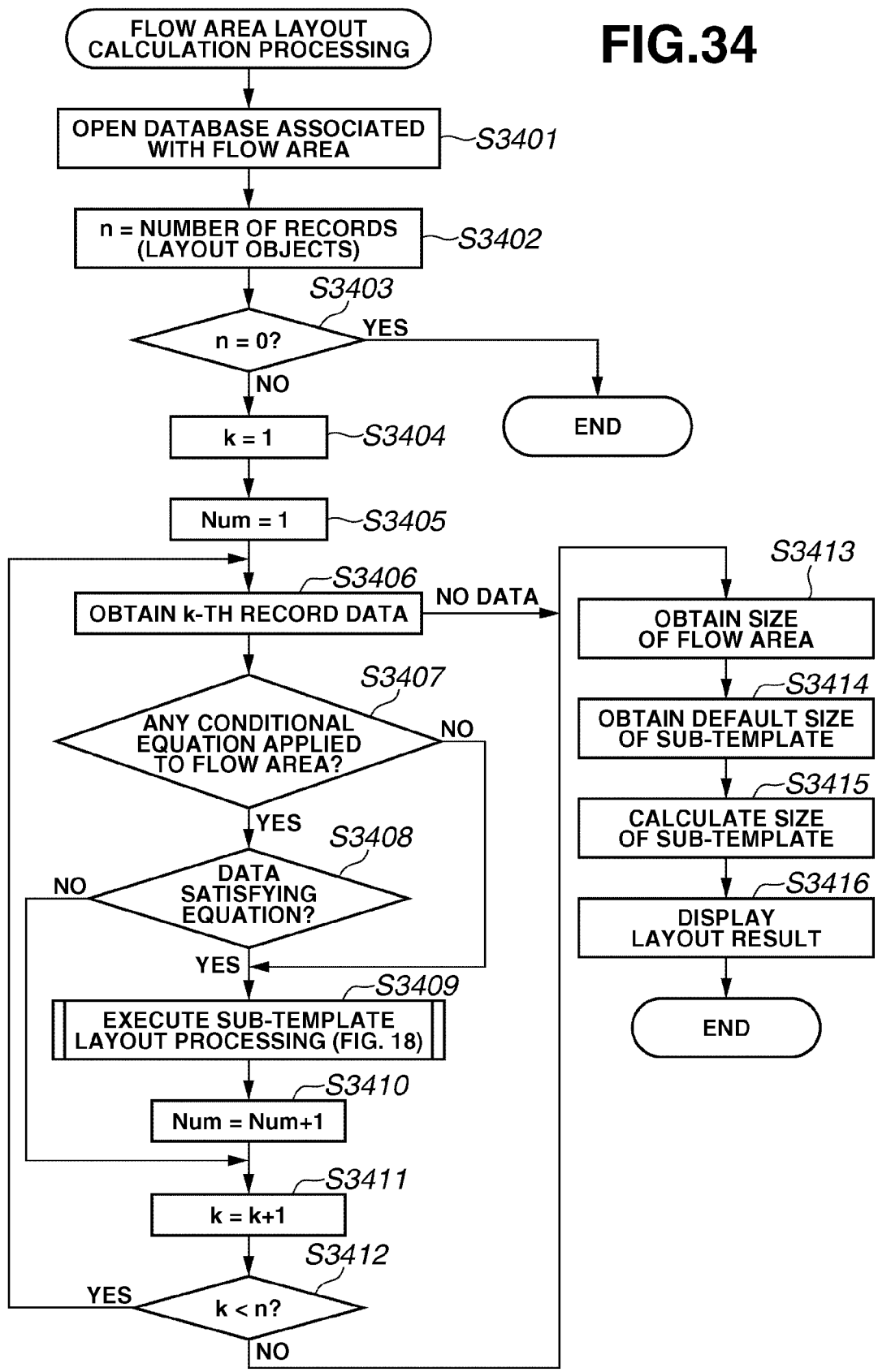
FIG. 34 is a flowchart illustrating exemplary flow area layout calculation processing.

FIG. 34 is a flowchart illustrating exemplary flow area layout calculation processing, which corresponds to the processing of step S1010 illustrated in FIG. 10. According to a procedure of FIG. 34, one flow area is set to one document template.

In step S3401, the layout editing application 121 opens a database related to the flow area. In step S3402, the layout editing application 121 inputs a total number of records to be poured into the flow area (i.e., layout objects) into a variable "n" set in the memory. In step S3403, the layout editing application 121 determines whether the variable n is 0, i.e., whether the number of records (i.e., layout objects) is 0. If the variable n is 0 (YES in step S3403), the layout editing application 121 terminates the processing of this routine. If the variable n is not 0 (NO in step S3403), the processing proceeds to step S3404.

Next, in step S3404, the layout editing application 121 inputs 1 to a variable k that indicates a total number of records being currently processed or having been already processed. In step S3405, the layout editing application 121 inputs 1 to a variable Num that indicates a total number of sub-templates disposed in the flow area.

In step S3406, the layout editing application 121 obtains k-th record data from the database. If the layout editing application 121 receives a notification informing that there is no corresponding data in the database, the processing flow proceeds to step S3413.

In step S3407, the layout editing application 121 determines whether a user has set any conditional equation to the flow area (target area) using the setting screen illustrated in FIG. 15. As already described about the multi-records, all records satisfying allocated extraction condition(s) are poured into the same flow area. The records satisfying the extraction condition(s) (i.e., conditional equation) correspond to the data related to the flow area. Namely, the layout editing application 121 obtains content data satisfying extraction condition(s) from the database.

If the layout editing application 121 determines that a user has set a conditional equation to the flow area (YES in step S3407), the processing flow proceeds to step S3408. In step S3408, the layout editing application 121 determines whether the data obtained in S3406 satisfies the conditional equation being currently set. If the determination result is NO in step S3407 or YES in step S3408, the processing flow proceeds to step S3409. In step S3409, the layout editing application 121 executes layout processing for pouring content data included in the k-th record into a container of the sub-template.

If the database is searchable with a conditional equation related to the flow area, the layout editing application 121 can extract a record with reference to the conditional equation in step S3406. In this case, any record extracted according to the conditional equation satisfies the condition(s) allocated to the flow area. If a user can further set conditions for finely searching records satisfying the conditional equation, the layout editing application 121 can extract records according to these conditions in step S3406. In this case, the determination of step S3408 is essentially required. If the database is not searchable, the layout editing application 121 successively obtains records in step S3406.

After the layout editing application 121 completes the sub-template layout processing (i.e., the processing for pouring records into a container of the sub-template), the processing flow proceeds to step S3410. In step S3410, the layout editing application 121 increments the variable Num by 1. In step S3411, the layout editing application 121 increments the variable k by 1 to move on to the next record.

If the editing application 121 determines that the data obtained in S3406 does not satisfy the conditional equation being currently set (NO in step S3408), the processing flow proceeds to step S3411 to obtain the next record. Namely, the layout editing application 121 cancels the layout processing if the data of an obtained record does not satisfy the condition(s).

In step S3412, the layout editing application 121 determines whether the variable k is less than the total number "n" of records. If the variable k is less than n (YES in step S3412), the processing flow returns to step S3406 to repeat the processing on the k-th data. If the variable k is equal or greater than n (NO in step S3412), the layout editing application 121 terminates the processing for calculating a layout of records using sub-templates. The processing flow proceeds to step S3413 to initiate processing for locating the sub-templates having been subjected to the layout processing in the flow area.

In step S3413, the layout editing application 121 obtains the size of the flow area from the memory unit 136. In step S3414, the layout editing application 121 obtains a default size of each sub-template from the memory unit 136.

In step S3415, the layout editing application 121 calculates a size of the sub-template subjected to the layout processing of step S3409 according to an exemplary method described later with reference to FIGS. 35 and 36. In step S3416, the layout editing application 121 displays a layout result.

Figure 35:
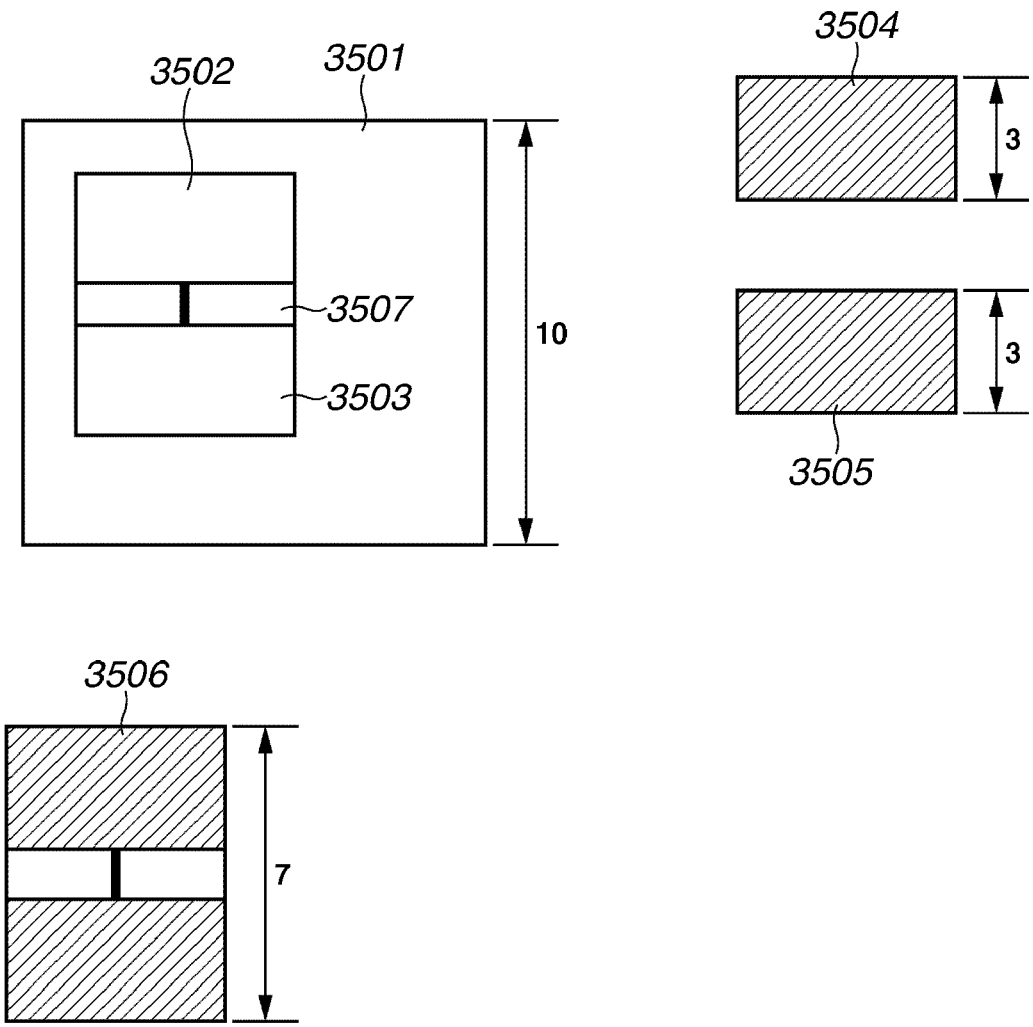
FIG. 35 illustrates exemplary processing for determining a sub-template size.

FIG. 35 illustrates an exemplary sub-template size determination method in a case where content data can be fully disposed in a limited area of a sub-template.

A sub-template 3507 including two containers 3502 and 3503 is located in a limited area 3501. The limited area 3501 is a fixed area within which the sub-template 3507 can be expanded.

Content data 3504 of a record and content data 3505 of another record accord with the extraction condition(s) allocated to the flow area. The content data 3504 is poured into the container 3502. The content data 3505 is poured into the container 3503. Two containers 3502 and 3503 are related with a link having a size of "1."

The limited area 3501 has a size of "10." Each of content data 3504 and 3505 has a size of "3" that is smaller than the size of the limited area 3501. In other words, the content data 3504 and 3505 can be entirely included in the limited area 3501 and the size of respective content data remains the same.

The sub-template has a size 3506 of "7" when the content data 3504 and 3505 are poured into the sub-template.

Figure 36:
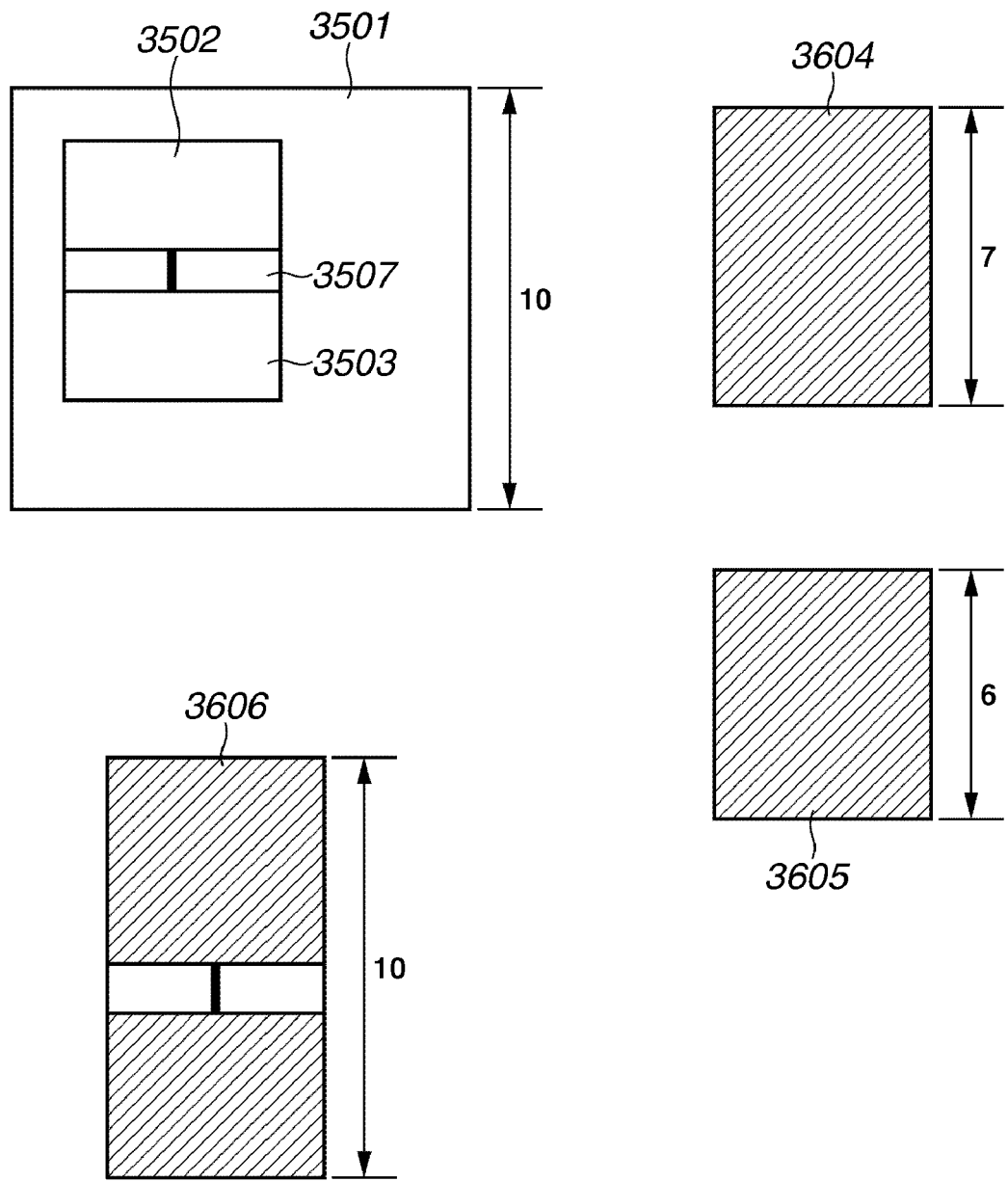
FIG. 36 illustrates exemplary processing for determining a sub-template size.

FIG. 36 illustrates an exemplary sub-template size determination method in a case where content data cannot be entirely included in a limited area of a sub-template.

A sub-template 3507 including two containers 3502 and 3503 is located in a limited area 3501 in FIG. 36 similar to FIG. 35.

Content data 3604 of a record and content data 3605 of another record accord with the extraction condition(s) allocated to the flow area. The content data 3604 is poured into the container 3502. The content data 3605 is poured into the container 3503.

The limited area 3501 has a size of "10." The content data 3604 has a size of "7" and the content data 3605 has a size of "6." In other words, a total size of the content data 3604 and 3605 is "13" which exceeds the size of the limited area 3501. In other words, the content data 3604 and 3605 cannot be fully disposed in the limited area 3501 if the size of respective content data remains the same.

Therefore, the layout editing application 121 determines a size of each container according to the method described with reference to the flowchart of FIG. 7B.

The sub-template 3507 includes two containers 3502 and 3503 related with a link having a length of "1." The limited area 3501 is a fixed area within which the sub-template 3507 can be expanded.

As described above, two content data 3604 and 3605 have a total size of "13" which exceeds the maximum size (=10) of the sub-template 3507. If the content data is forcibly poured into each container, the forcible operation generates a significant stress (i.e., a load in layout).

Namely, the content data 3604 has an actual size (ideal size) of "7" and the content data 3605 has an actual size (ideal size) of "6."

More specifically, a vertical size of 13 (=7+6) is required to insert the content data into each container if the ideal size is maintained. However, the variable size of the sub-template 3507 cannot exceed 10.

Thus, the layout editing application 121 divides the above-described stress between two containers 3502 and 3503. An automatic layout system according to an exemplary embodiment calculates a distribution of stresses using the least squares method that can minimize a stress applied to each container.

If "a" represents a calculated size of the container 3502 and "b" represents a calculated size of the container 3503, the following formula expresses a cost k that is equal to a sum of squares with respect to the stress of respective containers.

$$k=(a-7)^2+(b-6)^2 \qquad (1)$$

According to the automatic layout system, each container has a same priority and the following equation defines a condition that minimizes the cost k.

$$a-7=b-6 \qquad (2)$$

Furthermore, the size of a calculated layout satisfies the following equation.

$$a+b+1(\text{link size})=10 \qquad (3)$$

The layout editing application 121 calculates an optimum size of each container so as to satisfy the equations (2) and (3). According to the example illustrated in FIG. 36, the layout editing application 121 obtains a stress of 2 acting on each container when the container 3502 has a size of 5 and the container 3503 has a size of 4.

The sub-template 3507 has a size of "10" which is equivalent to a circumscribed rectangle encompassing the determined layout areas of the containers 3502 and 3503 (3606 in FIG. 36).

Namely, the layout editing application 121 determines an optimum size of each container (partial display area) set in a sub-template, when content data is allocated, considering a required size of the content data. Then, the layout editing application 121 determines a preferable size of the sub-template according to the determined container size.

As described with reference to the examples illustrated in FIGS. 35 and 36, the layout editing application 121 determines the size of each sub-template according to the size of contents poured into a container in the sub-template. Therefore, respective sub-templates may have different sizes.

If plural sub-templates are mutually different in size and simply arrayed without any modification in size, an output result may be far from a well-organized layout similar to a table having a good balance in each of the vertical and horizontal directions.

Figure 14:
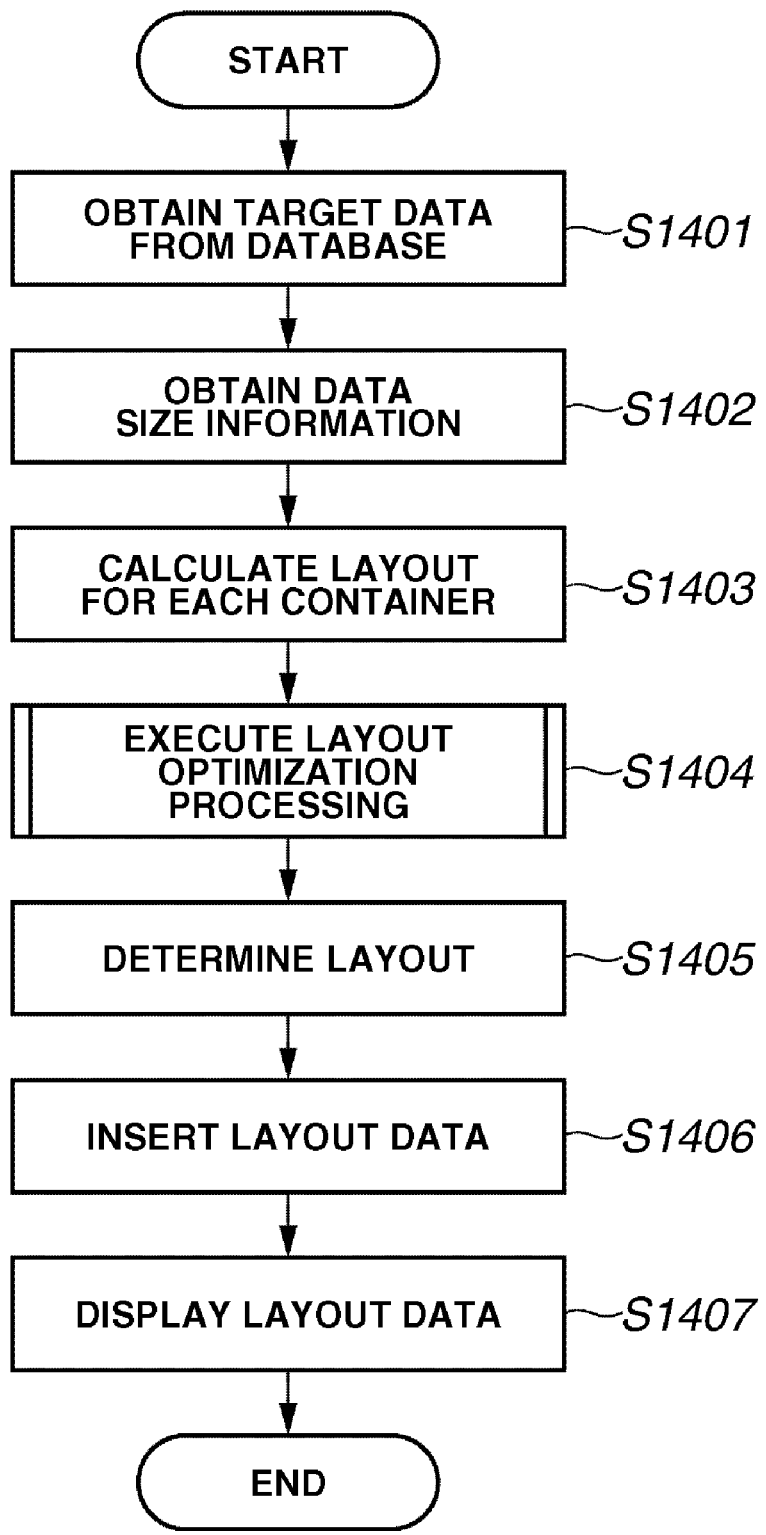
FIG. 14 is a flowchart illustrating sub-template layout processing according to the first exemplary embodiment.

FIG. 13 illustrates an exemplary layout of a sub-template. FIG. 14 is a flowchart illustrating detailed processing of step S3409 of FIG. 34.

A sub-template includes an arbitrary number of image and/or text containers. Each sub-template includes a container to which a user can allocate a data of a record (field) A sub-template is convenient for a user to repeatedly use the same layout in the same document.

Similar to the above-described image or text container, each sub-template includes a link that relates one container with another container.

Accordingly, the layout editing application 121 can appropriately change the layout/size of each sub-template according to content data of a layout object. The example of sub template 1301 and 1304 of FIG. 13 includes image containers 1302 and 1305, text containers 1303 and 1306, and a link 1307. The layout editing application 121 performs layout calculation processing for each record because each of image data and text data has a different size.

Then, the layout editing application 121 displays an optimum layout result.

FIG. 14 illustrates exemplary sub-template layout processing according to the present embodiment.

In step S1401, the layout editing application 121 obtains layout target data from the database. In step S1402, the layout editing application 121 obtains a size of content data allocated to each container of the sub-template. More specifically, the user interface 103 can obtain a data size by accessing and interpreting data in a database if the user interface 103 is related to the database. The layout editing application 121 can execute the processing of steps S1401 and S1402 concurrently. In the processing of step S1402, the layout editing application 121 can obtain the size of content data by analyzing information of the data obtained in step S1401. The memory unit 136 stores size information of the obtained content data.

In step S1403, the layout editing application 121 performs layout calculation processing for each container based on the data size obtained in step S1402. In step S1404, the layout editing application 121 performs layout optimization processing according to the method described with reference to FIGS. 7A and 7B and obtains an optimized layout result similar to those illustrated in FIGS. 35 and 36.

In step S1405, the layout editing application 121 determines a layout optimized in step S1404. In step S1406, the layout editing application 121 pours the layout target data into a corresponding container. In step S1407, the layout editing application 121 displays the layout data. The memory unit 136 temporarily stores the layout determined in step S1405.

The layout editing application 121 can omit the processing of step S1407 if the display executed when a document completes includes the display contents of step S1407.

An exemplary method for setting a conditional equation of a sub-template is described with reference to FIG. 15.

The setting screen of FIG. 15 enables a user to allocate plural sub-templates to the same flow area. A user can relate either a sub-template or a conditional equation to a flow area. In the present exemplary embodiment, a conditional equation has a function of extracting contents satisfying predetermined condition(s) from a database and can be referred to as extraction condition(s). The layout editing application 121 can create a template having a flow area to which a user can set desirable extraction condition(s).

If a user relates a sub-template with a flow area, the layout editing application 121 pours the obtained record into a container of the related sub-template. Alternatively, the layout editing application 121 can set a conditional equation when a user relates a sub-template with a flow area and can pour only the record satisfying the conditional equation into a sub-template related to the flow area.

A conditional equation includes identification information of a sub-template which is referred to in the authentication. FIG. 15 illustrates an exemplary UI that enables a user to set a conditional equation. The layout editing application 121 performs layout calculation processing on a sub-template into which a record is poured. When the layout calculation processing is completed, the layout editing application 121 locates a sub-template in a flow area.

The exemplary UI 1501 illustrated in FIG. 15 includes input areas of a text box 1502 and a pair of fundamental elements (i.e., IF statement 1503 and ELSE statement 1504). The text box 1502 enables a user to input a name of a conditional equation. The IF statement 1503 and the ELSE statement 1504 define conditions of determination.

An input area of the IF statement 1503 includes a list box 1505 that enables a user to select a field (i.e., an object of determination), a list box 1506 that enables a user to set a logical equation used in the determination, and a text box 1507 that enables a user to input a value used in the determination.

Furthermore, the input area of the IF statement 1503 includes two processing statements 1508 and 1504. The processing statement 1508 enables a user to designate a sub-template to which a record can be inserted if it satisfies the condition(s) of determination. The processing statement 1504 enables a user to designate a sub-template to which a record can be inserted if it does not satisfy the condition(s) of determination. A logical equation in the box 1506 may include various conditional expressions such as "EQUAL", "NOT_EQUAL", and "LESS_THAN."

Furthermore, the input area of the IF statement 1503 includes an AND/OR combo box 1509 that enables a user to further set a complicated conditional equation among IF statements.

Moreover, an ELSE_IF statement adding button 1510 enables a user to set a complicated conditional branch.

If a user presses the button 1510, the layout editing application 121 newly adds an ELSE_IF statement between the IF statement 1503 and the ELSE statement 1504. The contents and operations of the ELSE_IF statement are similar to those of the IF statement. When the IF statement is not true, the layout editing application 121 executes the determination according to the ELSE_IF statement. If the ELSE_IF statement is not true, the layout editing application 121 successively executes the determination according to other ELSE_IF statements and finally executes the determination according to the ELSE statement. A delete button 1511 enables a user to delete a selected ELSE_IF statement. If the IF statement or the ELSE_IF statement is evaluated as true, the layout editing application 121 executes a USE processing statement corresponding to the true statement. A user can input (select) a sub-template name in the USE processing statement.

As described above, when a user inputs a conditional equation, the layout editing application 121 automatically selects a sub-template that satisfies the condition(s) of each record including various values. Thus, the present exemplary embodiment can obtain various layouts from the same conditional equation. Furthermore, if a user relates the conditional equation with a flow area, the layout editing application 121 can locate two or more sub-templates having various layouts in the same flow area.

A user can press an OK button 1514 upon completing all entry of conditions. If a user presses the OK button 1514, the memory unit 136 stores the setting information (i.e., sub-template conditions set by a user using the UI). In this case, the memory unit 136 may store a text file expressing a sub-template conditional equation identical to a text described (selected) on the UI of FIG. 15 or any other information that can identify a sub-template when compared conditions match.

As described above, a conditional equation includes condition(s) that a user can designate to extract content data (i.e., layout target) from a database and sub-template(s) to be used when the condition(s) is/are satisfied. Accordingly, the memory unit 136 stores information indicating a relationship between extracted content data and an identified sub-template.

Figure 16:
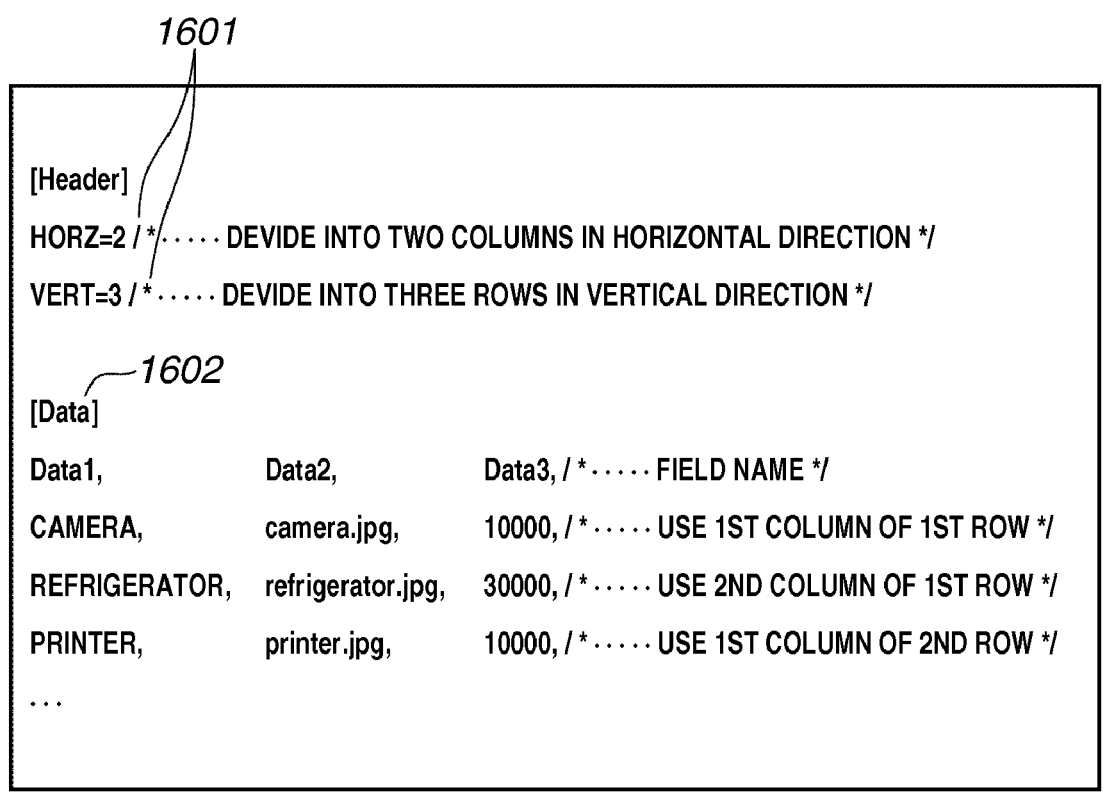
FIG. 16 illustrates a sub-database according to the first exemplary embodiment.

A table format flow area set by a user using the setting screen 1201 illustrated in FIG. 12 receives content data included in a record from a sub-database different from a main database that the template receives. FIG. 16 illustrates an exemplary sub-database.

The sub-database illustrated in FIG. 16 includes information/data described according to a text file format. A header portion 1601 designates that a flow area is divided into a plurality of area composed of two columns and third rows (i.e., a table including 2×3 cells).

A real data portion 1602 indicates real data poured into the flow area.

The real data portion 1602 includes a leading row that describes field names and succeeding rows that describe real data, which are described according to the comma separated value (CSV) format. FIG. 16 uses an expression "/* */" to add a comment about each data, although such a description is not necessary in actual use. The sub-database may use any other format that can indicate the number of divided flow areas and describe real data poured into the flow areas. According to the CSV format, a part of a field describes data representing the number of rows and columns and the rest of the field describes real data. As another useful format, the extensible markup language (XML) format is easy to describe necessary information.

When the format of a database allows a user to designate the number of rows and columns, one flow area can realize various expressions without editing the template.

Namely, according to user's preference, the flow area may have a table expression including 5 rows and 10 columns or a table expression including 10 rows and 5 columns, while the template itself remains unchanged. This is a great merit of using a sub-database. However, as a restricted example, the flow area properties setting screen illustrated in FIG. 12 may include an input element that enables a user to designate stationary numbers of rows and columns.

Figure 17:
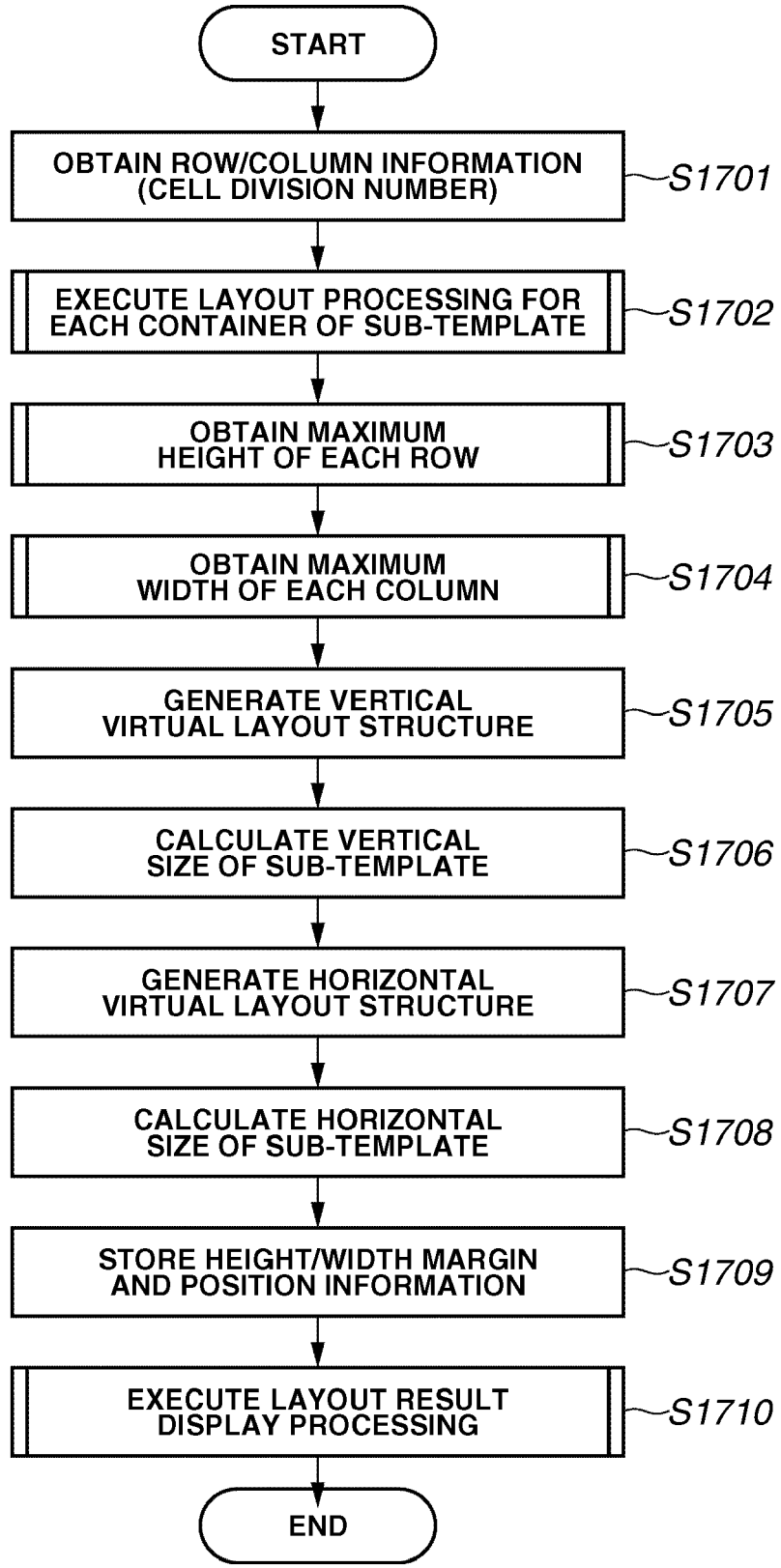
FIG. 17 is a flowchart illustrating layout calculation processing for a table format flow area according to the first exemplary embodiment.

FIG. 17 is a main flowchart illustrating layout calculation processing for a table format flow area according to the present exemplary embodiment. FIGS. 18 to 21 are sub flowchart of the layout calculation processing. These flowcharts describe exemplary table format layout processing performed on a flow area having table format attributes having been set by a user using the above-described setting screen of FIG. 12. An exemplary layout processing method is not limited to the embodiment as described above and any other appropriate method may be used to obtain similar results.

In step S1701, the layout editing application 121 obtains information of rows and columns constituting a layout target from a sub-database. For example, the layout editing application 121 obtains the number of rows and the number of columns or a total number of divided cells.

Figure 18:
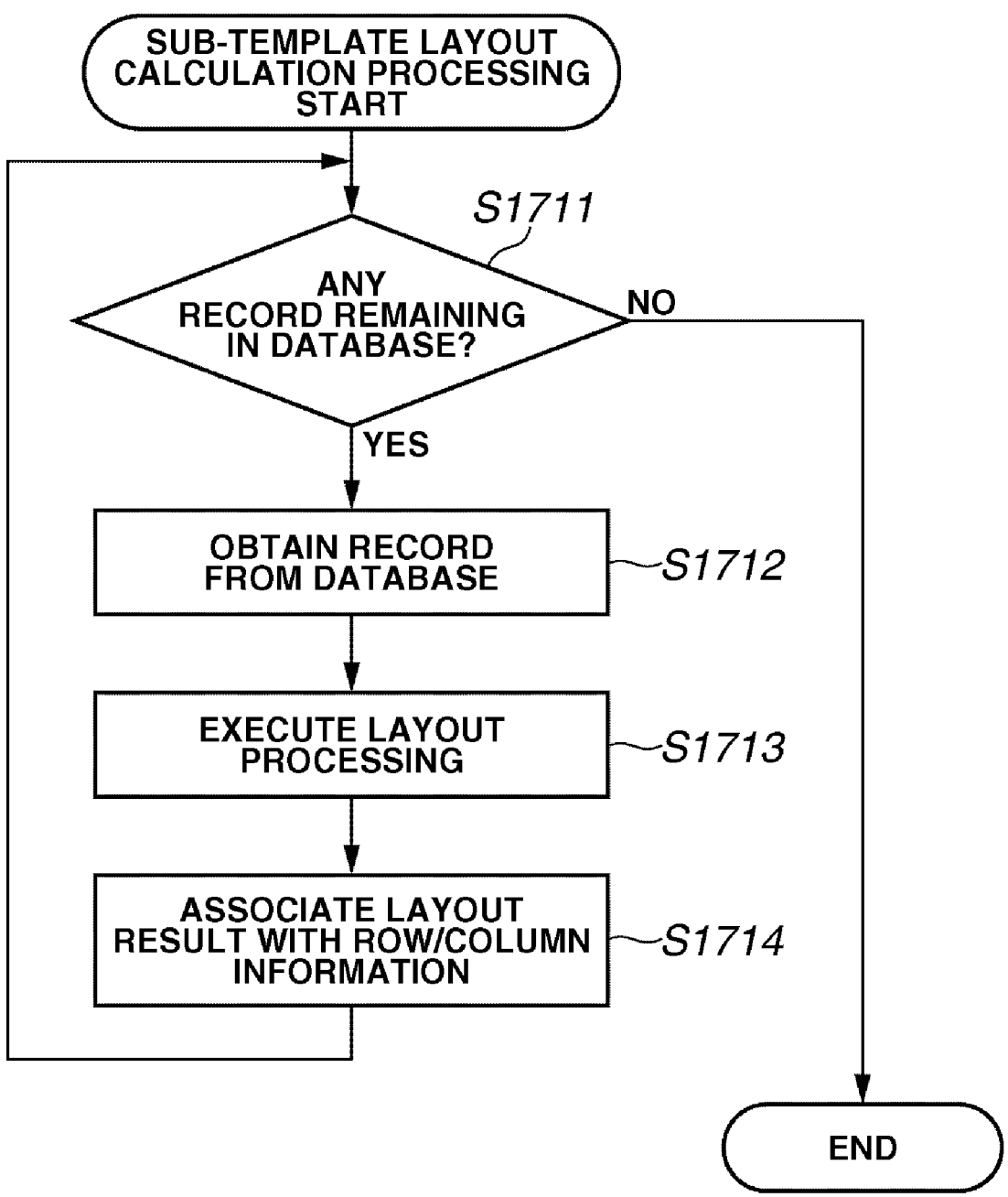
FIG. 18 is a flowchart illustrating sub-template layout calculation processing according to the first exemplary embodiment.

In step S1702, the layout editing application 121 executes layout processing for each container of a sub-template located in a flow area into which content data is poured. FIG. 18 is a flowchart illustrating details of the layout processing performed in step S1702.

In step S1711, the layout editing application 121 accesses the database and determines whether there is any record to be located in the sub-template. If the layout editing application 121 determines that there is a remaining record (YES in step S1711), the processing flow proceeds to step S1712. In step S1712, the layout editing application 121 extracts the record from the sub-database. Namely, the layout editing application 121 obtains data to be located in the sub-template.

In step S1713, the layout editing application 121 pours content data of the extracted record into a container of the sub-template according to a layout calculation method similar to the method described in FIG. 7B and obtains a layout result similar to the examples illustrated in FIGS. 35 and 36.

In step S1714, the layout editing application 121 determines a location (e.g., a row number and a column number) of the sub-template layout result generated in step S1713. Then, the layout editing application 121 relates the determined location with the sub-template layout result. The memory unit 136 stores a relationship between the location and the sub-template layout result. More specifically, the layout editing application 121 takes account of a locating direction and instruction contents of the database.

For example, the layout editing application 121 locates the sub-template in the Z-direction. If a user designates a table format of three rows and two columns, the layout editing application 121 locates a sub-template laid-out with a first record in the first column of the first row. Subsequently, the layout editing application 121 locates a sub-template laid-out with a second record in the second column of the first row. Then, the layout editing application 121 locates a sub-template laid-out with a third record in the first column of the second row. Namely, in step S1714, the memory unit 136 stores a relationship between the first record sub-template and its location information (i.e., the first column of the first row).

In step S1711, the layout editing application 121 determines whether there is any record to be located in the rows and columns being set. If there is any recording remaining (YES in step S1711), the layout editing application 121 repeats the above-described processing of steps S1712 to S1714.

More specifically, if the layout editing application 121 obtains row/column number information (i.e., three rows and two columns) from the sub-database in step S1701, the layout editing application 121 locates a total of six sub-templates in the flow area. Accordingly, in step S1711, the layout editing application 121 determines whether six records have been obtained.

After completing the processing of FIG. 18, the layout editing application 121 generates a layout result of plural sub-templates corresponding to the set numbers of rows and columns. The memory unit 136 stores a relationship between the obtained layout result and the row/column information.

Figure 22:
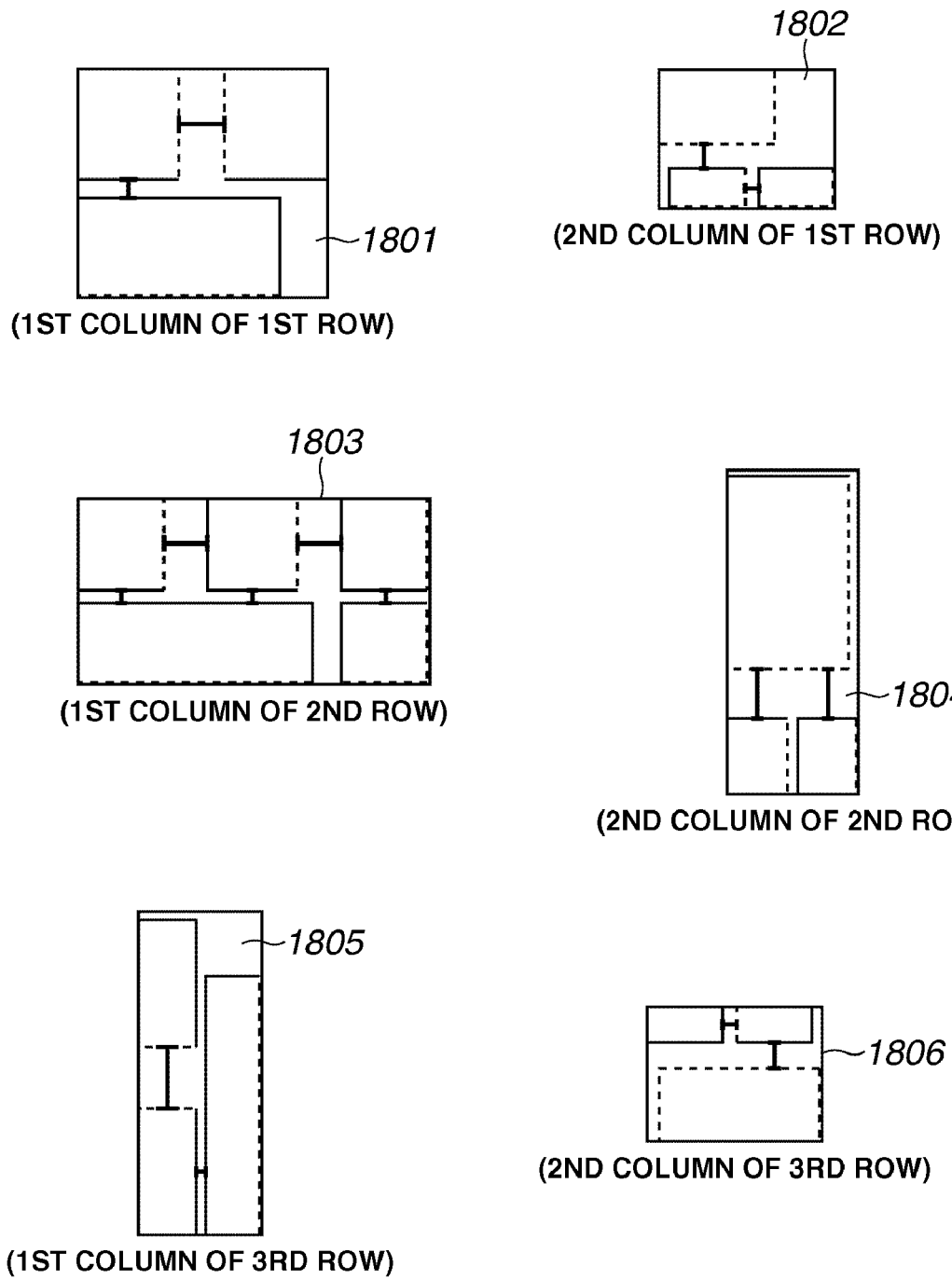
FIG. 22 illustrates an exemplary sub-template located in a flow area.
Figure 23:
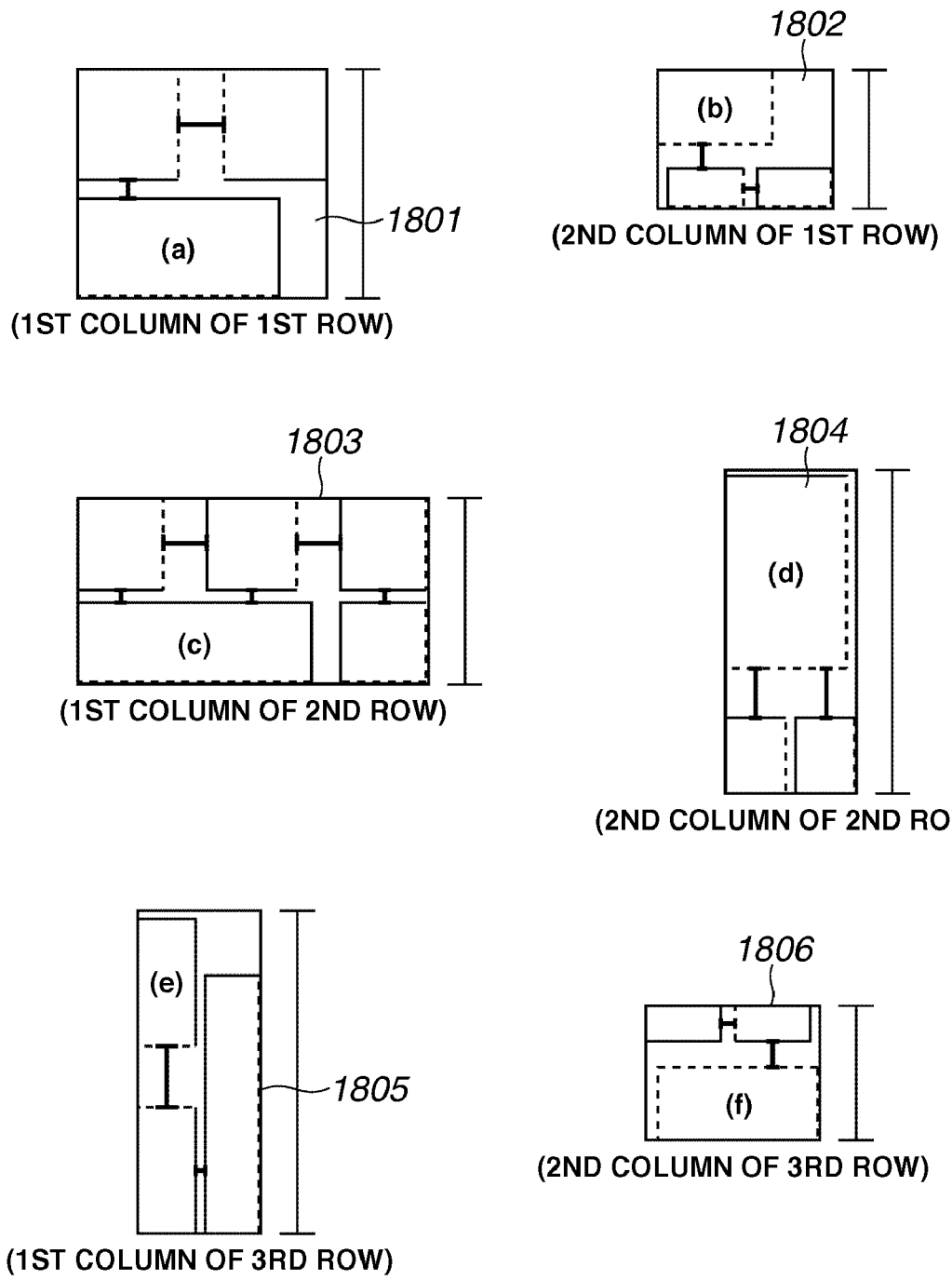
FIG. 23 illustrates an exemplary sub-template located in a flow area.
Figure 24:
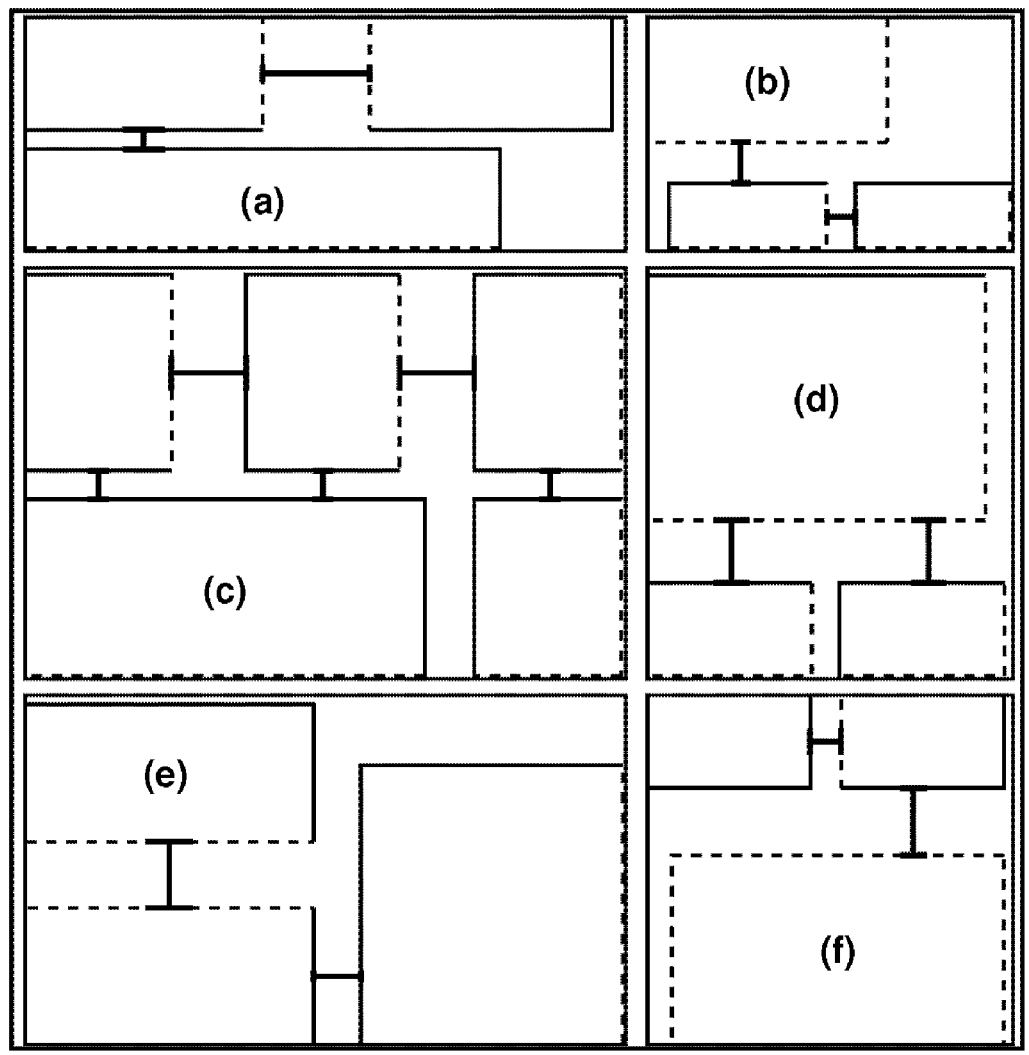
FIG. 24 illustrates an exemplary table format layout result.

FIGS. 22 to 24 illustrate examples representing processing contents of FIG. 17. Each example has a table format of three rows and two columns. FIG. 22 illustrates six sub-template layout results 1801 to 1806 stored in the memory unit 136 when the processing of step S1702 of FIG. 17 (i.e., the processing of FIG. 18) is finished. The note (e.g., 1st column of 1st first row) affixed to each sub-template indicates row/column numbers stored in relation to each sub-template layout result in the processing of step S1714 in FIG. 18.

Figure 20:
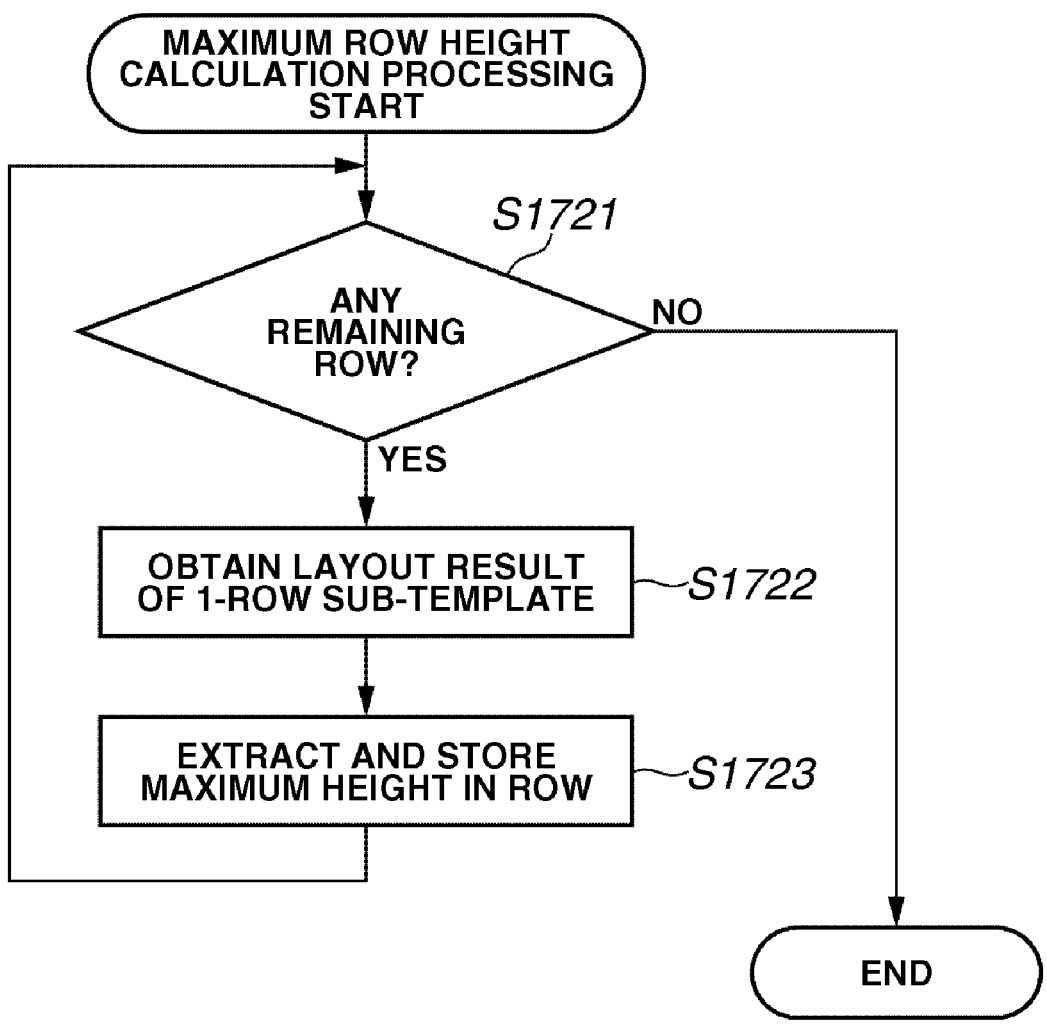
FIG. 20 is a flowchart illustrating maximum row height calculation processing according to the first exemplary embodiment.
Figure 21:
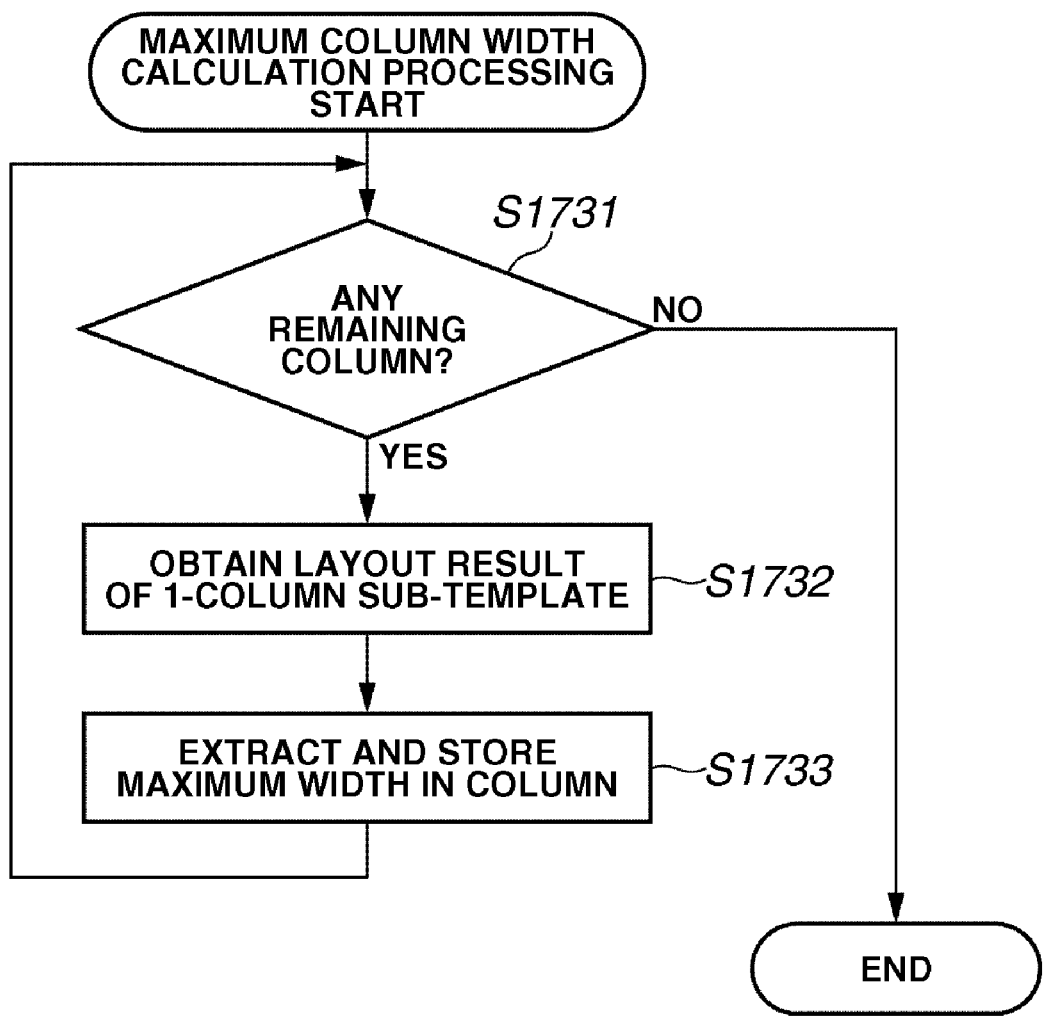
FIG. 21 is a flowchart illustrating maximum column width calculation processing according to the first exemplary embodiment.

Now referring back to the flowchart of FIG. 17, in step S1703 and S1704, the layout editing application 121 obtains a maximum layout height of the sub-template located in each row and each column (S1721 to S1723 in FIG. 20 and S1731 to S1733 in FIG. 21). FIG. 23 illustrates an example according to which a sub-template (a) 1801 and sub-template (b) 1802 are located in the first row. The sub-template (a) 1801 is taller than the sub-template (b) 1802. Accordingly, the maximum layout height of the first row is equal to a vertical size of the sub-template (a) 1802. Similarly, a maximum layout height of the second row is equal to a vertical size of a sub-template (d) 1804. A maximum layout height of the third row is equal to a vertical size of a sub-template (e) 1805.

Namely, the maximum layout height of each row defines an "ideal size" in each row in the vertical direction.

In general, in the expression of content data poured into a container, a desired display is not missing any portion of the content data (without changing the size). Therefore, it is useful that a determined height of each row is equivalent to a maximum height of the layout results located in each row.

Accordingly, in the present exemplary embodiment, the height of a tallest sub-template layout result is a decisive factor in determining the size of each row/each column. However, this rule may not be used if a circumstance does not allow.

Thus, the layout editing application 121 obtains an ideal size of each cell with reference to only the "height" of each layout result illustrated in FIG. 23. Next, the layout editing application 121 adjusts the height of each cell in comparison with the obtained ideal size in the vertical direction.

Figure 25:
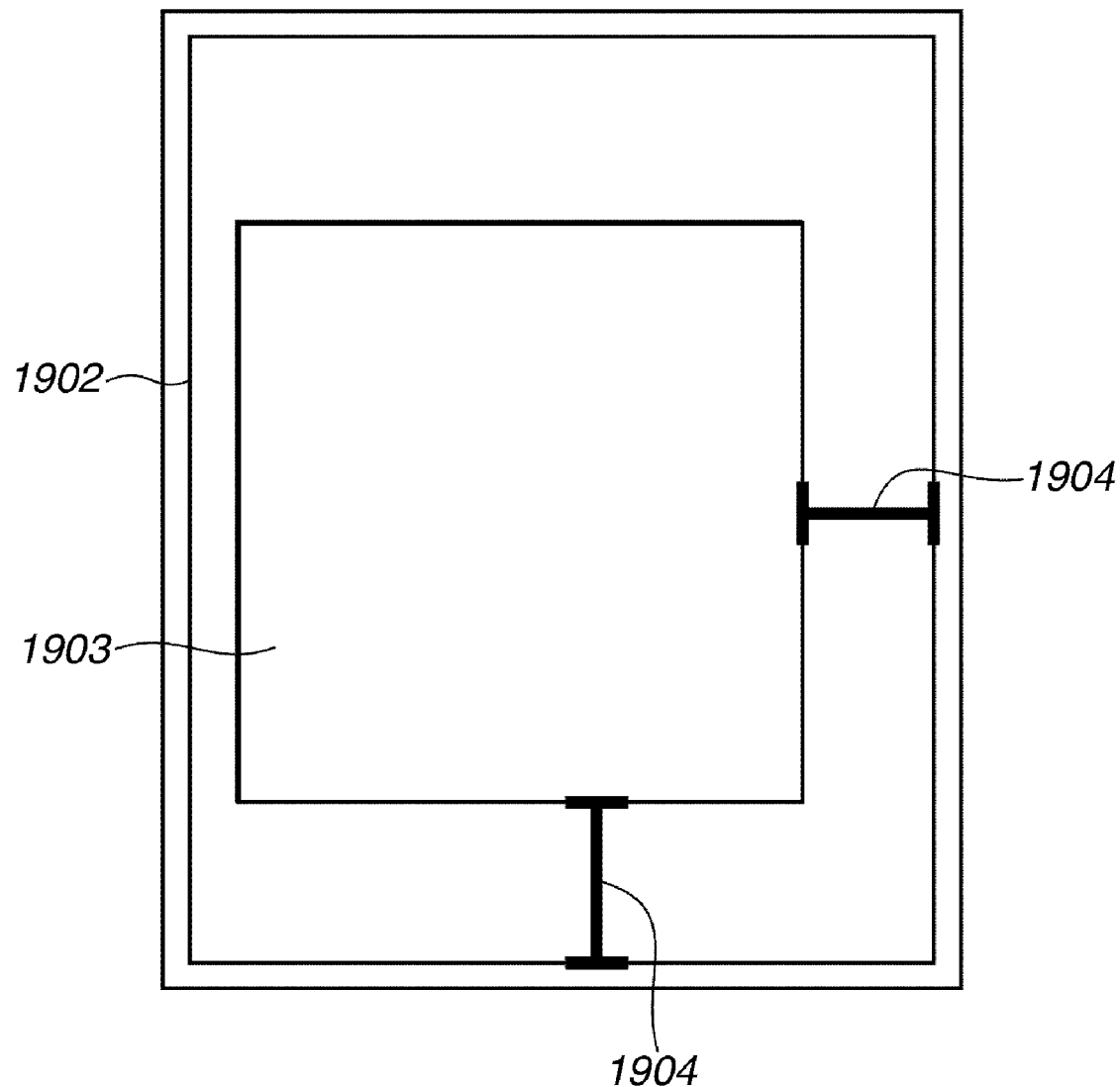
FIG. 25 illustrates an exemplary container structure used in a virtual layout calculation.
Figure 26:
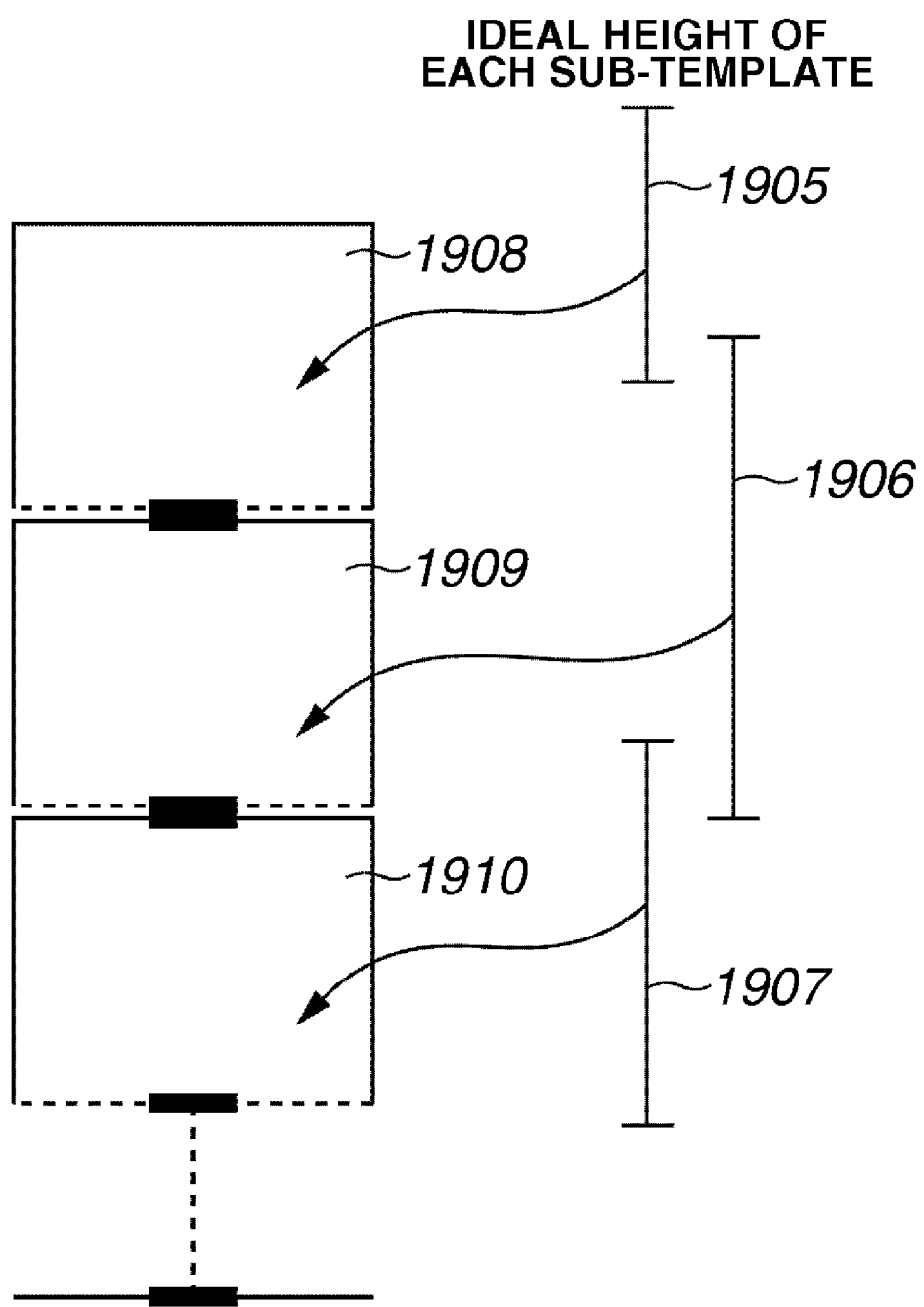
FIG. 26 illustrates an exemplary container structure used in a virtual layout calculation.

First, the layout editing application 121 obtains a container structure used in a virtual layout calculation. FIGS. 25 and 26 illustrate exemplary container structures used in the virtual layout calculation.

An exemplary container structure illustrated in FIG. 25 includes a flow area 1903 related with a sheet edge 1902 via a link 1904. It is now assumed that the flow area 1903 can contain three sub-templates (i.e., three rows) aligned in the vertical direction.

The layout editing application 121 expresses a vertical direction of the flow area with three containers (1908-1910) each having an arbitrary size changeable only in the vertical direction, and links relating two or more containers as illustrated in FIG. 26. In step S1705 of FIG. 17, the layout editing application 121 generates an expression of a container structure (e.g., FIG. 26) and stores it in the memory unit 136.

The layout editing application 121 inserts, into the container structure stored in step S1705, content data having ideal vertical dimensions 1905 to 1907 (i.e., maximum layout height of each row) calculated in step S1703.

Figure 27:
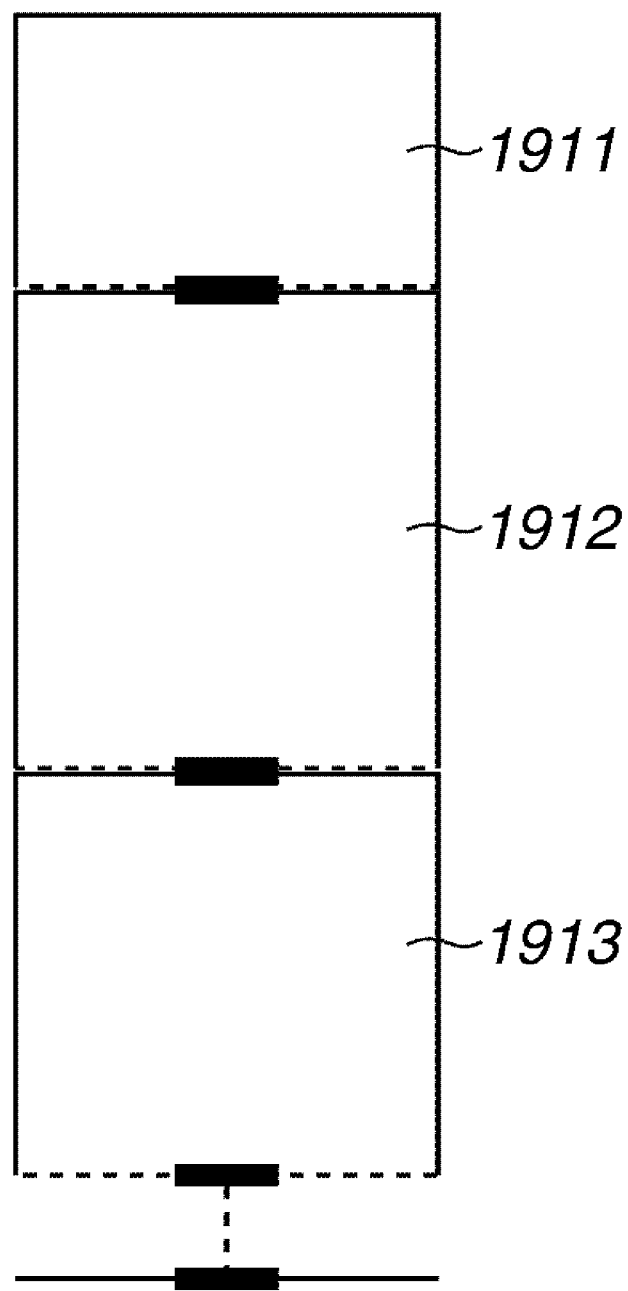
FIG. 27 illustrates an exemplary calculation processing result of a table format.

Then, the layout editing application 121 executes layout calculation processing on inserted contents according to the calculation method illustrated in FIGS. 7A and 7B. As a result, the layout editing application 121 calculates optimum heights 1911 to 1913 of respective containers with reference to the link and the container structure illustrated in FIG. 26. FIG. 27 illustrates a calculation processing result of a table format.

In step S1706, the layout editing application 121 stores height information obtained in the above-described calculation as an adjustment result of each cell in the vertical direction.

The above-described layout calculation is described in more detail with reference to FIG. 28. In the present exemplary embodiment, the layout editing application 121 performs layout calculation processing on the assumption that each item on a table has a similar priority (intensity).

Figure 28:
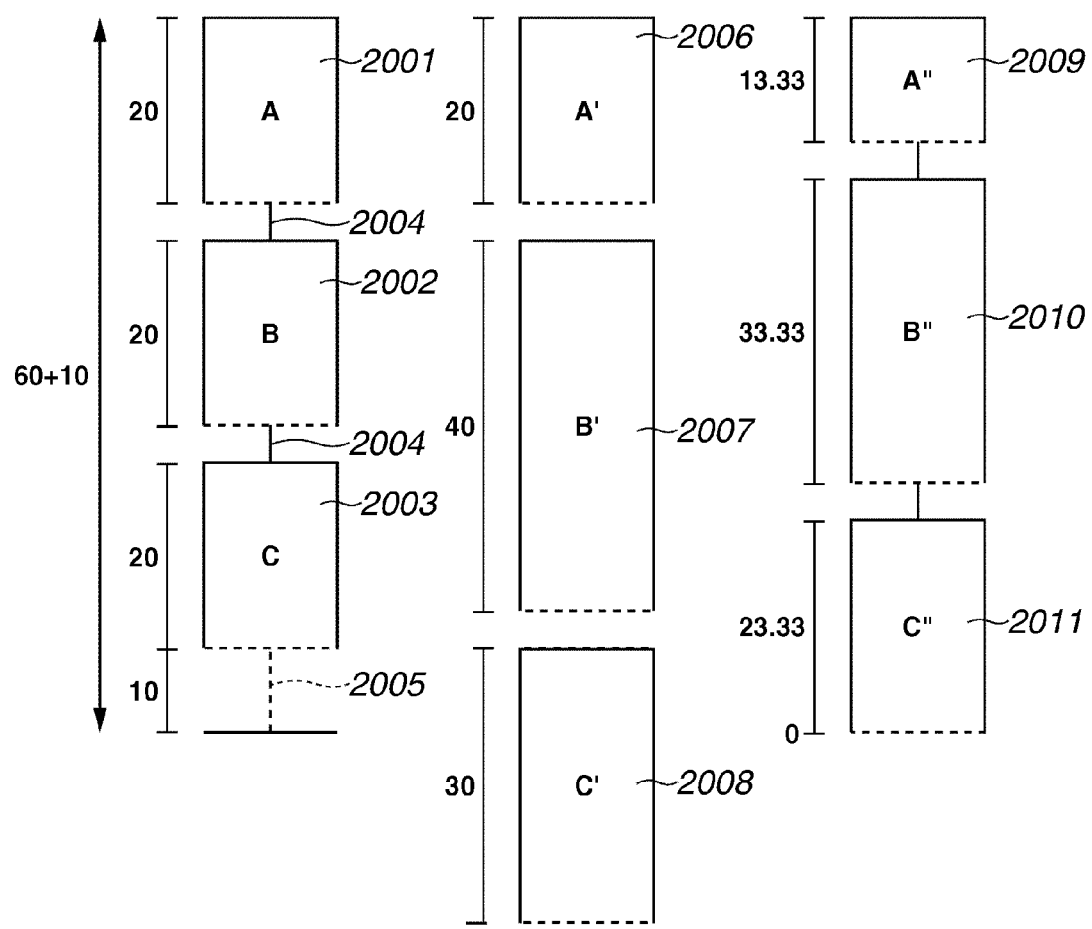
FIG. 28 illustrates an exemplary calculation for adjusting the size of each cell area.

In FIG. 28, fixed links 2004 relate three containers (i.e., container A 2001 through container C 2003) to each other. A flexible link 2005 relates the container C 2003 with a sheet edge.

The fixed link 2004 has a length of 0 when actually expressed according to a table format, although the link 2004 illustrated in FIG. 28 has a significant length. Even if the fixed link 2004 is regarded as having no length in the same layout structure, the layout calculation derives the same result.

Three containers A to C related with the links 2004 have a vertical size of 60 in total, which is equivalent to an overall height of a flow area forming a table. The vertical size of each container in this layout is variable. The flexible link 2005 has one end connected to a stationary edge. The flexible link 2005 has a length of 10 that can be reduced to 0.

If content data A' 2006 to content data C' 2008 are forcibly inserted into the container A 2001 to the container C 2003 of FIG. 28, this insertion generates a significant stress (i.e., a load in layout).

Namely, each content data has an actual size (ideal size). The content data A' has an actual size of 20. The content data B' has an actual size of 40. The content data C' has an actual size of 30. In the present exemplary embodiment, the actual size is equivalent to the "vertical" size obtained in step S1703 of FIG. 17 which is one of layout dimensions of a sub-template inserted in each cell. The content data A' to C' corresponds to the ideal heights 1905 to 1907 illustrated in FIG. 26.

A vertical size of 90 (=20+40+30) is necessary to dispose the content data in respective containers if the ideal size is maintained. However, as described above, the total length of containers A to C (=60) and the length of flexible link 2005 (=10) restrict the layout.

A maximum size available for the containers A to C is 70 (=60+10) in total, as the flexible link 2005 can contract to 0 without any stress. Accordingly, forcibly disposing the content data 2006 to 2008 into the containers 2001 to 2003 generates a stress of 20=90−(60+10).

Next, the layout editing application 121 divides the above-described stress among three containers. The layout editing application 121 calculates a distribution of stresses using the least squares method that can minimize a stress applied to each container.

If each of a, b, and c represents a calculated size of each container, the following formula expresses a cost k that is equal to a sum of squares with respect to the stress of respective containers.

$$k=(a-20)^2+(b-40)^2+(c-30)^2 \quad (4)$$

According to the automatic layout system of the present exemplary embodiment, each container has a same priority and the following equation defines a condition that minimizes the cost k.

$$a-20=b-40=c-30 \quad (5)$$

Furthermore, the size of a calculated layout satisfies the following equation.

$$a+b+c=(60+10) \quad (6)$$

The layout editing application 121 calculates an optimum size of each container that can satisfy the equations (5) and (6). The layout editing application 121 obtains a stress of 6.666 acting on each of the containers A to C. FIG. 28 illustrates calculated layout results A" to C" (2009 to 2011).

If the ideal vertical dimensions 1905 to 1907 of respective cells illustrated in FIG. 26 are maintained, three sub-templates cannot be entirely included in the flow area. However, according to the method illustrated in FIG. 28, the layout editing application 121 can realize an optimum layout of sub-templates considering the ideal vertical size of each cell.

Namely, the layout editing application 121 extracts a sub-template having a maximum vertical size from plural sub-templates aligned in each row. Then, the layout editing application 121 determines a vertical size of the cell area in each row based on the vertical size of each extracted sub-template and a vertical size of the flow area. Each cell area represents a divided area of the flow area.

Next, in steps S1707 and S1708 of FIG. 17, the layout editing application 121 obtains a maximum layout size in the column (horizontal) direction based on the sub-template layout results according to a method similar to the calculation in the vertical direction. Namely, the layout editing application 121 can obtain a horizontal width adjustment result of each cell according to similar processing.

Namely, the layout editing application 121 extracts a sub-template having a maximum horizontal size from plural sub-templates aligned in each column. Then, the layout editing application 121 determines a horizontal size of the cell area in each column based on the horizontal size of each extracted sub-template and a horizontal size of the flow area.

After completing the processing of steps S1701 through S1708 of FIG. 17, the layout editing application 121 merges the calculated values (i.e., adjustment results of the height in each row and the width in each column) and determines the size of each cell.

In step S1709, the layout editing application 121 relates the information of each cell (i.e., size of each cell and position in the flow area) with the sub-template layout result corresponding to each cell. The memory unit 136 stores the information of each cell related with the sub-template layout result. Namely, in step S1706, the layout editing application 121 calculates a vertical size of sub-templates in each row (i.e., sub-templates arrayed in the row direction in which the obtained content data are located). In step S1708, the layout editing application 121 calculates a horizontal size of sub-templates in each column (i.e., sub-templates arrayed in the column direction in which the obtained content data are located).

Then, the layout editing application 121 determines an area size of cell areas (i.e., divided areas of the flow area) based on the calculation results of steps S1706 and S1708. With the processing of FIG. 17, the layout editing application 121 can equalize the horizontal size of each area aligned in the column direction (i.e., vertical direction) and also equalize the vertical size of each area aligned in the row direction (i.e., horizontal direction). The layout editing application 121 divides the flow area into a plurality of areas having the determined area size.

The memory unit 136 stores the size of a flow area, width/height information of respective cells, and sub-templates into which content data are poured.

Figure 19:
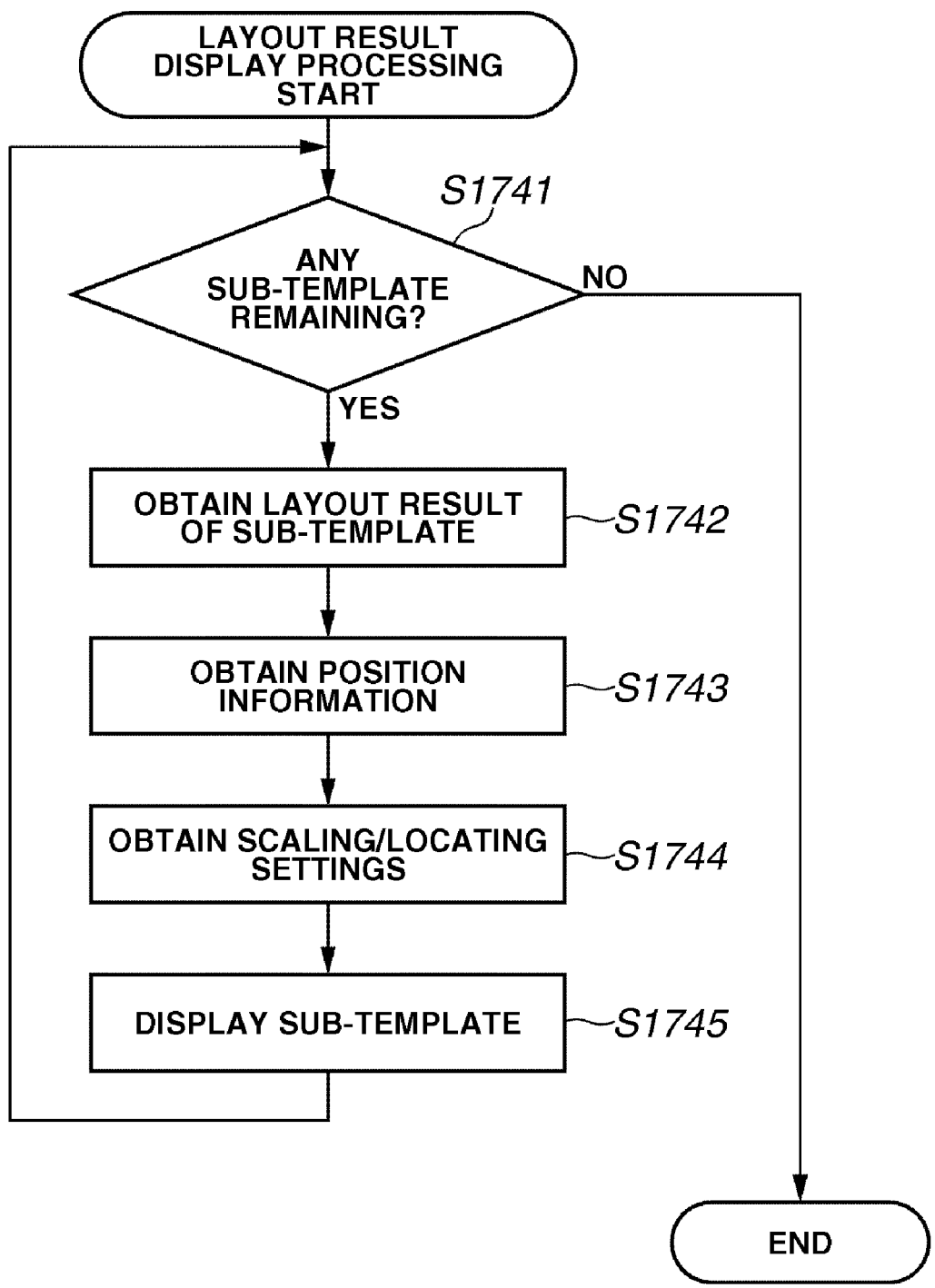
FIG. 19 is a flowchart illustrating layout result display processing according to the first exemplary embodiment.

In step S1710, the layout editing application 121 displays a final layout result based on the information derived from the above-described processing of steps S1701 to S1709. FIG. 19 is a flowchart illustrating details of the layout result display processing of step S1710.

In step S1742, the layout editing application 121 obtains a finalized layout of sub-templates from the memory unit 136. In step S1743, the layout editing application 121 obtains the position of each cell related to respective sub-templates from the memory unit 136 that stores the information in step S1709 of FIG. 17.

In step S1744, the layout editing application 121 obtains a display method and a locating method which are set by a user via the setting screen of FIG. 12. In step S1745, the layout editing application 121 locates the first sub-template in a cell position related to this sub-template.

If the size of a sub-template does not match the size of a related cell, the layout editing application 121 execute scaling (enlarging/reducing) processing and shifting processing in step S1744. In step S1741, the layout editing application 121 determines whether the processing for all cells has been completed. If the processing for all cells is not completed yet (NO in step S1741), the processing flow proceeds to step S1742 to repeat the above-described processing.

Namely, the layout editing application 121 determines the size of each sub-template so that the sub-template can be surely included in the determined cell area. The layout editing application 121 displays an output result including content data located in each sub-template.

FIG. 24 illustrates an exemplary display result that the layout editing application 121 can obtain in step S1710. According to the exemplary layout illustrated in FIG. 24, each cell can completely involve all sub-templates although their aspect ratio may change.

More specifically, the layout editing application 121 reduces large sub-templates (a) and (e) so that each cell can fully involve all sub-templates. The layout editing application 121 enlarges small sub-templates (c) and (f) so that each cell has a smallest empty space.

According to another scaling (enlarging/reducing) method, the layout editing application 121 can "hold an original size of each sub-template", "enlarge/reduce sub-templates while holding their aspect ratio", "locate all sub-templates in a cell while changing their aspect ratio", or "locate all sub-templates in a cell while changing the aspect ratio of text data (while holding the aspect ratio of image data)."

If a selected scaling method is "holding an original size of each sub-template", the layout editing application 121 cuts (trims) a portion of a sub-template when a cell cannot involve this portion. On the other hand, a large vacant space may remain in a cell. Similarly, if a selected scaling method is "enlarging/reducing sub-templates while holding their aspect ratio", a cell may include a significant amount of vacant space.

If the scaling method is fixed to "holding an original size of each sub-template" or "enlarging/reducing sub-templates while holding their aspect ratio", the layout editing application 121 can allow a user to set a shifting method for shifting sub-templates in a cell to obtain a preferable display result.

An exemplary shifting method may include "shifting to left", "shifting to right", "shifting to top", "shifting to bottom", "shifting to vertical center", "shifting to horizontal center", and a combination of them.

In an actual use, a use can determine a scaling (enlarging/reducing) method and a shifting method considering a desirable appearance of each document to be created.

If a selected scaling method is "locating all sub-templates in a cell while changing the aspect ratio of text data (while holding the aspect ratio of image data)", the layout editing application 121 holds the aspect ratio of image data and changes the aspect ratio of text data so that the entire size of all sub-templates agrees with the size of the cell.

As described above, according to the present exemplary embodiment, when a user instructs a table format layout, the layout editing application 121 determines a vertical size of an ideal cell in each row and also determines a horizontal size of an ideal cell in each column. Then, the layout editing application 121 adjusts the size of each cell so that each cell has a size similar to that of an ideal cell and all cells can be entirely included in a flow area. The layout editing application 121 sets the adjusted cells in the flow area. Then, the layout editing application 121 locates sub-templates in the cells. Thus, the present exemplary embodiment realizes an optimum table format layout that can reflect a required size of content data and a required ratio in the vertical and horizontal directions.

Second Exemplary Embodiment

A preferable method for locating a sub-template in a cell is not limited to the method described in the first exemplary embodiment. For example, using two or more cells for a single sub-template may be useful depending on content data and can realize a wide variety of expressions. To this end, the second exemplary embodiment describes a technique capable of using plural cells for the layout of one sub-template.

To display a jointed (connected, or integrated) cells, the present exemplary embodiment enables a user to designate two or more neighboring cells that express one record. FIG. 29 illustrates a part of an exemplary database that describes a designation method according to the XML format. The exemplary database of FIG. 29 includes a record between a pair of <record> tags. Each record includes a description relating to cell usage between a pair of <cell_usage> tags, in which a row of <horizontal> designates the number of cells arrayed in the horizontal direction, and a row of <vertical> designates the number of cells arrayed in the vertical direction. Namely, the example illustrated in FIG. 29 indicates a usage of two cells in the horizontal direction as indicated by a reference numeral 2901 and a usage of two cells in the vertical direction as indicated by a reference numeral 2902. The database of FIG. 29 includes a <data> block, in which <Data1> represents a field name included in this record.

Figure 30:
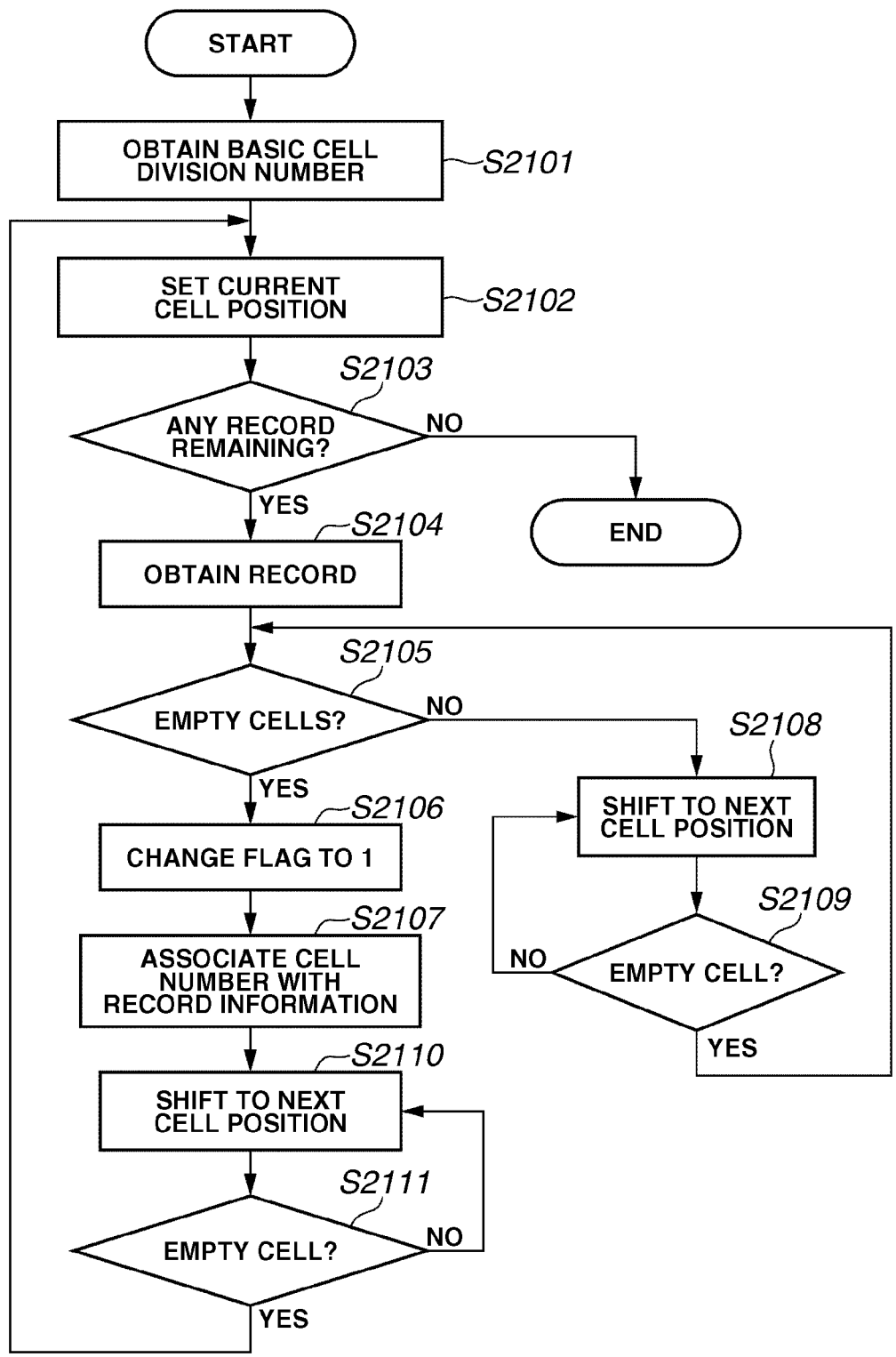
FIG. 30 is a flowchart illustrating layout calculation processing for realizing a display of joined cells.

FIG. 30 is a flowchart illustrating processing for dividing a flow area into plural cells according to the instruction described in the database.

In the present exemplary embodiment, the layout editing application 121 locates sub-templates in order from left to right and repeats the same in order from top to bottom. However, the layout editing application 121 can use any other locating method for locating sub-templates in the flow area.

In step S2101, the layout editing application 121 obtains the number of cells (i.e., the number of a plurality of divided areas in the flow area and disposed in the vertical and horizontal directions) from a sub-database. More specifically, the layout editing application 121 accesses the contents of the sub-database and obtains the designated number of cells with reference to the information described between the <cell_usage> tags. For example, from the sub-database of FIG. 29, the layout editing application 121 identifies that the designate number of cells is "2" in each of the vertical and horizontal directions.

In step S2102, the layout editing application 121 generates a two-dimensional array D of flags in which each flag indicates a state of usage of a corresponding cell. The layout editing application 121 initializes all flag values to "0" that indicates "empty." Then, the layout editing application 121 sets a current processing position to [1, 1]. According to the example illustrated in FIG. 22, the required number of cells in the vertical direction is three and the required number of cells in the horizontal direction is two. Accordingly, the layout editing application 121 generates a 2×3 array D of flags and initializes all flag values to 0.

In step S2103, the layout editing application 121 determines whether any non-processed record remains in the database. If the layout editing application 121 determines that at least one record remains in the database (YES in step S2103), the processing flow proceeds to step S2104. In step S2104, the layout editing application 121 obtains a record (processing object) from the sub-database.

In step S2105, the layout editing application 121 determines whether all flags of the array D are 0. The array D includes plural flags corresponding to the designated number of cells. For example, if a record (layout object) requires two cells in the horizontal direction and two cells in the vertical direction, the layout editing application 121 confirms the flags corresponding to the current processing position [1, 1] and three more positions [2, 1], [1, 2], [2, 2] succeeding the position [1, 1] in step S2105.

If the layout editing application 121 determines that all flags are 0 (YES in step S2105), the processing flow proceeds to step S2106. In step S2106, the layout editing application 121 changes each flag to "1" that indicates "used." In step S2107, the layout editing application 121 relates the number of used cells with record information and the memory unit 136 stores them.

If the layout editing application 121 determines that at least one flag is not 0 (NO in step S2105), the processing flow proceeds to step S2108. In step S2108, the layout editing application 121 shifts the current processing position to the next cell. In step S2109, the layout editing application 121 determines whether the cell corresponding to the current processing position is empty (flag=0). If the layout editing application 121 determines that the cell corresponding to the current processing position is not empty (NO in step S2109), the processing flow returns to step S2108 to repeat the above-described processing.

In step S2110, the layout editing application 121 shifts the current processing position to the next cell (i.e., next start point). In step S2111, the layout editing application 121 determines whether the cell corresponding to the current processing position is empty (flag=0). If the layout editing application 121 determines that the cell corresponding to the current processing position is not empty (NO in step S2111), the processing flow returns to step S2110 to repeat the above-described processing. If the layout editing application 121 determines that the cell corresponding to the current processing position is empty (YES in step S2111), the processing flow returns to step S2102 to execute the processing for setting a current cell position.

After completing the processing of FIG. 30, the layout editing application 121 displays sub-templates together with the record to be disposed based on the cell information stored in step S2107 according to the processing method described in the first exemplary embodiment.

Figure 31:
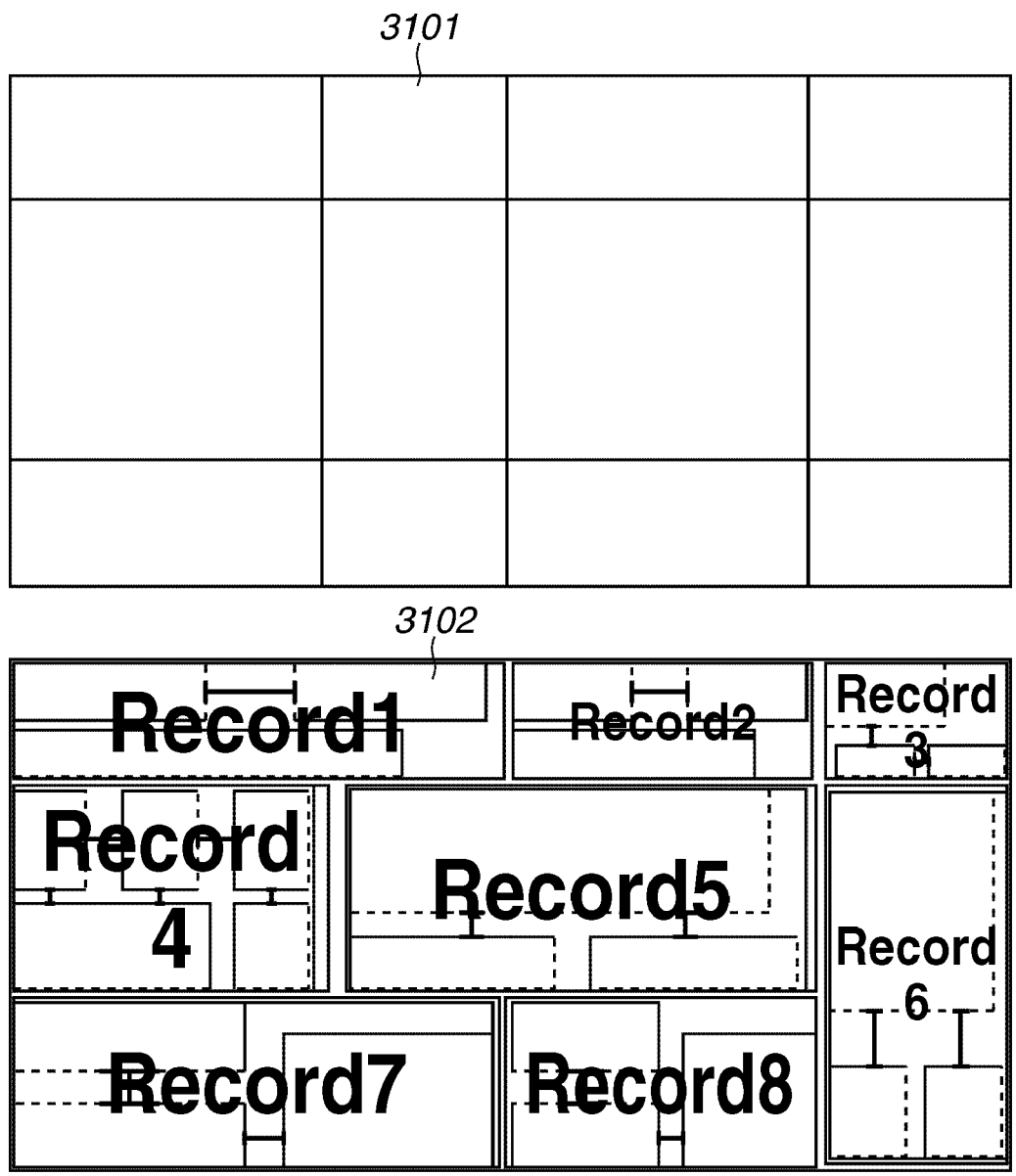
FIG. 31 illustrates an exemplary layout result including joined cells allocated to a record.

FIG. 31 illustrates an example of the processing result obtained from the above-described processing of FIG. 30.

In FIG. 31, a flow area 3101 includes a plurality of cell areas which are divided to have an appropriate cell size according to the processing of the first exemplary embodiment.

As apparent from FIG. 31, the layout of each record requires one or more cells determined by the processing of the second exemplary embodiment (3102).

For example, two cells jointed in the horizontal direction constitute each sub-template for the content data of record 1, record 5, and record 7. Namely, the layout of record 1 requires one cell in the vertical direction and two cells in the horizontal direction.

Furthermore, two cells jointed in the vertical direction constitute a sub-template for the content data of record 6. In other words, the layout of record 6 requires two cells in the vertical direction and one cell in the horizontal direction.

If the processing method according to the present exemplary embodiment is unavailable in arranging sub-templates mutually different in size, it may be possible to emphasize content data of each loss leader because the size of a sub-template increases correspondingly when the size of the content data increases. However, an obtained layout result may be far from a well-balanced layout.

On the other hand, the present exemplary embodiment enables to use an arbitrary number of cells for a sub-template of a record and can realize a complicated and well-balanced table format layout. For example, in the creation of an advertisement bill, a user can emphasize a specific item (such as a loss leader) by allocating a large number of cells for it as illustrated in FIG. 31.

Third Exemplary Embodiment

According to the above-described first and second exemplary embodiments, user's designation in the header portion 1601 of FIG. 16 determines the position of a sub-template into which a record is poured. For example, according to the header portion 1601 that indicates two columns and three rows, the layout editing application 121 determines that the location of a sub-template for the third record is "the first column of the second row." However, designation using the header portion 1601 of FIG. 16 may deteriorate user's operability.

In view of the above, the present exemplary embodiment provides a system configured to generate a table format layout result in the absence of user's designation using the header 1601 of FIG. 16.

FIG. 37 illustrates an exemplary database according to the third exemplary embodiment, which does not include the designation of the number of columns/rows illustrated in FIG. 16.

Figure 38:
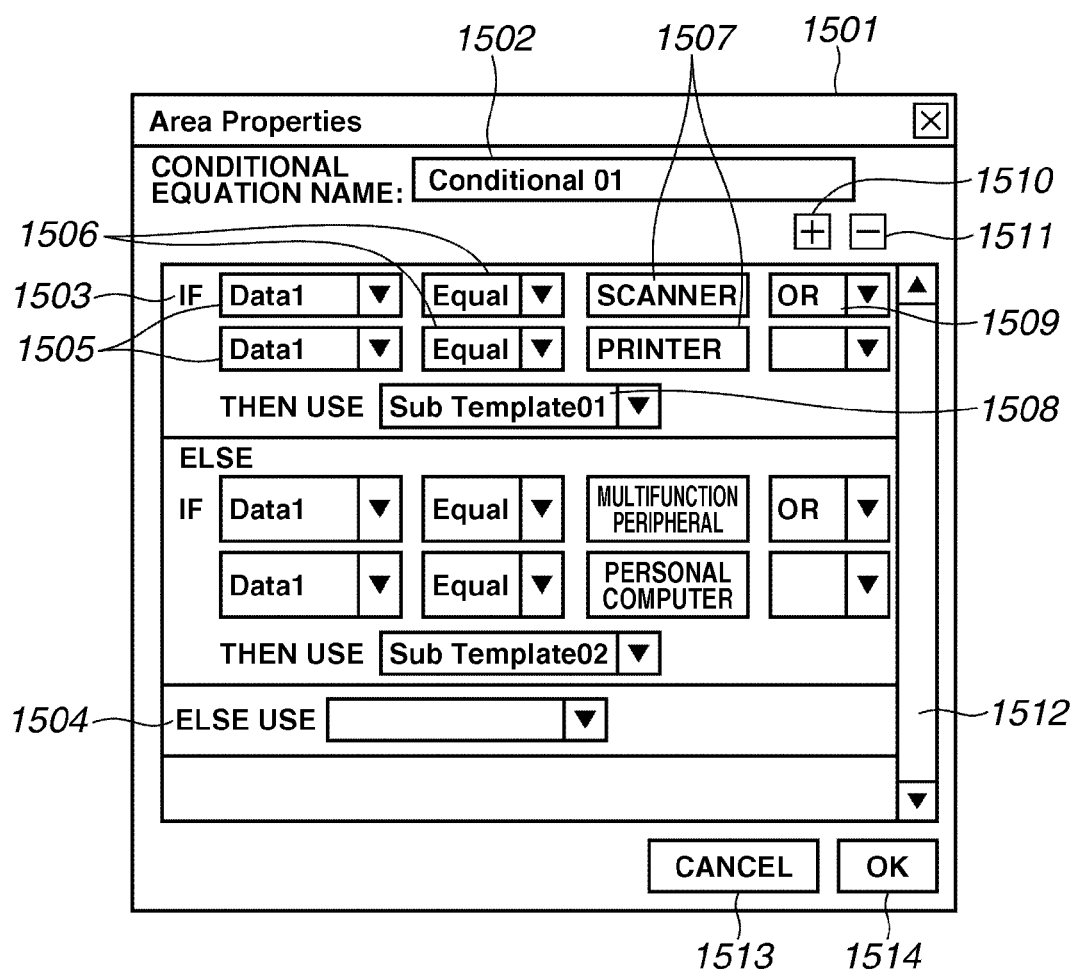
FIG. 38 illustrates a UI used for conditional equation settings according to the third exemplary embodiment.

FIG. 38 illustrates that a UI enables a user to set a conditional equation (extraction conditions set for a flow area) according to the third exemplary embodiment. The exemplary settings of FIG. 38 indicate that a user designates a sub-template 1 if the item "Data1" is a "scanner" or a "printer", and designates sub-template 2 if the item "Data1" is a "multifunction peripheral" or a "personal computer."

Figure 39:
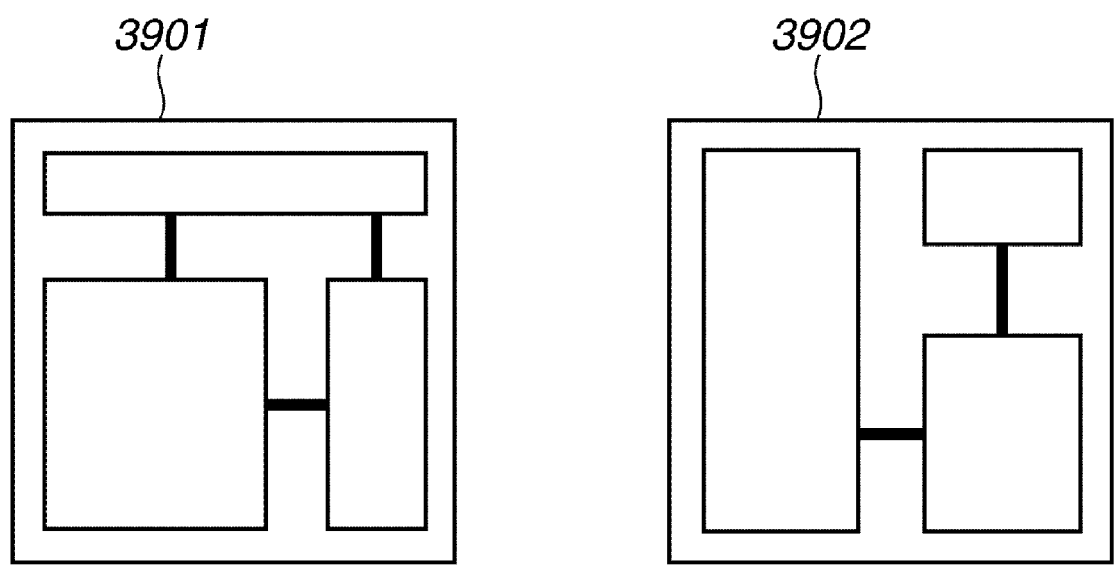
FIG. 39 illustrates exemplary sub-templates according to the third exemplary embodiment.

FIG. 39 illustrates exemplary sub-templates according to the third exemplary embodiment. A sub-template 3901 is the sub-template 1 and a sub-template 3902 is the sub-template 2, which are designated by a user using the operation screen illustrated in FIG. 38.

Figure 41:
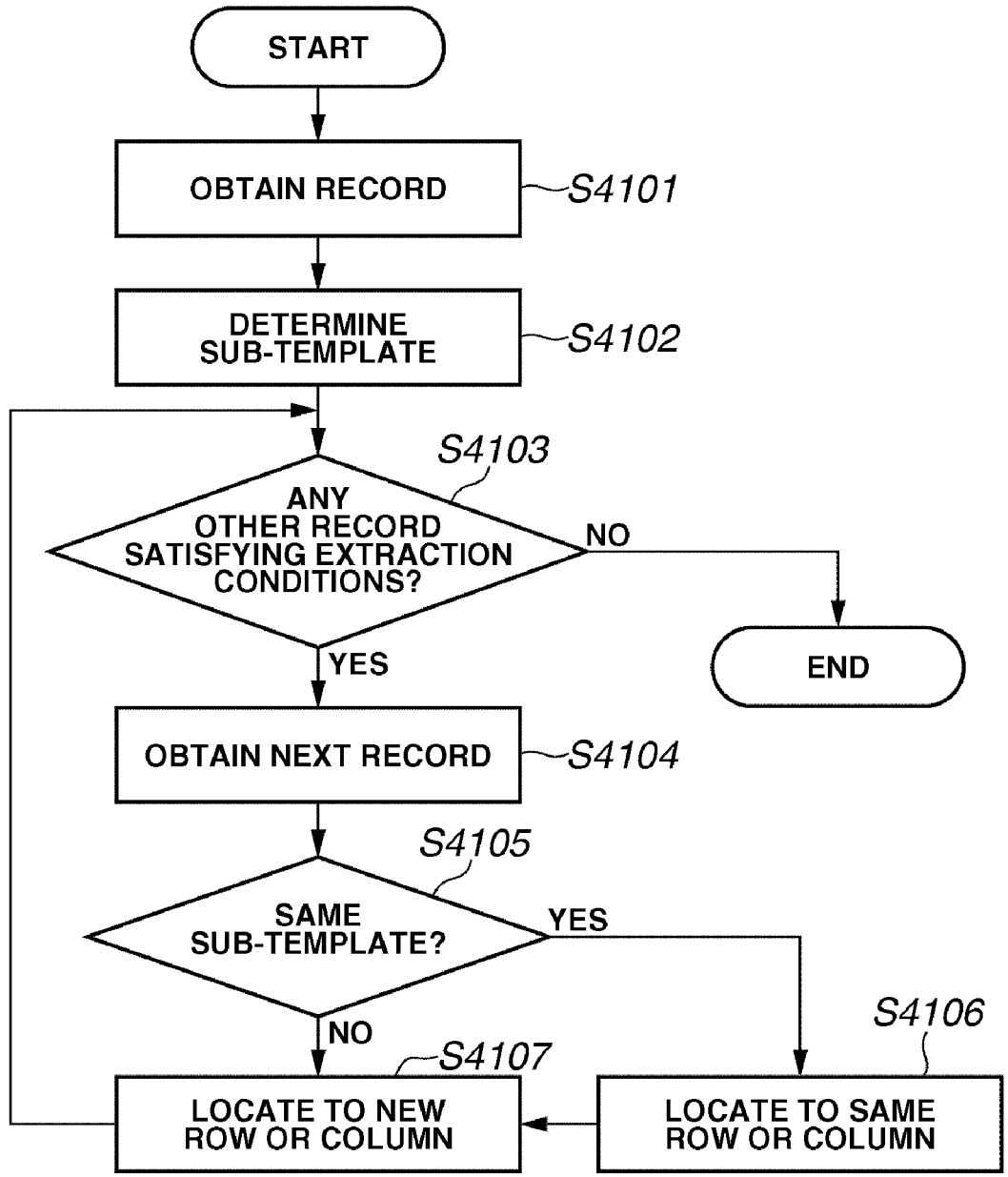
FIG. 41 is a flowchart illustrating layout processing according to the third exemplary embodiment.

FIG. 41 is a flowchart illustrating layout processing according to the third exemplary embodiment.

In step S4101, the layout editing application 121 obtains a record. In step S4102, the layout editing application 121 analyzes content data included in the obtained record and determines a sub-template in which the record is located.

In step S4103, the layout editing application 121 determines whether there is any other record satisfying the extraction conditions set by a user using the UI illustrated in FIG. 38.

If the layout editing application 121 determines that there is a record (layout object) (YES in step S4103), the processing flow proceeds to step S4104. In step S4104, the layout editing application 121 obtains the next record and determines a sub-template in which the record is located. In step S4105, the layout editing application 121 determines whether there is any information that indicates a usage of a sub-template similar to the sub-template determined in step S4104.

If the layout editing application 121 determines that a similar sub-template is not used (NO in step S4105), the processing flow proceeds to step S4107. In step S4107, the layout editing application 121 determines to locate a sub-template of the record in a new row or a new column.

If the layout editing application 121 determines that a similar sub-template is used (YES in step S4105), the processing flow proceeds to step S4106. In step S4106, the layout editing application 121 determines to locate a sub-template of the record in the same row or the same column.

After accomplishing the processing for determining the location (position) of each sub-template, the layout editing application 121 executes the size determination processing which is described in the first and second exemplary embodiments.

Furthermore, a user can determine beforehand the location of the same sub-template in the row and column directions.

Figure 40:
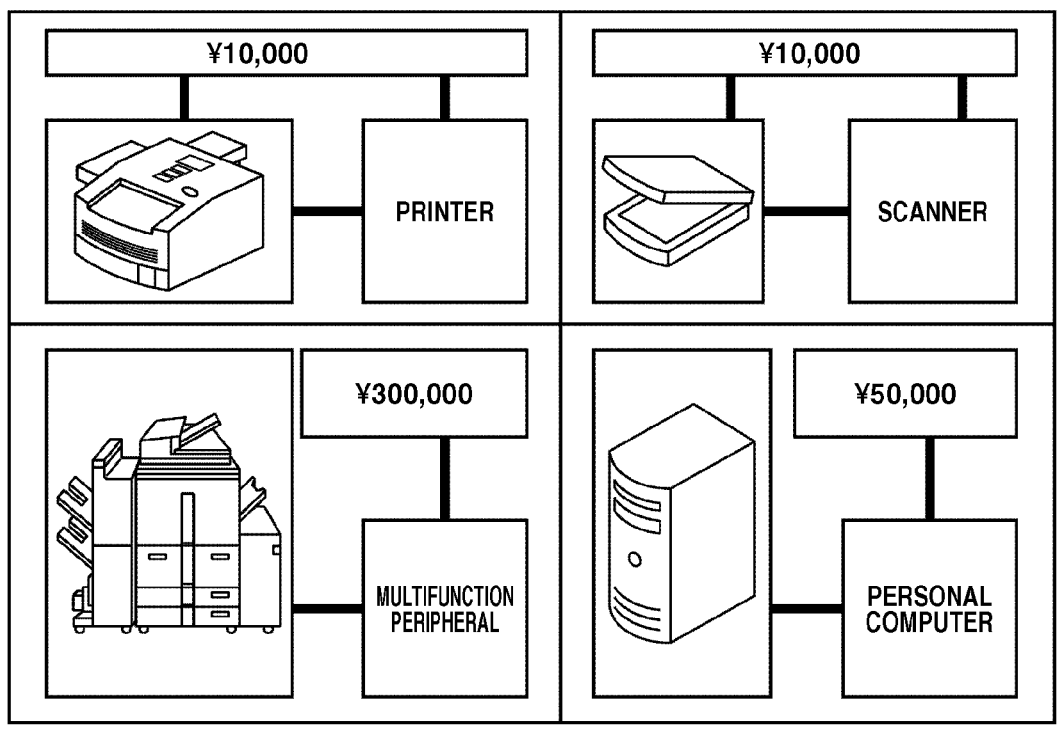
FIG. 40 illustrates a layout result according to the third exemplary embodiment.

By executing the processing of FIG. 41, the layout editing application 121 can locate the same sub-template in the same row or the same column and therefore can generate a table format layout result illustrated in FIG. 40, even when the number of rows and the number of columns are not designated in a database.

Namely, the first and second exemplary embodiments enable a user to designate the number of columns in a database and locate consecutive records corresponding to the designated number in the same row. For example, if the designated number of columns is three, the first and second exemplary embodiments locate three consecutive records in the same row. However, the present exemplary embodiment locates records which use the same or a similar sub-template in the same row or same column. The present exemplary embodiment can generate a table format layout result without using the database described in the first or second exemplary embodiment.

Figure 42:
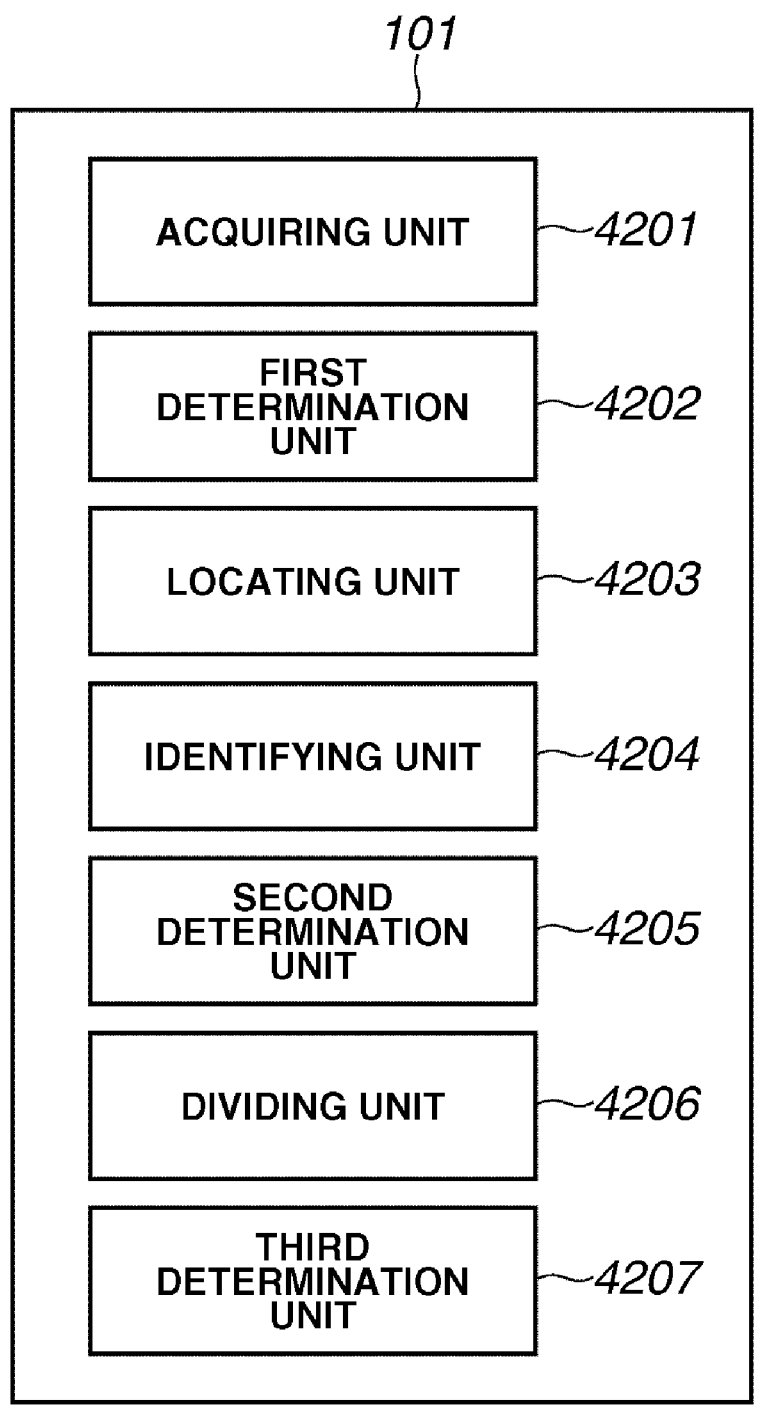
FIG. 42 illustrates a function module of an information processing apparatus according to an exemplary embodiment of the present invention.

FIG. 42 illustrates a function module of an information processing apparatus (host computer) 101 according to an exemplary embodiment of the present invention. The information processing apparatus 101 is configured to enable a user to set extraction conditions for a flow area according to which content data can be extracted from a database and determine a layout of the flow area including sub-templates in which extracted content data can be located. An acquiring unit 4201 is configured to obtain content data satisfying the extraction conditions from the database.

A first determination unit 4202 is configured to determine an area size of each cell area constituting the flow area based on a vertical sub-template size in each row and a horizontal sub-template size in each column, wherein content data obtained by the acquiring unit 4201 are located in a plurality of sub-templates, the vertical sub-template size in each row is selected from a plurality of sub-templates aligned in a row direction representing a horizontal direction, and the horizontal sub-template size in each column is selected from a plurality of sub-templates aligned in a column direction representing a vertical direction. A locating unit 4203 is configured to determine a size of each sub-template so that the sub-templates are included in the cell areas having the area size determined by the first determination unit 4202, and locate the content data in the sub-templates.

A determination unit 4204 determines whether a layout of a record including a plurality of the content data obtained by the acquiring unit 4201 requires a plurality of the cell areas. A second determination unit 4205 determines a size of a partial area of the sub-template according to a required size of the content data to be located in the partial area.

A dividing unit 4206 divides the flow area into a plurality of cell areas with reference to the area size determined by the first determination unit 4202. A third determination unit 4207 determines sub-templates in which content data obtained by the acquiring unit is located.

Furthermore, software program code for realizing the functions of the above-described exemplary embodiments can be supplied to a system or an apparatus including various devices. A computer (or CPU or micro-processing unit (MPU)) in the system or the apparatus can execute the program (i.e., the program corresponding to each flowchart of the exemplary embodiments) to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user. Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of actual processing based on instructions of the programs. Additionally, the program code read out of a storage medium can be written into a memory of a function expansion board equipped in a computer or into a memory of a function expansion unit connected to the computer. In this case, based on an instruction of the program, a central processing unit (CPU) provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-311618 filed Nov. 17, 2006, which is hereby incorporated by reference herein in its entirety.

What is claimed is:

1. An information processing apparatus configured to store a template having a flow area where extraction conditions to extract contents data from a database is set and determine a layout by using the flow area including sub-templates in which extracted content data can be located, the information processing apparatus comprising:

at least one processor coupled via a bus to a memory, the processor being programmed to control one or more of:

an acquiring unit configured to acquire content data satisfying the extraction conditions from the database;

a first determination unit configured to determine an area size of each cell area constituting the flow area based on a vertical sub-template size in each row and a horizontal sub-template size in each column, wherein the content data acquired by the acquiring unit are inserted in a plurality of sub-templates, the vertical sub-template size in each row is selected from a plurality of sub-templates aligned in a row direction representing a horizontal direction, and the horizontal sub-template size in each column is selected from a plurality of sub-templates aligned in a column direction representing a vertical direction;

a second determination unit configured to determine a first difference of a total value of a length in a vertical direction of a plurality of cell regions which are arranged in the column direction calculated based on the area size of each cell area determined by the first determination unit and a length in the vertical direction of the flow area and to determine a second difference of a total value of a length in a horizontal direction of a plurality of cell regions which are arranged in the row direction calculated based on the area size of each cell area determined by the first determination unit and a length in the horizontal direction of the flow area;

a third determination unit configured to determine a first dividing value of the first difference and a second dividing value of the second difference such that a reducing value of the each cell area is same;

a reducing unit configured to reduce the length in the vertical direction of the area size of the each cell area determined by the first determination unit by using the first dividing value and the length in the horizontal direction of the area size of the each cell area determined by the first determination unit by using the second dividing value; and a locating unit configured to determine a size of each sub-template so that the sub-templates are included in the plurality of cell areas reduced by the reducing unit, and insert the content data in the sub-templates.

2. The information processing apparatus according to claim 1, wherein the first determination unit equalizes a horizontal size of each cell area aligned in the column direction representing a vertical direction and equalizes a vertical size of each cell area aligned in the row direction representing the horizontal direction.

3. The information processing apparatus according to claim 1, wherein the first determination unit extracts a sub-template having a maximum vertical size from the plurality of sub-templates aligned in the row direction, determines a vertical size of a cell area in each row based on the extracted vertical sub-template size in each row and a vertical size of the flow area, extracts a sub-template having a maximum horizontal size from the plurality of sub-templates aligned in each column, determines a horizontal size of a cell area in each column based on the extracted horizontal sub-template size in each column and a horizontal size of the flow area, and the first determination unit determines the area size of each cell area based on the determined vertical and horizontal sizes.

4. The information processing apparatus according to claim 1, wherein when arbitrary sub-templates are located in arbitrary areas, the locating unit changes a size of each arbitrary sub-template so that a size of each arbitrary sub-template accords with a size of a corresponding arbitrary area and locates the arbitrary sub-templates in the arbitrary areas.

5. The information processing apparatus according to claim 4, wherein when the locating unit changes the size of each arbitrary sub-template so that the size of each arbitrary sub-template accords with the size of a corresponding arbitrary area, the locating unit changes the size of the sub-template without holding its aspect ratio and changes the size of the sub-template while holding an aspect ratio of image data of a partial area for the image data included in the sub-template.

6. The information processing apparatus according to claim 1, further comprising a determination unit configured to determine whether a layout of a record including plural content data obtained by the acquiring unit requires two or more cell areas, wherein when the determination unit determines that the layout requires two or more cells, the locating unit locates a sub-template using a required number of plural cell areas.

7. A method for an information processing apparatus configured to store a template having a flow area where extraction conditions to extract contents data from a database is set and determine a layout by using the flow area including sub-templates in which extracted content data can be located, the method comprising:

obtaining content data satisfying the extraction conditions from the database;

determining, by a first determination unit, an area size of each cell area constituting the flow area based on a vertical sub-template size in each row and a horizontal sub-template size in each column, wherein obtained content data are inserted in a plurality of sub-templates, the vertical sub-template size in each row is selected from a plurality of sub-templates aligned in a row direction representing a horizontal direction, and the horizontal sub-template size in each column is selected from a plurality of sub-templates aligned in a column direction representing a vertical direction;

determining, by a second determination unit, a first difference of a total value of a length in a vertical direction of a plurality of cell regions which are arranged in the column direction calculated based on the area size of each cell area determined by the first determination unit and a length in the vertical direction of the flow area and to determine a second difference of a total value of a length in a horizontal direction of a plurality of cell regions which are arranged in the row direction calculated based on the area size of each cell area determined by the first determination unit and a length in the horizontal direction of the flow area;

determining, by a third determination unit, a first dividing value of the first difference and a second dividing value of the second difference such that a reducing value of the each cell area is same;

reducing, by a reducing unit, the length in the vertical direction of the area size of the each cell area determined by the first determination unit by using the first dividing value and the length in the horizontal direction of the area size of the each cell area determined by the first determination unit by using the second dividing value;

determining a size of each sub-template so that the sub-templates are included in the cell areas having the determined area size; and inserting the content data in the sub-templates.

8. The method according to claim 7, further comprising equalizing a horizontal size of each cell area aligned in the vertical column direction and equalizing a vertical size of each cell area aligned in the horizontal row direction.

9. The method according to claim 7, further comprising extracting a sub-template having a maximum vertical size from the plurality of sub-templates aligned in the row direction, determining a vertical size of a cell area in each row based on the extracted vertical sub-template size in each row and a vertical size of the flow area, extracting a sub-template having a maximum horizontal size from the plurality of sub-templates aligned in each column, determining a horizontal size of a cell area in each column based on the extracted horizontal sub-template size in each column and a horizontal size of the flow area, and determining the area size of each cell area based on the determined vertical and horizontal sizes.

10. The method according to claim 7, further comprising changing the size of each sub-template so that the sub-template is included in a corresponding cell area having the determined area size and locating the sub-templates in the cell areas.

11. The method according to claim 7, further comprising changing a size of each arbitrary sub-template when arbitrary sub-templates are located in arbitrary areas so that a size of each arbitrary sub-template accords with a size of a corresponding arbitrary area, and locating the arbitrary sub-templates in the arbitrary areas.

12. The method according to claim 11, wherein when the size of each arbitrary sub-template is changed so that the size of each arbitrary sub-template accords with the size of a corresponding arbitrary area, further comprising changing the size of the sub-template without holding an aspect ratio and changing the size of the sub-template while holding an aspect ratio of the partial area for image data included in the sub-template.

13. The method according to claim 7, further comprising determining whether a layout of a record including plural content data requires two or more cell areas, and locating a sub-template using a required number of plural cell areas when it is determined that the layout requires two or more cells.

14. The method according to claim 7, further comprising determining a size of a partial area of the sub-template according to a required size of the content data to be located in the partial area, and determining a size of a sub- template according to the determined size of the partial area.

15. The method according to claim 7, further comprising dividing the flow area into a plurality of cell areas with reference to the determined area size of each cell area.

16. The method according to claim 7, further comprising determining sub-templates in which the obtained content data is located, and locating similar sub-templates in a same row or a same column when the sub-templates have a plurality of types.

17. A non-transitory computer-readable storage medium storing computer-executable instructions for controlling an information processing apparatus configured to store a template having a flow area where an extraction conditions to extract contents data from a database is set and determine a layout by using the flow area including sub-templates in which extracted content data can be located, the medium comprising:

computer-executable instructions for obtaining content data satisfying the extraction conditions from the database;

computer-executable instructions for determining, by a first determination unit, an area size of each cell area constituting the flow area based on a vertical sub-template size in each row and a horizontal sub-template size in each column, wherein obtained content data are inserted in a plurality of sub- templates, the vertical sub-template size in each row is selected from a plurality of sub-templates aligned in a row direction representing a horizontal direction, and the horizontal sub-template size in each column is selected from a plurality of sub-templates aligned in a column direction representing a vertical direction;

computer-executable instructions for determining, by a second determination unit, a first difference of a total value of a length in a vertical direction of a plurality of cell regions which are arranged in the column direction calculated based on the area size of each cell area determined by the first determination unit and a length in the vertical direction of the flow area and to determine a second difference of a total value of a length in a horizontal direction of a plurality of cell regions which are arranged in the row direction calculated based on the area size of each cell area determined by the first determination unit and a length in the horizontal direction of the flow area;

computer-executable instructions for determining, by a third determination unit, a first dividing value of the first difference and a second dividing value of the second difference such that a reducing value of the each cell area is same;

computer-executable instructions for reducing, by a reducing unit, the length in the vertical direction of the area size of the each cell area determined by the first determination unit by using the first dividing value and the length in the horizontal direction of the area size of the each cell area determined by the first determination unit by using the second dividing value; computer-executable instructions for determining a size of each sub-template so that the sub-templates are included in the cell areas having the determined area size; and computer-executable instructions for inserting the content data in the sub-templates.

18. The computer-readable medium according to claim 17, further comprising computer-executable instructions for equalizing a horizontal size of each cell area aligned in the vertical column direction and equalizing a vertical size of each cell area aligned in the horizontal row direction.

19. The computer-readable medium according to claim 17, further comprising computer-executable instructions for extracting a sub-template having a maximum vertical size from the plurality of sub-templates aligned in the row direction, determining a vertical size of a cell area in each row based on the extracted vertical sub-template size in each row and a vertical size of the flow area, extracting a sub-template having a maximum horizontal size from the plurality of sub-templates aligned in each column, determining a horizontal size of a cell area in each column based on the extracted horizontal sub-template size in each column and a horizontal size of the flow area, and determining the area size of each cell area based on the determined vertical and horizontal sizes.

20. The computer-readable medium according to claim 17, further comprising computer-executable instructions for changing a size of each arbitrary sub-template when arbitrary sub-templates are located in arbitrary areas so that a size of each arbitrary sub-template accords with a size of a corresponding arbitrary area and locating the arbitrary sub-templates in the arbitrary areas.

21. The computer-readable medium according to claim 20, wherein when the size of each arbitrary sub-template is changed so that the size of each arbitrary sub-template accords with the size of a corresponding arbitrary area, further comprising computer-executable instructions for changing the size of the sub-template without holding an aspect ratio, and changing the size of the sub-template while holding an aspect ratio of the partial area for image data included in the sub-template.

22. The computer-readable medium according to claim 17, further comprising computer-executable instructions for determining whether a layout of a record including plural content data requires two or more cell areas, and locating a sub-template using a required number of plural cell areas when it is determined that the layout requires two or more cells.

23. The computer-readable medium according to claim 17, further comprising computer-executable instructions for determining a size of a partial area of the sub-template according to a required size of the content data to be located in the partial area, and determining a size of a sub-template according to the determined size of the partial area.

24. The computer-readable medium according to claim 17, further comprising computer-executable instructions for dividing the flow area into a plurality of cell areas with reference to the determined area size of each cell area.

25. The computer-readable medium according to claim 17, further comprising computer-executable instructions for determining sub-templates in which the obtained content data is located, and locating similar sub-templates in a same row or a same column when the sub-templates have a plurality of types.

* * * * *